(12) United States Patent
Gao et al.

(10) Patent No.: US 11,691,123 B2
(45) Date of Patent: Jul. 4, 2023

(54) LOW-TEMPERATURE DIESEL OXIDATION CATALYSTS USING TIO2 NANOWIRE ARRAYS INTEGRATED ON A MONOLITHIC SUBSTRATE

(71) Applicant: University of Connecticut, Farmington, CT (US)

(72) Inventors: Pu-Xian Gao, Coventry, CT (US); Son Hoang, Corona, NY (US)

(73) Assignee: University of Connecticut, Farmington, CT (US)

( * ) Notice: Subject to any disclaimer, the term of this patent is extended or adjusted under 35 U.S.C. 154(b) by 696 days.

(21) Appl. No.: 16/465,981

(22) PCT Filed: Jun. 1, 2018

(86) PCT No.: PCT/US2018/035753
§ 371 (c)(1),
(2) Date: May 31, 2019

(87) PCT Pub. No.: WO2018/223099
PCT Pub. Date: Dec. 6, 2018

(65) Prior Publication Data
US 2020/0030774 A1 Jan. 30, 2020

Related U.S. Application Data

(60) Provisional application No. 62/514,213, filed on Jun. 2, 2017.

(51) Int. Cl.
*B01J 21/06* (2006.01)
*B01J 23/42* (2006.01)
(Continued)

(52) U.S. Cl.
CPC .......... *B01J 21/063* (2013.01); *B01D 53/865* (2013.01); *B01J 23/42* (2013.01); *B01J 35/0006* (2013.01);
(Continued)

(58) Field of Classification Search
CPC ...... B01J 21/063; B01J 23/42; B01J 35/0006; B01J 35/0013; B01J 35/023; B01J 35/04;
(Continued)

(56) References Cited

U.S. PATENT DOCUMENTS

| 4,795,616 A | 1/1989 | Mondt et al. |
| 7,115,305 B2 | 10/2006 | Bronikowski et al. |

(Continued)

FOREIGN PATENT DOCUMENTS

| CN | 101456580 B | 1/2009 |
| CN | 102417201 A | 4/2012 |

(Continued)

OTHER PUBLICATIONS

International Preliminary Report on Patentability for Int'l Appl. No. PCT/US2018/035753, titled: Low-Temperature Diesel Oxidation Catalysts Using TiO2 Nanowire Arrays Integrated on a Monolithic Substrate, dated Dec. 12, 2019.
(Continued)

*Primary Examiner* — Cam N. Nguyen
(74) *Attorney, Agent, or Firm* — Ballard Spahr LLP

(57) ABSTRACT

Metal oxide nanoarrays, such as titanium oxide nanoarrays, having a platinum group metal dispersed thereon and methods of making such nanoarrays are described. The platinum group metal can be dispersed on the metal oxide nanoarray as single atoms. The nanoarrays can be used to catalyze oxidation of combustion exhaust.

19 Claims, 35 Drawing Sheets

(51) Int. Cl.
| | |
|---|---|
| *B01J 23/44* | (2006.01) |
| *B01J 23/46* | (2006.01) |
| *B01J 35/00* | (2006.01) |
| *B01J 35/02* | (2006.01) |
| *B01J 35/04* | (2006.01) |
| *B01J 35/06* | (2006.01) |
| *B01J 37/02* | (2006.01) |
| *B01J 37/10* | (2006.01) |
| *B01J 37/34* | (2006.01) |
| *B01D 53/86* | (2006.01) |
| *B82Y 30/00* | (2011.01) |
| *B82Y 40/00* | (2011.01) |

(52) U.S. Cl.
CPC ......... *B01J 35/0013* (2013.01); *B01J 35/023* (2013.01); *B01J 35/04* (2013.01); *B01J 35/06* (2013.01); *B01J 37/0217* (2013.01); *B01J 37/10* (2013.01); *B01J 37/344* (2013.01); *B01D 2255/1021* (2013.01); *B01D 2255/20707* (2013.01); *B01D 2258/012* (2013.01); *B01D 2259/4566* (2013.01); *B82Y 30/00* (2013.01); *B82Y 40/00* (2013.01)

(58) Field of Classification Search
CPC ........ B01J 35/06; B01J 37/0217; B01J 37/10; B01J 37/344; B01J 53/865; B01J 23/44; B01J 23/464
See application file for complete search history.

(56) References Cited

U.S. PATENT DOCUMENTS

| | | | | |
|---|---|---|---|---|
| 7,541,012 | B2* | 6/2009 | Yeung | B01J 21/06 502/247 |
| 8,309,487 | B2* | 11/2012 | Shiratori | B01J 23/42 502/313 |
| 8,318,126 | B2* | 11/2012 | Wong | C01G 1/02 423/592.1 |
| 8,551,909 | B2* | 10/2013 | Etacheri | B82Y 30/00 423/610 |
| 8,704,210 | B2 | 4/2014 | Gao | |
| 8,835,285 | B2 | 9/2014 | Grimes et al. | |
| 9,394,623 | B2* | 7/2016 | Grimes | C30B 29/34 |
| 9,855,549 | B2 | 1/2018 | Gao et al. | |
| 10,456,773 | B2* | 10/2019 | Castillo Cervantes | B01J 21/063 |
| 2004/0175844 | A1 | 9/2004 | Yang et al. | |
| 2005/0019799 | A1 | 1/2005 | Grasso et al. | |
| 2005/0223969 | A1 | 10/2005 | Chen et al. | |
| 2006/0258757 | A1* | 11/2006 | Wakizaka | C09C 1/3607 516/90 |
| 2006/0270229 | A1 | 11/2006 | Corderman et al. | |
| 2007/0273264 | A1 | 11/2007 | Choi et al. | |
| 2007/0275499 | A1 | 11/2007 | Corderman et al. | |
| 2009/0242416 | A1 | 10/2009 | Yun et al. | |
| 2010/0180950 | A1 | 7/2010 | Gao et al. | |
| 2010/0230286 | A1 | 9/2010 | Lifehits | |
| 2013/0034472 | A1 | 2/2013 | Cantrell et al. | |
| 2013/0175499 | A1 | 7/2013 | Gao | |
| 2014/0256534 | A1 | 9/2014 | Gao et al. | |
| 2015/0258531 | A1 | 9/2015 | Gao et al. | |
| 2015/0333338 | A1* | 11/2015 | Hayden | H01M 4/921 423/598 |
| 2018/0318799 | A1* | 11/2018 | Khan | B01J 23/52 |
| 2019/0314790 | A1 | 10/2019 | Gao et al. | |
| 2020/0061591 | A1 | 2/2020 | Gao et al. | |

FOREIGN PATENT DOCUMENTS

| | | |
|---|---|---|
| EP | 1 015 384 B1 | 7/2005 |
| KR | 10-2007-0113763 A | 11/2007 |
| WO | WO 2006/138071 A1 | 12/2006 |
| WO | 2012/052624 A1 | 4/2012 |
| WO | WO 2012/052624 A1 | 4/2012 |
| WO | WO 2013/049606 A2 | 4/2013 |
| WO | WO 2014/043514 A1 | 3/2014 |
| WO | WO 2018/223054 A1 | 12/2018 |
| WO | WO 2018/223099 A1 | 12/2018 |
| WO | WO 2018/226543 A1 | 12/2018 |

OTHER PUBLICATIONS

International Application No. PCT/US2018/035753: International Search Report and Written Opinion, dated Aug. 28, 2018, for application entitled "Low-Temperature Diesel Oxidation Catalysts Using TIO2 Nanowire Arrays Integrated on a Monolithic Substrate,".

Feng et al., "Vertically Aligned Single Crystal TiO2 Nanowire Arrays Grown Directly on Transparent Conducting Oxide Coated Glass: Synthesis Details and Applications," Nano Letters, vol. 8, No. 11, pp. 3781-3786, 2008.

Guo et al., "Robust 3-D configurated metal oxide nano-array based monolithic catalysts with ultrahigh materials usage efficiency and catalytic performance tunability," Nano Energy, vol. 2, pp. 873-881, 2013.

Hoang et al., "High performance diesel oxidation catalysts using ultra-low Pt loading on titania nanowire array integrated cordierite honeycombs," Catalysis Today, 9 pages, 2017.

Lin et al., "Effect of Calcination Temperature on the Structure of a Pt/TiO2 (B) Nanofiber and Its Photocatalytic Activity in Generating H2," Langmuir, vol. 24, No. 17, pp. 9907-9915, 2008.

International Search Report and Written Opinion for Int'l Appl. No. PCT/US2018/035753, titled: Low-Temperature Diesel Oxidation Catalysts Using TiO2 Nanowire Arrays Integrated on a Monolithic Substrate, dated Aug. 28, 2018.

Andonova, S.M., et al., "Fine-Tuning the Dispersion and the Mobility of BaO Domains on $NO_x$ Storage Materials via $TiO_2$ Anchoring Sites," *J. Phys. Chem.*, 114: 17003-17016(2010).

Banerjee, "Reduction kinetics of porous zinc oxide pellet with $CO-N_2$ gas mixture," *Mineral Processing and Extractive Metallurgy: Transactions of the Institution of Mining and Metallurgy, Section C*, vol. 117, No. 4, pp. 221-230 (Dec. 2008).

Buonsanti, R., et al., "Nonhydrolytic Synthesis of High-Quality Anisotropically Shaped Brookite $TiO_2$ Nanocrystals," *J. Am. Chem. Soc.*, 130: 11223-11233 (2008).

Chen, C.A. et al., "Growth and characterization of well-aligned densely-packed rutile $TiO_2$ nanocrystals on sapphire substrates via metal-organic chemical vapor deposition," *Nanotechnology*, 19: 075611, 6 pages (2008).

Chen, S.Y., et al., "Formation of Core/Shell-Type $ZnO/CeO_2$ Nanorods and $CeO_2$ Nanotube Arrays by Aqueous Synthesis and Wet-Etching," *Advanced Science Letters*, 1: 123-127 (2008).

Chung, et al., "Structural and optical properties of Be-doped ZnO nanocrystalline films by pulsed laser deposition," *Thin solid films*, 516: 4190-4193 (2007).

Despres, J., et al., "Storage of $NO_2$ on $BaO/TiO_2$ and the influence of NO," *Applied Catalysis B: Environmental*, 43: 389-395 (2003).

Du, S., et al., "Cu-Decorated ZnO Nanorod Array Integrated Structured Catalysts for Low-Pressure $CO_2$ Hydrogenation to Methanol," *Advanced Materials Interfaces*, 5, 11 pages (2018).

Feng, X., et al., "Vertically Aligned Single Crystal $TiO_2$ Nanowire Arrays Grown Directly on Transparent Conducting Oxide Coated Glass: Synthesis Details and Applications." *Nano Letters*, 8(11): 3781-3786 (2008).

Feng, Y., et al., "Hydrothermal synthesis and automotive exhaust catalytic performance of $CeO_2$ nanotube arrays," *J. of Materials Chemistry*, 21(39): 15442-15448 (Sep. 6, 2011).

Fierro, G., et al., "A Study of Anomalous Temperature-Programmed Reduction Profiles of $Cu_2O$, CuO, and CuO-ZnO Catalysts," *Journal of Catalysis*, 148: 709-721 (1994).

Gao, P.X., et al., "Nanowire Piezoelectric Nanogenerators on Plastic Substrates as Flexible Power Sources for Nanodevices," *Adv. Mater.*, 19: 67-72 (2007).

(56) References Cited

OTHER PUBLICATIONS

Gayen, R. et al., "Zinc magnesium oxide nanofibers on glass substrate by solution growth technique," *Journal of Crystal Growth*, 310: 4073-4080 (2008).
Guo, Y., et al., "Ultrahigh Surface Area Titanium Dioxide Nanorod Arrays Rooted on Monoliths." Poster presentation at 22nd North American Catalysis Society Meeting, Detroit, Michigan (Jun. 5-10, 2011).
Guo, Y., et al., "Single crystalline brookite titanium dioxide nanorod arrays rooted on ceramic monoliths: A hybrid nanocatalyst support with ultra-high surface area and thermal stability," *Crystengcomm*, vol. 15, No. 41: 8345-8352 (Aug. 19, 2013).
Guo, Y., et al., "Robust 3-D configurated metal oxide nano-array based monolithic catalysts with ultrahigh materials usage efficiency and catalytic performance tunability," *Nano Energy*, 2: 873-881 (2013).
Han, et al., "Transition Metal Oxide Core-Shell Nanowires: Generic Synthesis and Transport Studies," *Nano Letters* 2004, vol. 4, No. 7., pp. 1241-1246 (2004).
Hoang, S., et al., "High performance diesel oxidation catalysts using ultra-low Pt loading on titania nanowire array integrated cordierite honeycombs," *Catalysis Today*, Nov. 1, 2017.
Hosono, E., et al., "Growth of Submicrometer-Scale Rectangular Parallelepiped Rutile $TiO_2$ Films in Aqueous $TiCl_3$ Solutions under Hydrothermal Conditions," *J. Am. Chem. Soc.* 126: 7790-7791 (2004).
Hsu, H.C., et al., "Band gap engineering and stimulated emission ofZnMgO nanowires," *Applied Physics Letters*, 89: 3 pages (2006).
Hu, W., et al., "High-Quality Brookite $TiO_2$ Flowers: Synthesis, Characterization, and Dielectric Performance," *Crystal, Growth and Design*, 9(8): 3676-3682 (2009).
Hwang, D.K., et al., "Effects of deposition temperature on the properties of $Zn_{1-x}Mg_xO$ thin films," *Applied Surface Sciences*, 225: 217-222 (2004).
Jian, D., et al., "Synthesis, characterization, and photocatalytic properties of ZnO/(La,Sr)$CoO_3$ composite nanorod arrays," *J. Mater. Chem.*, 19: 970-975 (2009).
Jiang, S., et al., "High-performance binder-free supercapacitor electrode by direct growth of cobalt-manganese composite oxide nansostructures on nickel foam," *Nanoscale Research Letters*, 9: 492, 8 pages (2014).
Joshi, et al., "Au Decorated Zinc Oxide Nanowires for CO Sensing," *J. Phys. Chem. C.*, 113: 16199-16202 (2009).
Kar, J.P., et al.. "Fabrication and characterization of vertically aligned ZnMgO/ZnO nanowire arrays," *Materials Science and Engineering B*, 147: 74-78 (2008).
Kim, "Calculation of Formation Energy of Oxygen Vacancy in ZnO Based on Photoluminescence Measurements," *J. Phys. Chem. B*, 114: 7874-7878 (2010).
Kim, C. H., et al., "Strontium-Doped Perovskites Rival Platinum Catalysts for Treating $NO_x$ in Simulated Diesel Exhaust," *Science*, 327: 1624-1626 (2010).
Kling. R., et al., "Analysis of ZnO and ZnMgO nanopillars grown bv self-organization," *Nanotechnology*, 15: 1043-1046 (2004).
Li, L., et al., "One-dimension $MnCO_2O_4$ nanowire arrays for electrochemical energy storage," *Electrochimica Acta*, 116: 467-474 (2014).
Lin, C, et al., "Effect of Calcination Temperature on the Structure of a Pt/$TiO_2$ (B) Nanofiber and Its Photocatalytic Activity in Generating $H_2$," *Langmuir*, 24: 9907-9915 (2008).
Liu, W., et al., "The deposition and annealing study of MOCVD ZnMgO," *Journal of Crystal Growth*, 227: 416-421 (2005).
Liu, B. et al., "Oriented single crystalline titanium dioxide nanowires," *Nanotechnology*, 19(50): 505604 (2008).
Lorenz, M., et al., "$Mg_xZn_{1-x}O(\leq x<0.2)$ nanowire arrays on sapphire grown by high-pressure pulsed-laser deposition," *Applied Physics Letters*, 86: 3 pages (2005).
Ohtomo, A., et al., "Structure and optical properties of ZnO/$Mg_{0.2}Zn_{0.8}O$ superlattices." *Applied Physics Letters*, 75(7): 980-982(1999).

Plank, et al., "A simple low temperature synthesis route forZnO-MgO core-shell nanowires," *Nanotechnology*, 19, 8 pages, 465603 (2008).
Qiu, M., et al., "Facile preparation of ordered mesoporous $MnCo_2O_4$ for low-temperature selective catalytic reduction of NO with $NH_3$," *Nanoscale*, 7: 2568-2577 (2015).
Satterfield, C.W., *Heterogeneous Catalysis in Industrial Practice*, 2nd Edition, McGraw-Hill, Inc., New York, 1991.
Shaikh, et al., "Thermal conductivity of an aligned carbon nanotube array," *Carbon*, 45: 2608-2613 (2007).
Shan, et al., "A Simple Route to Porous ZnO and ZnCdO Nanowires," *J. Phys. Chem. B*, 110: 11176-11179 (2006).
Shimpi, P., et al.. "Annealing induced nanostructure and photoluminescence property evolution in solution-processed Mg-Alloyed ZnO nanowires," *Applied Physics Letters*, 97: 103104, 3 pages (2010).
Shimpi, P., et al., "Low temperature synthesis and charactcnzation of MgO/ZnO composite nanowire arrays," *Nanotechnology*, 20: 125608, 1-8 (2009).
Sridharan, K., et al., "Anomalous growth of multi-phased and multi-dimensional Manganese oxidc-Mctal (Fc, Co and Ni) oxide nanostructures: Synthesis and optical limiting properties," *Journal of Alloys and Compounds*, 611: 82-90 (2014).
Tang, et al., "ZnO nanowires grown along the non-polar direction," *Materials Letters*, 62: 1393-1395 (2007).
Tang, W.. et al., "Synergistic Effects in Porous Mn—Co Mixed Oxide Nanorods Enhance Catalytic Deep Oxidation of Benzene," *Catal Lett*, 144: 1900-1910 (2014).
Tang, W., et al., "Scalable Integration of Highly Uniform $Mn_xCo_{3-x}O_4$ Nanosheet Array onto Ceramic Monolithic Substrates for Low-Temperature Propane Oxidation," *ChemCatChem*, 9: 4112-4119(2017).
Tang, W., et al., "Pre-surface leached corierite honeycombs for $Mn_xCO_{3-x}O_4$ nano-sheet array integration with enhanced hydrocarbons combustion," *Catalysis Today*, Nov. 1, 2017.
Wang, G., et al., "Growth and properties of ZnO/Hexagonal ZnMgO/Cubic ZnMgO nanopagoda heterostructures," *J. Phys. D: Appl. Phys.*, 40: 5287-5290 (2007).
Wang, Q., el al., "Compacted nanoscale sensors by merging ZnO nanorods with interdigitated electrodes," Proc. of SPIE 8031, Micro- and Nanotechnology Sensors, Svstems, and Applications III, 80312J (2011).
Wang, Y., et al., "Preparation of Tractable Platinum, Rhodium, and Ruthenium Nanoclusters with Small Particle Size in Organic Media," *Chem. Matter.*, 12(6): 1622-1627 (2000).
Williams, J.L., "Monolith structures, materials, properties and uses," *Catalysis Today*, 69: 3-9 (2001).
Xie, X., et al., "Low-tcmpcraturc oxidation of CO catalyzed by $Co_3O_4$ Nanorods," *Nature*, 458: 746-749 (2009).
Yu, L., et al., "Controlled synthesis of hierarchical $Co_xMn_{3-x}O_4$ array micro-/nano structures with tunable morphology and composition as integrated electrodes for lithium-ion batteries," *Energy & Environmental Science*, 6: 2664-2671 (2013).
Yuhas, et al., "Transition-Metal Doped Zinc Oxide Nanowires," *Angew. Chem.*, 118: 434-437 (2006).
Zhang, "One-dimensional metal oxide nanostructures for heterogeneous catalysis," *Nanoscale*, 5: 7175 (2013).
Zhang, Z., et al., "In situ TPR Removal: a generic method for fabricating tubular array devices with mechanical and structural soundness, and functional robustness on various substrates," *J. of Materials Chemistry*, 22(43): 23098-23105 (Sep. 6, 2012).
Zhou, H.P., et al., "Thermally Stable Pt/$CeO_2$ Hetero-Nanocomposites with High Catalytic Activity," *J. Am. Chem. Soc.*, 132(14): 4998-4999 (2010).
Zhu, "Perovskite oxide nanotubes: synthesis, structural characterization, properties and applications," *Journal of Materials Chemistry*, 20: 4015-4030 (Feb. 2010).
Zhu, L., et al.,"Catalyst-free two-step growth of quasialigned ZnMgO nanorods and their properties," *Applied Physics Letters*, 88: 3 pages (2006).

* cited by examiner

| SAMPLE | CELL DENSITY CELL PER SQUARE INCH (CPSI) | GAS ENTRANCE AREA (%) | ENTRANCE AREA REDUCTION (%) |
|---|---|---|---|
| BARE CORDIERITE | 400 | 80.2 | - |
| BARE CORDIERITE | 600 | 76.0 | - |
| BARE CORDIERITE | 900 | 81.3 | - |
| WITH TiO$_2$ NANOARRAY | 400 | 77.1 | 3.87 |
| WITH TiO$_2$ NANOARRAY | 600 | 72.4 | 4.74 |
| WITH TiO$_2$ NANOARRAY | 900 | 78.5 | 3.44 |
| COMMERCIAL DOC | 600 | 52.9 | 30.39 |

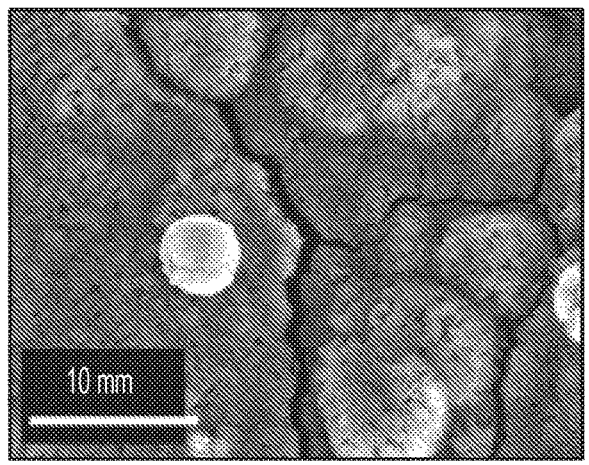 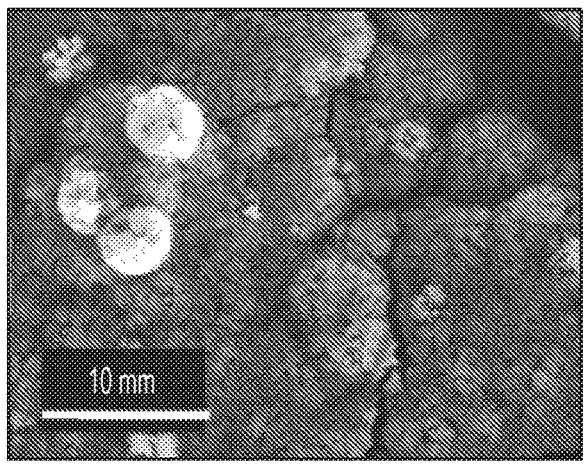
FIG. 10A  FIG. 10B
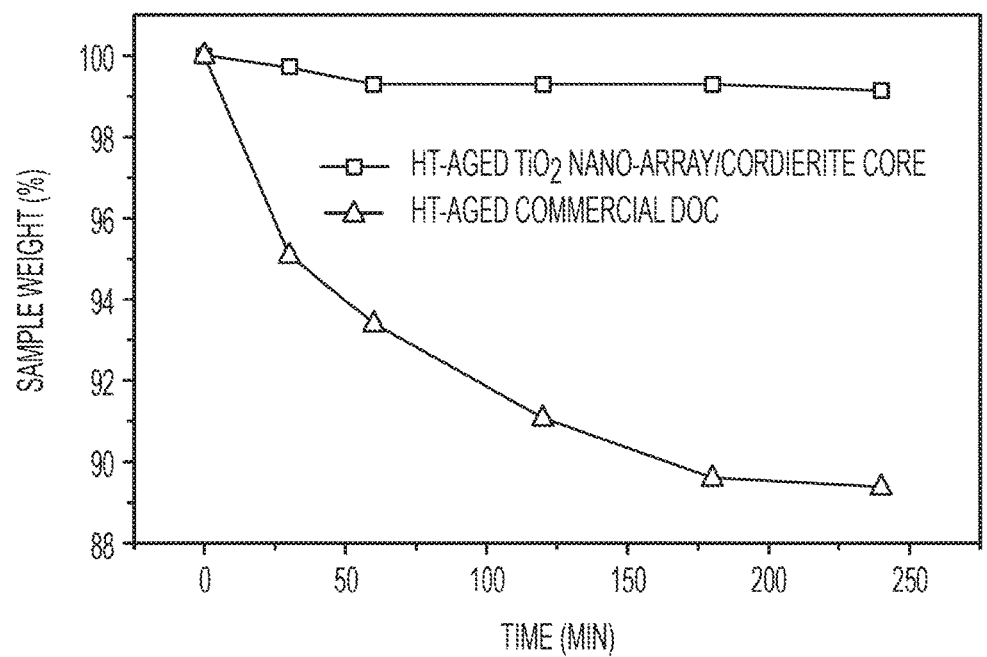
FIG. 10C

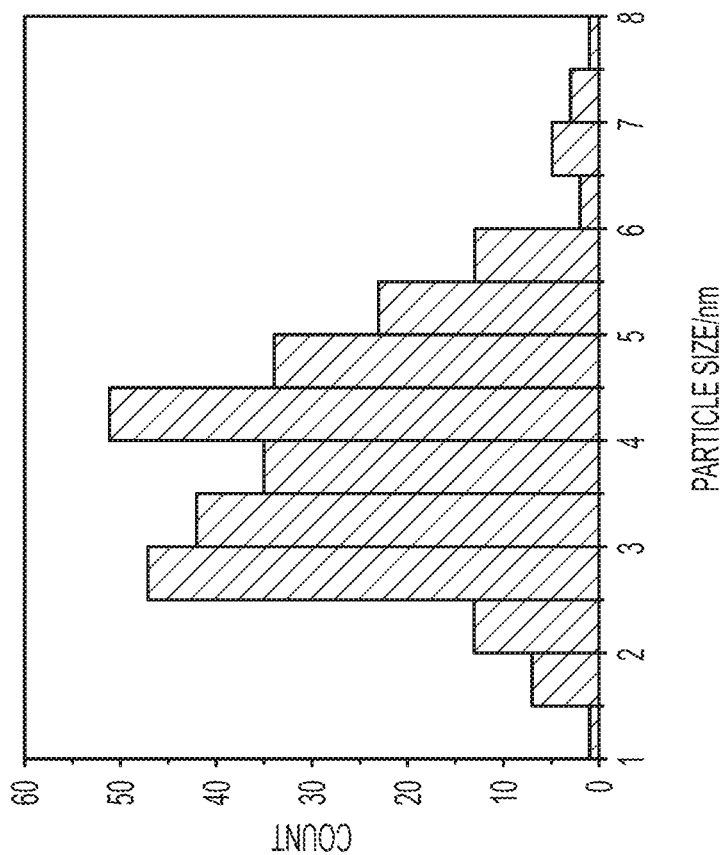
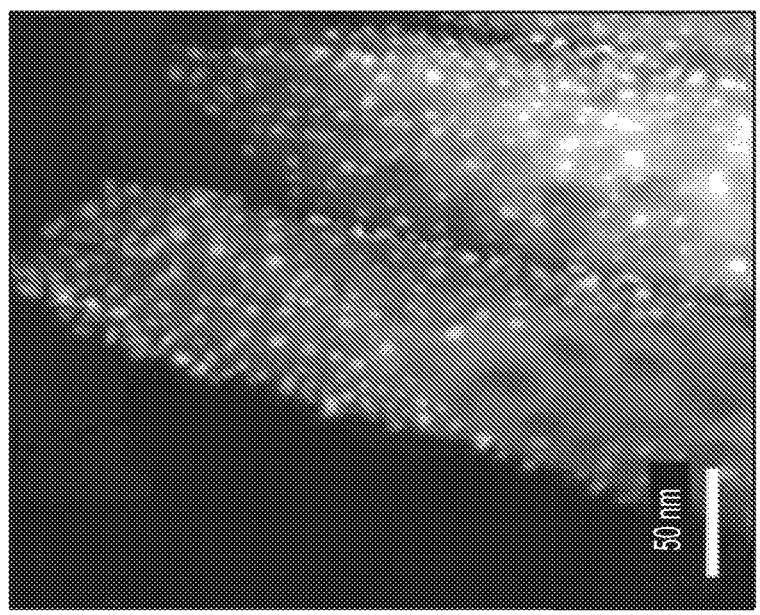
FIG. 15B
FIG. 15A

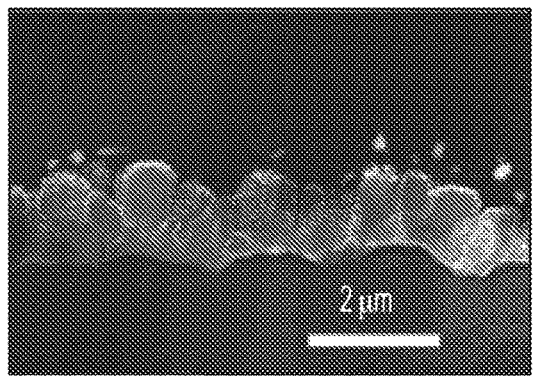 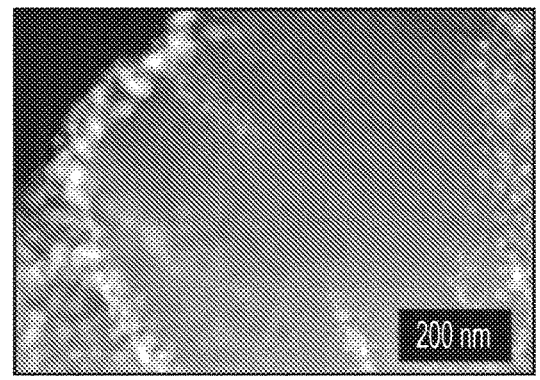
FIG. 23A    FIG. 23B
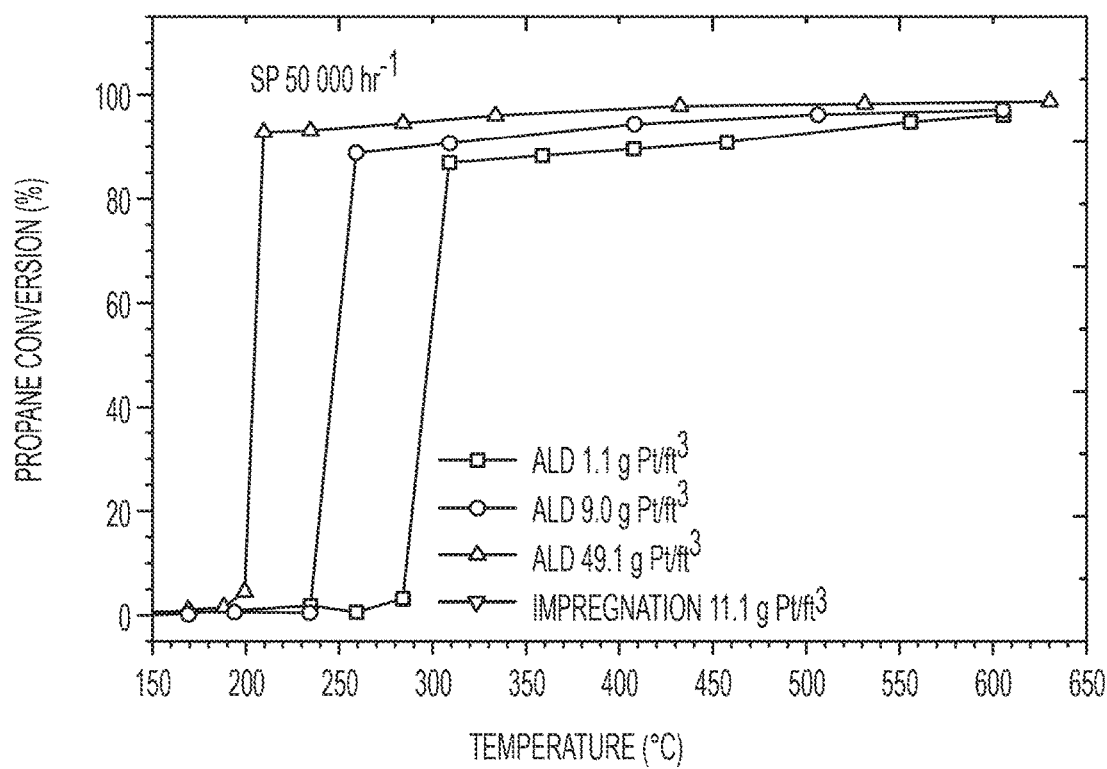
FIG. 23C

| SAMPLE | BET SURFACE AREA ($m^2 g^{-1}$) |
|---|---|
| $TiO_2$ NA | 92.3 |
| $Pt/TiO_2$ NA | 7.7 |
| HT AGED $Pt/TiO_2$ NA | 6.1 |

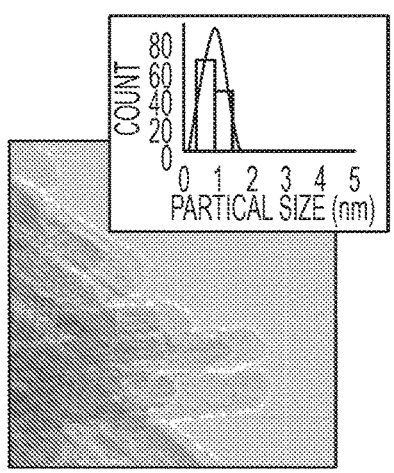 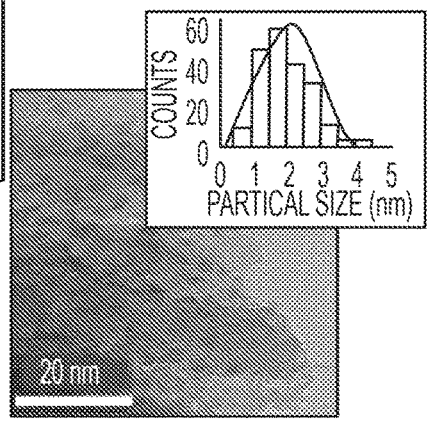 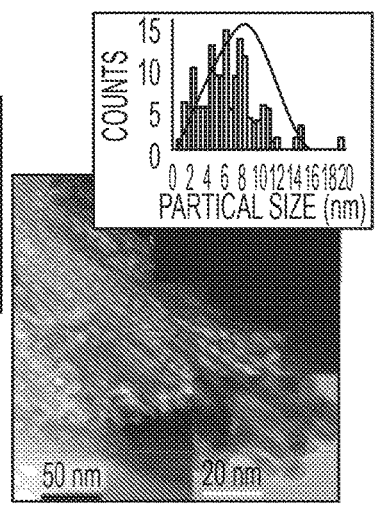
FIG. 26A          FIG. 26B          FIG. 26C
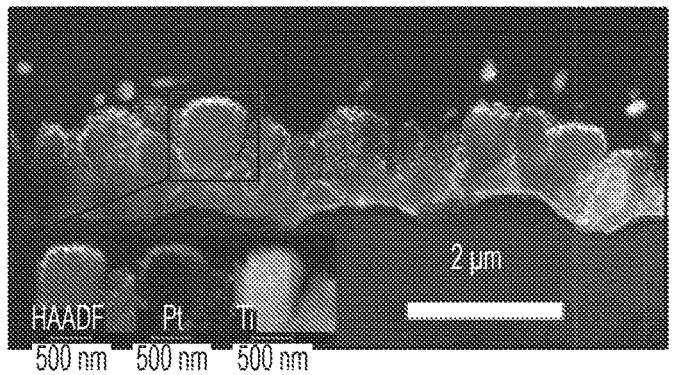 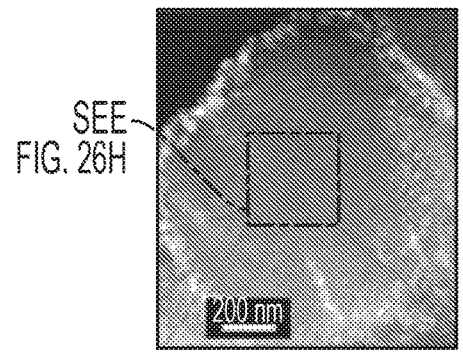
FIG. 26D          FIG. 26G
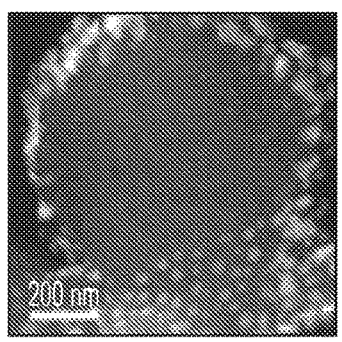 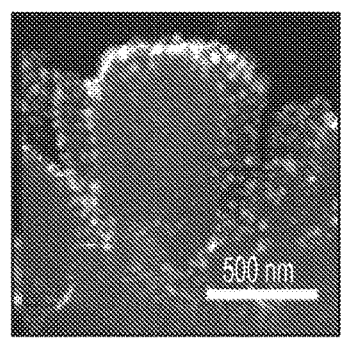 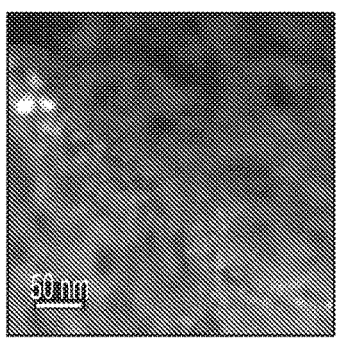
FIG. 26E          FIG. 26F          FIG. 26H

LOW-TEMPERATURE DIESEL OXIDATION CATALYSTS USING TIO2 NANOWIRE ARRAYS INTEGRATED ON A MONOLITHIC SUBSTRATE

RELATED APPLICATION

This application claims the benefit of U.S. Provisional Application No. 62/514,213, filed on Jun. 2, 2017. The entire teachings of the above application are incorporated herein by reference.

GOVERNMENT SUPPORT

This application is the U.S. National Stage of International Application No. PCT/US2018/035753, filed Jun. 1, 2018, which designates the U.S., published in English, and claims the benefit of U.S. Provisional Application No. 62/514,213, filed Jun. 2, 2017. The entire teachings of the above applications are incorporated herein by reference.

BACKGROUND

Combustion exhaust, particularly from diesel combustion, contributes to emission of a variety of gases, including carbon monoxide (CO), nitric oxide (NO), and hydrocarbons. Such gases are emitted from a variety of diesel engines, such as automobiles, marine engines, and generators. Catalysts are employed to catalyze oxidation of these gases, but traditional wash-coated catalysts do not catalyze oxidation as effectively at lower temperatures as compared to higher temperatures. As a result, combustion exhaust is incompletely oxidized. For automobiles, as fuel efficiency has increased, the tailpipe exhaust temperature has also decreased. In addition, current wash-coating technology permits insufficient control over the catalyst's physical and chemical structures, uniformity of the coating layer, and adhesion to the substrate, thus compromising material utilization efficiency and catalytic performance.

Additional background information is provided U.S. Patent Publication No. 2014/0256534 and U.S. Pat. No. 9,561,494.

SUMMARY

Low temperature diesel oxidation catalysts (DOC) are necessary to allow efficient cool CO and hydrocarbon (HC) exhaust aftertreatment in the low temperature exhaust conditions of highly efficient diesel-powered and hybrid electrical vehicles. However traditional washcoated powder-form commercial DOCs typically are not active until above 200° C. Described herein is a nanoarray (e.g., nanowire array) useful as a catalytic converter for combustion emissions, such as diesel combustion emissions.

Described herein is a method of making a metal oxide nanoarray having a platinum group metal dispersed thereon. The method can include contacting a metal oxide nanoarray with a solution comprising a platinum group metal precursor, drying the metal oxide nanoarray, and calcining the metal oxide nanoarray. The platinum group metal precursor can be a platinum precursor, such as $Pt(NH_3)_4(NO_3)_2$. The solution that includes the platinum group metal precursor can further include sodium ions, such as sodium ions from sodium hydroxide (NaOH). Drying the metal oxide nanoarray can include microwaving the metal oxide nanoarray. Microwaving can be performed at a frequency from about 915 MHz to about 7.0 GHz. Contacting the metal oxide nanoarray with a solution having a platinum precursor dissolved therein and drying the metal oxide nanoarray can be performed at least twice prior to calcining the metal oxide nanoarray. Calcination can be performed in air. Calcination can be performed at a temperature between about 450° C. and 550° C. for a duration from 3 hours to 4 hours. Calcining can be performed with a ramp rate of 2° C./min. Calcining can be performed at about 500° C. for about 4 hours with a ramp rate of about 2° C./min.

The metal oxide can be titanium dioxide. The method can further include making a titanium dioxide nanoarray. The method can further include contacting a substrate with a Ti (IV) precursor in a non-polar solvent and with hydrochloric acid in water under hydrothermal conditions, thereby forming a titanium dioxide nanoarray. A water:non-polar solvent ratio can be from about 1:20 to about 1:5. The non-polar solvent can include one or more of butanone, toluene, and hexane. The hexane can be n-hexane.

The titanium (IV) precursor can include one or more titanium alkoxides, such as titanium (IV) isopropoxide or titanium (IV) n-butoxide. The titanium (IV) precursor can include titanium tetrachloride.

The substrate can be seeded with $TiO_2$ prior to reacting the substrate.

The method can further include sonicating the titanium dioxide nanoarray.

The hydrochloric acid solution can be from 25 wt % to 45 wt % hydrochloric acid, preferably from 30 wt % to 40 wt % hydrochloric acid, even more preferably from 36 wt % to 38 wt % hydrochloric acid.

Described herein is an article of manufacture. The article can include a substrate; a mesoporous, rutile titanium dioxide nanoarray integrated onto the substrate; and a platinum group metal disposed on the titanium dioxide nanoarray. The platinum group metal can be disposed on the titanium dioxide substrate as a single-atom species, as determined by transmission electron microscopy (TEM). The platinum group metal can include one or more of platinum, palladium, and rhodium, osmium, iridium, and ruthenium. The platinum group metal can be platinum.

The substrate can be acid-resistant. The substrate can be a honeycomb monolith, such as a cordierite honeycomb monolith. The titanium dioxide nanoarray can have a uniform thickness from about 100 nm to about 6 μm. The titanium dioxide nanoarray can have uniform features with diameters from about 5 nm to about 200 nm.

Described herein is a method of oxidizing a combustion exhaust. The method can include contacting a source of combustion exhaust with a metal oxide nanoarray, such as a titanium dioxide nanoarray, having a platinum group metal dispersed thereon. The combustion exhaust can include one or more of carbon monoxide (CO), nitric oxide (NO), and hydrocarbons, such as ethylene, propylene, propane, and methane. The source of combustion exhaust can be diesel combustion exhaust. The diesel combustion exhaust can be emitted from a land-based vehicle (e.g., car or a truck), a water-based vessel (e.g., boat or a ship), a diesel-fueled power plant, a diesel generator, or a diesel-fueled power plant.

Described herein is a method of making a titanium dioxide nanoarray. The method can include reacting a substrate with a Ti (IV) alkoxide and titanium tetrachloride in a non-polar solvent and with hydrochloric acid in water under hydrothermal conditions and at a water:non-polar solvent ratio from about 1:20 to about 1:5, thereby forming a titanium dioxide nanoarray. The non-polar solvent can include one or more of butanone, toluene, and hexane. The hexane can be n-hexane. The titanium (IV) alkloxide is titanium (IV) isopropoxide or titanium (IV) n-butoxide. The substrate can be seeded with $TiO_2$ prior to reacting the substrate. The method can include sonicating the titanium dioxide nanoarray. The hydrochloric acid solution can be from 25 wt % to 45 wt % hydrochloric acid, preferably from 30 wt % to 40 wt % hydrochloric acid, even more preferably from 36 wt % to 38 wt % hydrochloric acid.

In some embodiments, the nanoarray is composed of highly stable mesoporous rutile titania nanowire array anchored to the channeled walls of standard cordierite monoliths with well-dispersed sub-nanometer and single-atom Pt on the nanowire surfaces. These nanowire-based monoliths exhibit remarkable catalytic oxidation activity for CO and hydrocarbons with 90% conversion at temperatures as low as ~160° C. Such excellent low temperature activities were sustained over hydrothermal aging and sulfation as the active single atom and sub-nanometer Pt species remained on the stable titania nanowire arrays.

A sustained 90% diesel oxidation conversion at ~160° C. was achieved over durable single-atom and sub-nanometer Pt activated $TiO_2$ nano-array integrated catalytic converters under simulated diesel exhaust.

Compared to commercial diesel oxidation catalysts, some embodiments of the platinum group metal loaded nanoarrays described herein can provide comparable or better catalytic activity while utilizing a reduced amount of platinum group metals (PGMs). Since PGMs can be expensive, reducing the amount of PGMs can reduce costs. Without wishing to be bound by theory, this is believed to result from the high degree of dispersion of the PGM on the titanium dioxide nanoarray.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1A is a schematic illustration of integration process of $Pt/TiO_2$ nanowire array forest onto ceramic monoliths and physicochemical and catalytic characteristics of such DOC catalytic converters. FIG. 1B is an XRD pattern of rutile $TiO_2$ nano-array integrated cordierite monolith. FIG. 1C is cross-sectional (left) and top (right) view SEM images of rutile $TiO_2$ nano-arrays on a cordierite honeycomb; inset: low-magnification cross-sectional view of cordierite substrate interface with conformably distributed $TiO_2$ nanowire forest. FIG. 1D is a HAADF STEM image of a rutile nanowire bundle. FIG. 1E is a bright field HR-TEM images of a rutile nanowire bundle. The arrays of dark spots on the HAADF-STEM image (FIG. 1D) identified the mesoporosity of the $TiO_2$ nano-arrays.

FIG. 2A is ac-HAADF STEM images of $Pt/TiO_2$ nano-arrays prepared by microwave-assisted dip-coating (sample Array-0.71-D) before and after hydrothermal aging at 700° C. for 100 hours. The bright dots on the surface of $TiO_2$ are Pt atoms. FIG. 2B is graphs showing DOC activity in the CDC simulated exhaust of SASN $Pt/TiO_2$ nano-array (0.71 gPt $L^{-1}$) and Pt nanoparticles/$TiO_2$ nano-array (1.73 g Pt $L^{-1}$). FIG. 2C is graphs showing DOC activity in the LTC-D simulated exhaust of SASN $Pt/TiO_2$ nano-array (1.77 gPt $L^{-1}$) and a commercial DOC sample (4.66 $g_{PGM}$ $L^{-1}$). FIG. 2D is a graph and chart showing sulfur-poisoning effects on the DOC activity in the LTC-D simulated exhaust of SASN $Pt/TiO_2$ nano-array (1.77 gPt $L^{-1}$).

FIG. 4A is a chart showing a summary of the light-off temperatures for CO and $C_3H_6$ oxidation in the corresponding gas mixtures CO/$C_3H_6$ and $O_2$(Method section). The performance of aged samples which were hydrothermal aged at 700° C. for 100 hours in a gas stream of 12% $O_2$, 6% $CO_2$, 6% $H_2O$, and $N_2$ balance were included to demonstrate the hydrothermal stability. FIG. 4B is a schematic illustration highlighting efficient mass transport in nano-array catalyst. Well-spaced structure of the $TiO_2$ support is also expected to mitigate sintering of Pt.

In FIGS. 5A-D, the estimated fraction of open entrance area of a commercial DOC catalyst using 600 cells per square inch (CPSI) cordierite monoliths is only ~53% compared to 76% for that of the bare cordierite substrate, while nano-array described herein integrated one almost retained the entrance area with ~72%. Therefore, the frontal entrance reduction is ~4.7% for the nano-array integrated catalytic converter, ~1/7 of that of washcoated catalyst.

FIGS. 10A-C show mechanical stability evaluation of $TiO_2$ nano-array/cordierite monolith. FIGS. 10A and 10B are top-view SEM images of $TiO_2$ nano-array/cordierite monolith before (FIG. 10A) and after (FIG. 10B) 3-hour sonication in a water bath at 44 kHz, showing negligible morphology changes of $TiO_2$ nano-array due to ultrasonic vibration. FIG. 10C is a graph showing weight-loss over time of hydrothermally aged $TiO_2$ nano-array and commercial DOC samples.

FIG. 15A is an HAADF image of Pt nanoparticles/$TiO_2$ nano-array monolith, prepared via atomic layer deposition of Pt over $TiO_2$ nano-array monolith. FIG. 15B is a corresponding particle size histogram of Pt nanoparticles/$TiO_2$ nano-array monolith, prepared via atomic layer deposition of Pt over $TiO_2$ nano-array monolith.

FIG. 16A: Array-0.53-I; FIG. 16B: Array-0.53-D; FIG. 16C: Array-0.71-I; FIG. 16D: Array-1.78-I; FIG. 16E: summary of light-off temperature.

FIGS. 23A and 23B are HAADF STEM cross-section images of the $Pt/TiO_2$ nanowire array using 50 cycle ALD Pt. The array of dark spots indicates the unique mesoporosity of the $TiO_2$ nanowire. White spots indicate Pt particles. FIG. 23C is light-off curves for propane oxidation for $Pt/TiO_2$ nano-array with different Pt loading.

FIGS. 25A and 25B are SEM images. FIG. 25C is an XRD. FIG. 25D is an HRTEM. FIG. 25E is a pore size distribution and $N_2$ isotherm. FIG. 25F is an HAADF-STEM of cross-sectional sample.

FIGS. 26A-H show TEM and STEM characterization of ALD $Pt/TiO_2$ nanoarray. FIG. 26A is a TEM of 1 cycle. FIG. 26B is a TEM of 10 cycles. FIG. 26C is a TEM of 50 cycles. FIGS. 26D-H are HAADF and EDX elemental mapping of cross-sectional 50-cycle sample.

DETAILED DESCRIPTION

Figure 1A:
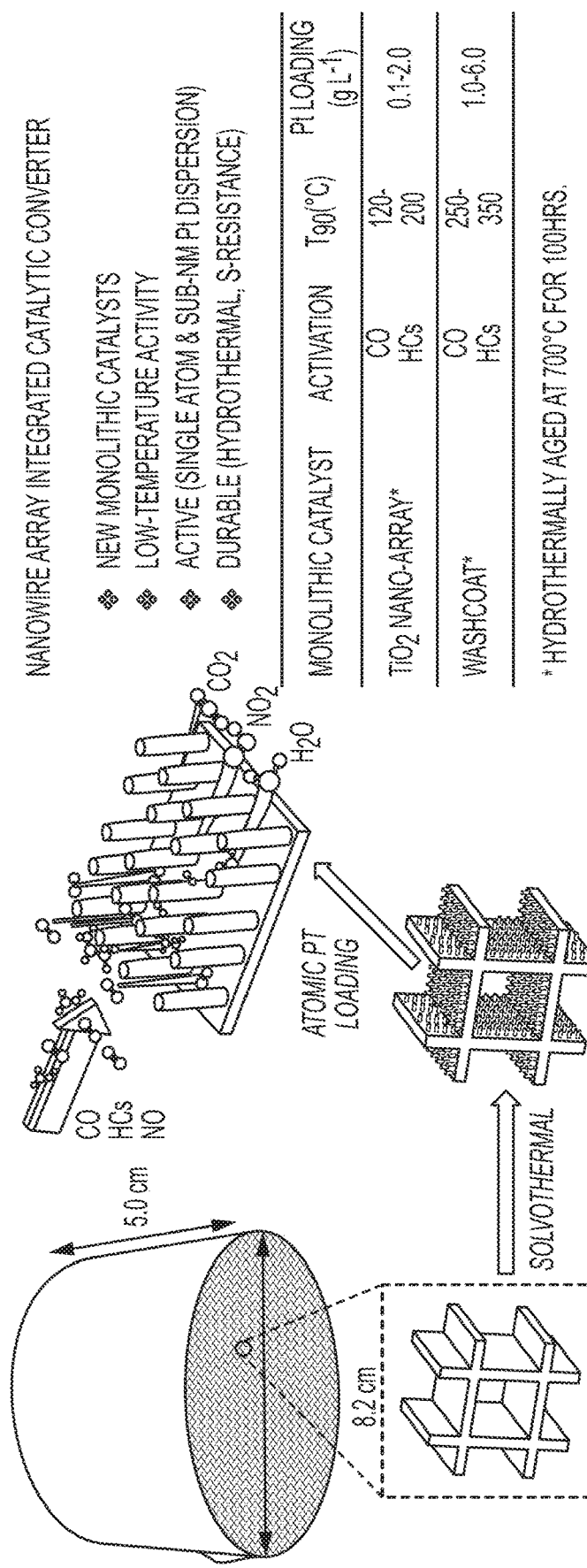
FIGS. 1A-E show the synthesis route and structure characteristics of mesoporous rutile $TiO_2$ nanowire array integrated catalytic converters.

A description of example embodiments follows.

As used herein, the term platinum group metal (PGM) refers to platinum, palladium, and rhodium, osmium, iridium, and ruthenium.

Disclosed herein are novel diesel oxidation catalysts using $TiO_2$ nano-array integrated monolithic substrates. Diesel oxidation catalysts are one of the most critical components in the after-treatment system for removing automobile emissions such as CO and hydrocarbons. The catalysts can also convert NO to $NO_2$ to help downstream selective $NO_2$ reduction to $N_2$.

Starting in 2017 and continuing through 2025, US federal regulations (Federal Register. 2012; Vol. 77, pp 62623-63200) will set new standards, aiming to reduce greenhouse gases and improve fuel economy for light duty vehicles. Current advances in engines and powertrain technologies can increase fuel efficiency significantly, but at the same time reduces exhaust temperature enough to compromise the functionality of current diesel oxidation catalysts (DOCs). Therefore, it is critical to develop advanced DOCs that function at low temperatures to ensure advanced combustion technologies can be implemented while still meeting the stringent emissions regulations. Stationary diesel engines including standby generator sets, on-site prime and distributed energy power systems were usually only regulated by state and local permitting authorities. However, this situation has changed since 2011 with the new federal regulations, Tier 4 Emission Regulations, set by the Environmental Protection Agency. Currently, diesel oxidation catalysts rely on Platinum group metal supported metal oxide nanoparticle powders, which are wash-coated on cordierite monoliths. However, this current wash-coat technology has a number of disadvantages: it lacks the control over the catalyst's physical and chemical structures, uniformity of the catalytic coating layer, and adhesion of the catalyst to the substrate. These disadvantages result in suboptimal material utilization efficiency and suboptimal catalytic performance.

The novel diesel oxidation catalysts disclosed herein utilize $TiO_2$ nano-arrays that are directly integrated with monoliths as a mechanically stable and thermally stable support for Platinum group metal (PGM) catalysts such as Pt, Pd, and Rh. The unique mesoporous nano-array structure disclosed herein enhances gas-solid interaction, metal-support interaction, and PGM dispersion, thus improving the low-temperature catalytic activity and material usage efficiency.

The disclosed novel $TiO_2$ nano-array based catalysts shows exceptional low-temperature activity that cannot be achieved by conventional catalysts; therefore, they are particularly useful for the new generation of fuel efficiency vehicles with reduced exhaust temperature. The catalysts can also be employed to remove emissions from diesel-fueled power plants and portable diesel generators.

Oxidation of hydrocarbons in diesel exhaust is becoming a bigger area of concern because of the increasing interest in lower operating temperatures and because of lower combustion efficiency during cold starts until the engine warms up. These are important factors to be addressed by clean diesel technology.

There are three common crystal forms of $TiO_2$: anatase, brookite and rutile. Most DOCs use the anatase or brookite high energy forms because they have been assumed to be more catalytically active than the most stable rutile phase which has been assumed not to be as active.

Disclosed herein is a method of making improved rutile $TiO_2$: via a solvothermal process.

The $TiO_2$ nano-array based catalysts disclosed herein provide advantages of exceptional low-temperature catalytic activity, mechanical stability (adhesion), thermal stability, material utilization efficiency, and tunable activity.

The $TiO_2$ nano-arrays disclosed herein have a unique mesoporous structure that facilitates gas-solid interaction, increases PGM dispersion, and enhances metal-support interactions. The $TiO_2$ nano-arrays disclosed herein display exceptional low-temperature catalytic activity.

The $TiO_2$ nano-arrays are grown directly on monolithic substrates using a wet chemistry method; therefore, they have better adhesion/mechanical stability compared to that of coated powder layers employed in conventional catalysts. It is a further aspect of the technology disclosed herein to tune synthesis conditions to produce rutile $TiO_2$, which is the most thermally stable form of $TiO_2$. The disclosed tuning allows one to control the morphology, thickness, and porosity of the $TiO_2$ nano-arrays, thus control their catalytic activity. Due to optimization in the $TiO_2$ nano-array growth and platinum group metal loading, catalysts prepared as disclosed herein offer comparable or even better reactivity compared to conventional catalysts while using much lower amounts of materials.

According to the state of the art in the field of this disclosure, the catalytically active form of $TiO_2$ is generally considered to be anatase. The technology disclosed herein describes efficient catalytic activity for the rutile or lowest energy form of the $TiO_2$ material. This rutile form of catalyst has a unique mesoporous structure.

The material offers comparable or better reactivity compared to competing catalysts while using less material, for example, less precious metal such as Pt.

Figure 21:
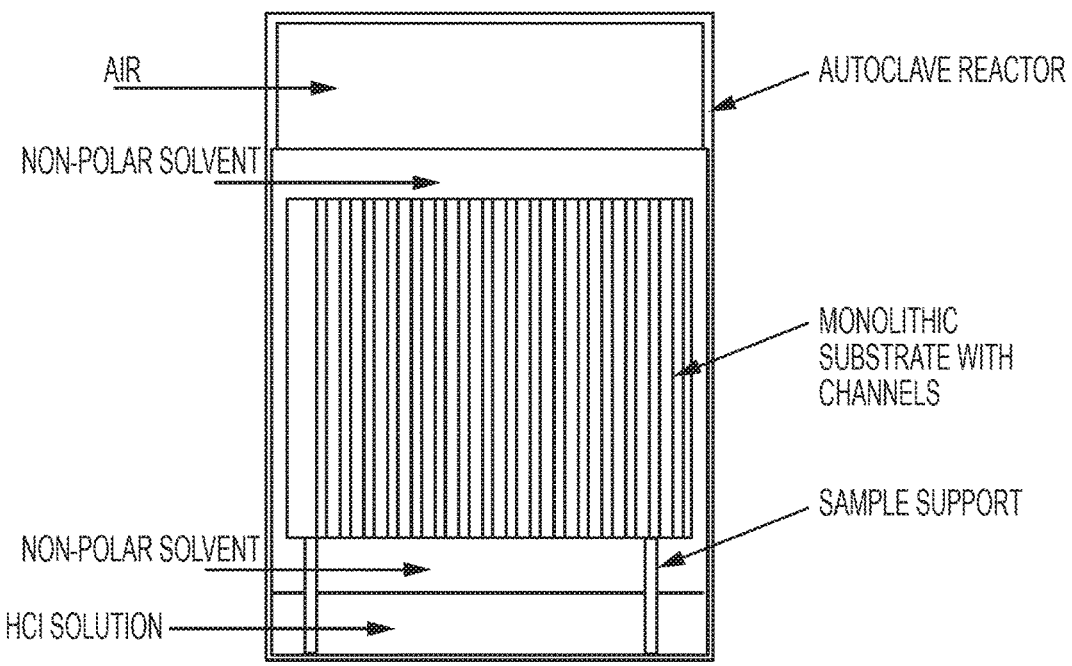
FIG. 21 is a schematic for a solvathermal synthesis of a $TiO_2$ nanoarray on a cordierite honeycomb monolith.

FIG. 21 shows a schematic for hydrothermal synthesis of a $TiO_2$ nanoarray on a cordierite honeycomb substrate. Some embodiments employ an acid-resistant support to position the substrate in the non-polar solvent layer. This helps prevent direct contact with the HCl solution layer on the bottom of the reactor, thus limiting corrosion of the substrate. During the solvothermal reaction, the $TiO_2$ nanoarrays are grown via nonpolar solvent/hydrophilic solid substrate interfacial reaction. At room temperature, titanium (IV) precursors and water are separated since the Ti precursors are dissolved in the nonpolar solvent. Under hydrothermal conditions, water diffuses away from the high-energy water/nonpolar solvent interface to the hydrophilic $TiO_2$ nuclei on ceramic wall, where water reacts with Ti precursors, resulting in growth-crystallization of $TiO_2$.

While the examples described herein pertain to a titanium dioxide nanoarray, those of skill in the art will appreciate that the methods of dispersing a platinum group metal on the nanoarray are equally applicable to other types of metal oxide nanoarrays, such as $ZnO$, $Al_2O_3$, $CeO_2$, $Co_3O_4$, $Fe_2O_3$, $Ga_2O_3$, $MnO_2$, $LaCoO_3$, $LaMnO_3$, $CuO$, and others.

While separate experiments are described as microwave-assisted dip coating and sodium (Na)-promoted wet incipient impregnation method, aspects of these two processes can be combined. For example, the titanium oxide nanoarray can be contacted with a solution that includes a platinum group metal precursor and sodium, and subsequently dried in a microwave. Microwaves commonly operate at about 2.4 GHz, but can be varied to operate from about 915 MHz to about 7.0 GHz.

Effective catalytic oxidation of CO, hydrocarbons (HCs), and nitrogen oxides ($NO_x$) at low-temperature is sought for increasingly more efficient engines and their corresponding emissions control devices such as diesel oxidation catalysts (DOCs) (1, 2), three-way catalysts (TWCs) (3), selective catalytic reduction (SCR) of $NO_x$ catalysts (4), and lean $NO_x$ traps (LNT) (5). Discovering novel low-temperature emission solutions could enable efficient engine technologies that operate in the low-temperature combustion (LTC) regime where $NO_x$ and particulate matter (PM) emissions are reduced, but CO and HC emissions are significant (6); additionally, benefits during cold start would naturally occur with these novel technologies.

In searching for low-temperature automotive catalysts, promising results have been shown using gold (7-9) and metal oxides such as $Co_3O_4$ (10, 11), Co—Cu—Ce mixed oxides (1), and La based-perovskites (2). Unfortunately, these catalysts have poor hydrothermal stability and are sensitive to sulfur poisoning. Recently, single atom and sub-nanometer platinum-group metal (PGM) catalysts (SA-SNCs) have demonstrated interesting catalytic properties, which cannot be achieved with the nanometer-size counterparts, such as CO oxidation at cryogenic temperature (12). The SA-SNCs also offer high selectivity and reactivity due to high metal dispersion, fewer types of active sites, low-coordination environments, quantum size effects, and enhanced electronic metal-support interactions (12-15). However, these studies so far have been limited to model reactions such as CO oxidation and water gas shift on a small amount of powder-form catalysts. There has yet to be an evaluation of SA-SNCs in practical and field-size catalytic reactors using a realistic synthetic exhaust stream, although such a real-world demonstration is necessary to bring this scientific advancement to technological applications.

In practice, automotive catalytic converters extensively employ $\gamma$-$Al_2O_3$ and $CeO_2$ supported PGM nanoparticle catalysts that are washcoated on channeled honeycombs to facilitate gas-solid interaction and surface catalytic reactions while maintaining minimal pressure drop during exhaust flow (16). However, this industry standard washcoat technology does not allow control over the physical arrangement and chemical structures of catalysts, their uniformity, and mechanical integrity; therefore, with a novel technique there is an opportunity to improve material utilization efficiency, device durability, and catalytic performance (17). Recently, we have demonstrated a novel catalytic coating technology that grows the catalyst metal oxide support layer as a nanostructured array (nano-array) directly on the honeycomb substrates. This high surface area support can then anchor the catalytically active metals or metal oxides. A generic and scalable approach such as hydrothermal synthesis has been developed to directly grow nano-arrays of $TiO_2$, ZnO, $Co_3O_4$, $CeO_2$, and La-based perovskites onto ceramic or metal honeycomb channel surfaces (17-23). With well-defined geometry, thickness, uniformity, and chemical compositions in the nano-arrays, these new types of catalytic converters have displayed excellent durability and catalytic performance superior or comparable to wash-coated catalysts while reducing the PGM usage. Additionally, the few microns in nano-array forest height, compared to 20-200 μm of washcoat thickness in a commercial catalytic converter, leads to larger device entrances for exhaust flow, thus minimizing pressure drop (FIGS. 5A-D).

In this report, we demonstrated durable single atom and sub-nm Pt supported on titania nano-array integrated catalytic converters with high CO and hydrocarbon oxidation activity under diesel-relevant conditions. For the first time, SASN Pt catalyst has been successfully dispersed on three-dimensional mesoporous rutile $TiO_2$ nano-arrays and robustly integrated with large full-size channeled monoliths. This new type of diesel oxidation catalyst demonstrated remarkable low-temperature activities under simulated exhaust conditions, excellent durability including mechanical and hydrothermal stability, as well as S-tolerance and superb material utilization efficiency, as illustrated and summarized in FIG. 1A. The nano-array catalysts were evaluated under industry-defined simulated exhaust conditions (24) and under heavy duty diesel (HDD) engine transient dynamic cycles to evaluate the technology feasibility. We demonstrate that the temperature of 90% conversion, $T_{90}$, for both CO and HCs in the clean diesel combustion (CDC) simulated exhaust evaluation approaches 160° C., 5-10° C. lower than the baseline temperature of CDC during the relevant emission control test protocol (25), and ~173° C. lower than that of a commercial DOC catalyst while using 5 times less PGM. The Pt/$TiO_2$ nano-array catalysts also exhibit very good performance under the low-temperature diesel combustion (LTC-D) simulated exhaust conditions.

Solvothermal Synthesis

In the first step, a solvothermal synthesis is used to grow $TiO_2$ nano-arrays on the substrates using (1) a non-polar solvent such as butanone, toluene, and n-hexane, (2) titanium (IV) precursors such as titanium (IV) isopropoxide, titanium (IV) n-butoxide, and titanium (IV) chloride, and (3) concentrated hydrochloric acid (36-38%).

In some embodiments, the Ti (IV) precursor is an Ti (IV) alkoxide precursor. A wide variety of alkoxide precursors are suitable, such as C1 through C10 alkoxides. In some instances, a Ti (IV) alkoxide can be a mixed Ti (IV) alkoxide, in that the molecule has different alkoxides groups (e.g., having differing numbers of carbons, positional isomers, stereoisomers). Some examples of alkoxides include butoxide, methoxide ($Ti(CH_3O)_4$), and ethoxide ($Ti(OCH(CH_3)_2)_4$).

Notably, acid-resistant support is employed to position the substrate in the non-polar solvent layer. This helps prevent direct contact with the HCl solution layer on the bottom of the reactor, thus limiting corrosion of the substrate.

During the solvothermal reaction, $TiO_2$ nanoarrays are grown via nonpolar solvent/hydrophilic solid substrate interfacial reaction as described in Feng et al., 2008 (Feng, X.; Shankar, K.; Varghese, O. K.; Paulose, M.; Latempa, T. J.; Grimes, C. A., "Vertically Aligned Single Crystal $TiO_2$ Nanowire Arrays Grown Directly on Transparent Conducting Oxide Coated Glass: Synthesis Details and Applications", Nano Letters 2008, 8 (11), 3781-3786).

At room temperature, titanium (IV) precursors and water are separated since the Ti precursors are dissolved in the nonpolar solvent. Under hydrothermal conditions, water diffuses away from the high-energy water/nonpolar solvent interface to the hydrophilic $TiO_2$ nuclei on ceramic wall, where water reacts with Ti precursors, resulting in growth-crystallization of $TiO_2$. The presence of $Cl^-$ anions is crucial for the anisotropic growth, as they tend to be absorbed on the rutile (110) plane, thus inhibiting further crystal growth of this plane. Other anions are also useful in contributing to anisotropic growth, such as $SO_4^{2-}$ (e.g., using $Ti_2(SO_4)_3$) as a precursor).

In some embodiments, the $TiO_2$ nano-arrays are relatively uniform with a thickness of ~2-3 μm and diameter of each feature is ~5-100 nm. X-ray diffraction patterns confirm that as-synthesized $TiO_2$ is rutile.

Surprisingly, the ratio of water:non-polar solvent has been discovered as contributing to production of a microporous or mesoporous structure. In particular, a water:non-polar solvent ratio from about 1:20 to about 1:5 contributes to formation of a microporous or mesoporous structure.

Resulting pore size: about 1 nm to about 50 nm, in some instances from about 5 nm to about 20 nm Resulting surface area: about 5 $m^2$/g to about 150 $m^2$/g (including substrates)

Substrates: cordierite, SiC, other ceramic; metals.

Platinum Group Metal Loading

Figure 22A:
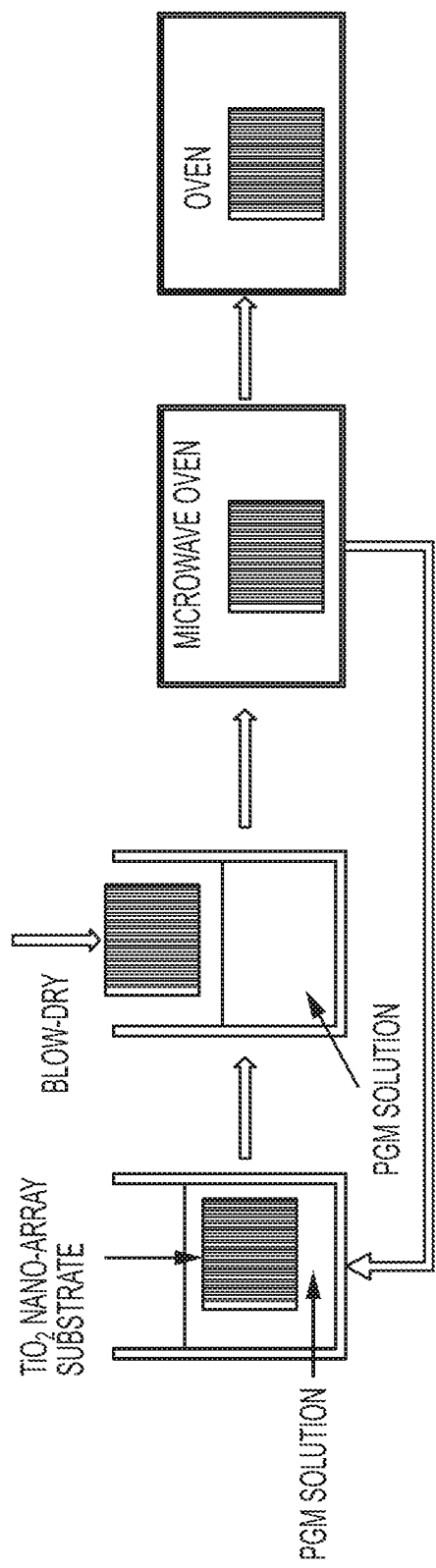
FIG. 22A is a schematic for microwave-assisted loading of a platinum group metal onto a titanium dioxide nanoarray.

FIG. 22A is a schematic of a microwave-assisted dip-coating procedure used to load platinum group metals on the $TiO_2$ nanoarrays (FIG. 22A). The substrate was first submerged into the diluted metal precursor solution. It was taken out and blow-dried. The substrate was then dried in a microwave oven for 1-3 minutes. These steps are repeated until an appropriate amount of the metal precursor was absorbed. Finally, the sample was calcined in air at 500° C. for 4 hours with a ramp rate of 2° C./min.

A metal oxide nanoarray can be contacted with a solution containing a platinum group metal precursor. Some examples of platinum precursors include $Pt(NH_3)_4(NO_3)_2$ and $HPtCl_4$.

Figure 22D:
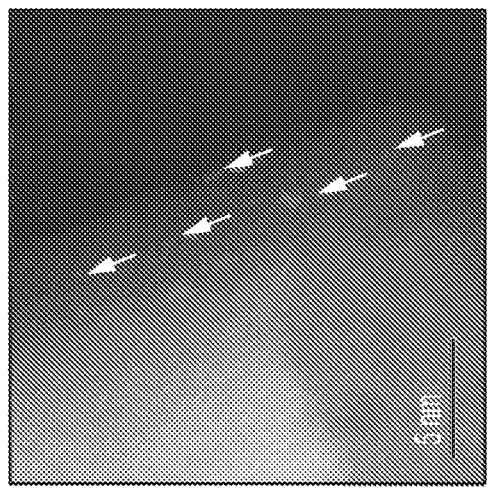
FIGS. 22B-D are HAADF STEM images of Pt supported $TiO_2$ nano-array. The red arrows in FIG. 22B indicate voids (dark spots) on the $TiO_2$ nanobunddle, demonstrating a unique mesoporous structure. The red arrows in FIG. 22C and FIG. 22D indicate Pt sites (bright spots), demonstrating that most Pt is dispersed in sub-nanometer clusters and single atom sites.
Figure 22C:
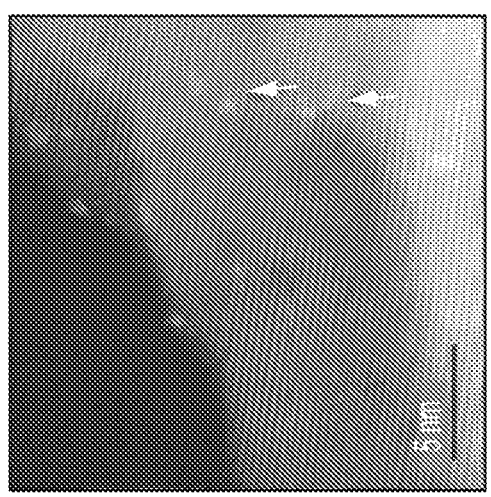
Figure 22B:
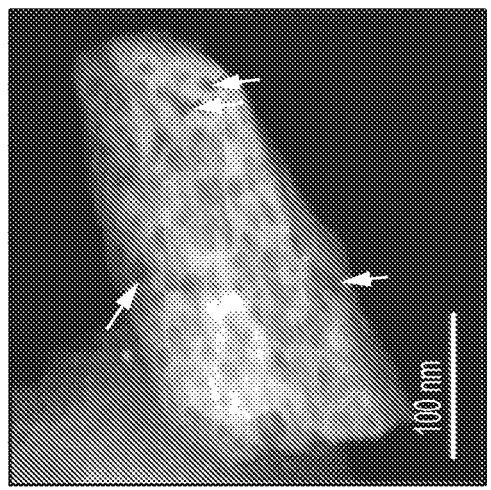

FIGS. 22B-C show typical high angular annular dark field (HAADF) scanning transmission electron microscopy (STEM) images of Pt supported on the $TiO_2$ nano-array. At low-magnification view (FIG. 22B), Pt nanoparticles are not observed, indicating that Pt is mainly distributed in sub-nanometer sites. It was further confirmed in FIGS. 22C and 22D, which clearly show Pt sub-nanometer clusters and single atom sites. These images demonstrate a unique feature of $Pt/TiO_2$ nano-array catalysts with very high metal dispersion—a high number of catalytic active sites and exceptional catalytic activity.

Catalytic Activity

Figure 4A:
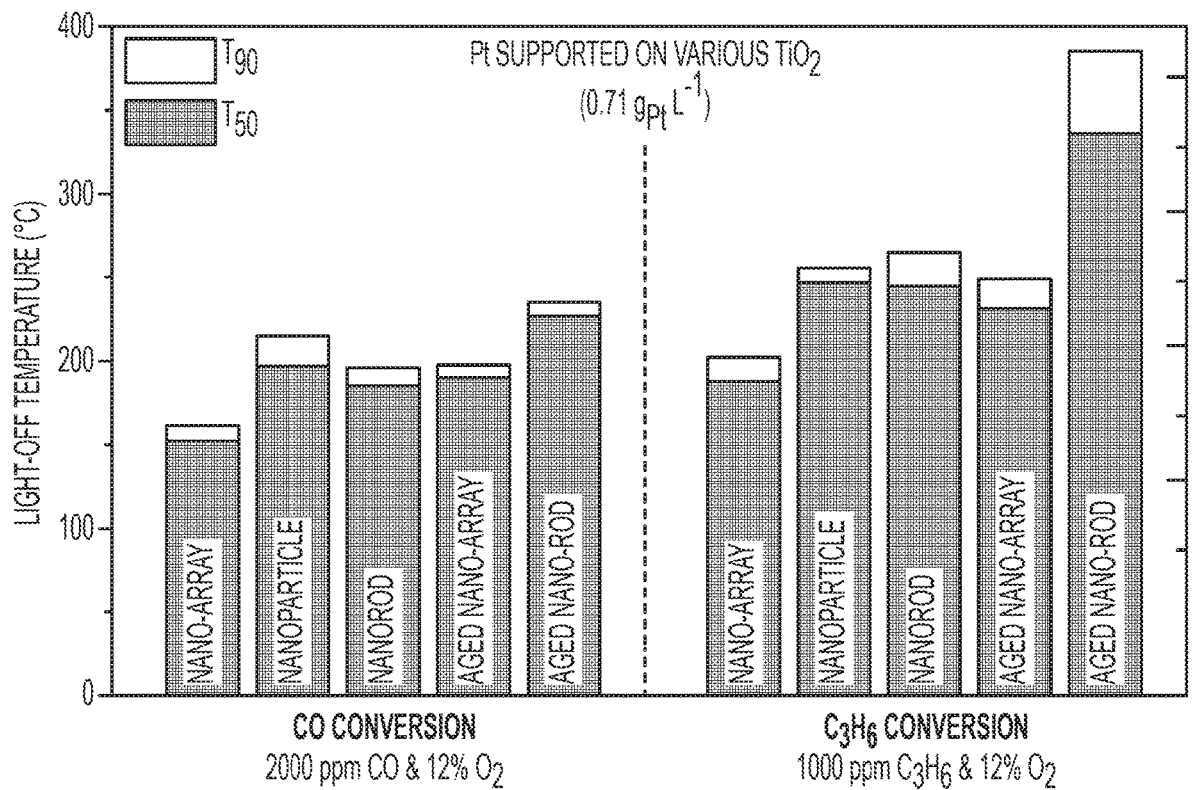
FIGS. 4A-B show catalytic oxidation of CO and $C_3H_6$ of nano-array catalysts versus washcoated nano-powder catalysts and schematic illustration of their mass transport pathways.
Figure 4B:
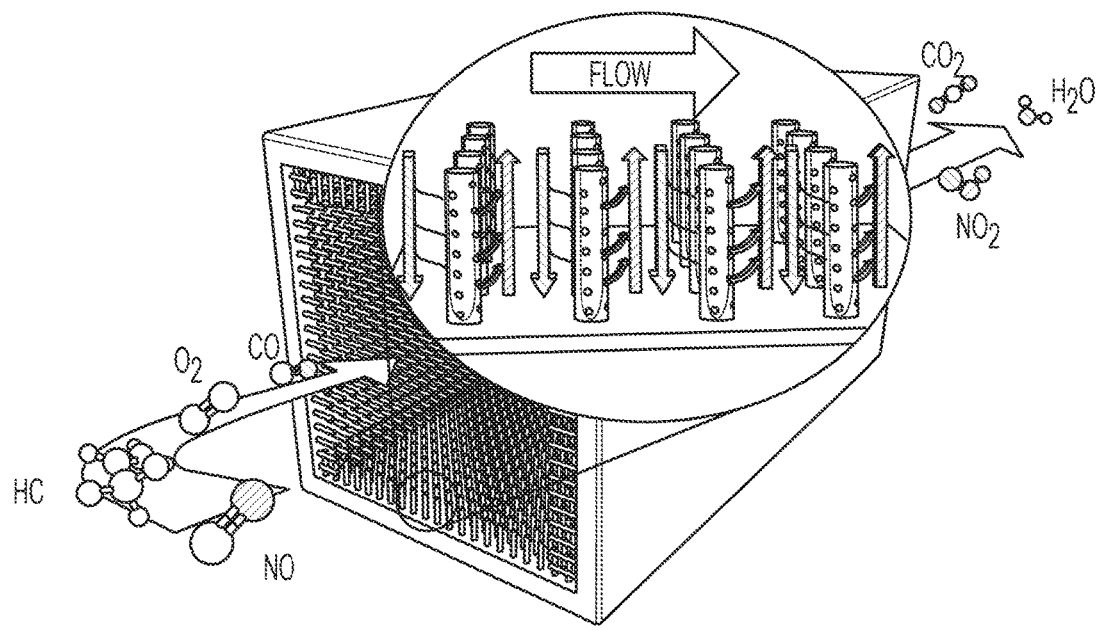
Figures 5A, 5B, 5C, 5D:
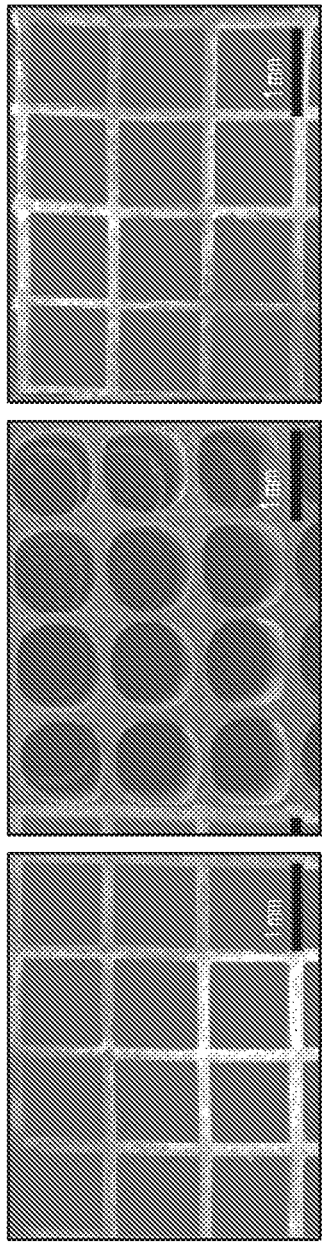
FIGS. 5A-C are top-view SEM images of channeled honeycomb monoliths with a density of 600 cell per square inch (CPSI) of bare cordierite (FIG. 5A), commercial DOC (FIG. 5B), and with $TiO_2$ nano-array coating (FIG. 5C).
FIG. 5D is a table summarizing the fraction of gas entrance for honeycomb monolithic samples with different cell density. For 600 CPI monoliths, the frontal entrance area (FEA) of monolith decreases slightly 5.3% (($FEA_{bare\ substrate}$−$FEA_{with\ TiO2\ nanoarray}$)/$FEA_{bare\ substrate}$) with the integration of the $TiO_2$ nano-array, but drops to only 30.2% with integration of conventional washcoat (commercial DOC). The coverage was determined by processing the top-view SEM images of corresponding samples using Image J software package.

Pt supported $TiO_2$ nano-array catalysts prepared as described herein were evaluated in simulated exhausts for two types of engines, namely conventional diesel combustion (CDC) and low-temperature diesel combustion (LTC-D) following a protocol developed by the ACEC (Advanced Combustion and Emission Control) tech team of USA DRIVE. A commercial diesel oxidation catalyst based on Pt—Pd supported $Al_2O_3/ZrO_2$ nano-powder wash-coat was employed as benchmark (the total Pt and Pd loading is more than 3.5 g/L). The catalytic performances are shown in FIG. 4. In both types of simulated exhaust, the Pt supported $TiO_2$ nano-arrays outperformed the commercial diesel oxidation catalyst despite using only 20% to 50% as much of the expensive PGM loading used in the commercial catalyst. The performance results for the disclosed catalysts were unexpected and unanticipated.

EXEMPLIFICATION

Example #1

Materials and Methods

Catalyst Preparation

Synthesis of $TiO_2$ Nano-Array.

The $TiO_2$ nanowires are grown on ceramic monoliths via a nonpolar solvent/hydrophilic solid substrate interfacial reaction under hydrothermal conditions. (41, 42) Typically, the washed and $TiO_2$ seeded cordierite honeycomb substrates with size up to 7.5 cm×7.5 cm×5 cm are placed within a sealed Teflon reactor (1 L), containing 500 mL of a non-polar solvent, 50 mL of a Ti (IV) alkoxide precursor, 5 mL of titanium tetrachloride (1 M in toluene), and 50 mL of hydrochloric acid (37 wt %). At room temperature, titanium (IV) precursors and water are separated since the Ti precursors are dissolved in the nonpolar solvent. Under hydrothermal conditions (e.g., 120-200° C., 1 hr-72 hr, 1.5-10 bar), water diffuses away from the high-energy water/nonpolar solvent interface to the hydrophilic $TiO_2$ nuclei on ceramic wall, where water reacts with Ti precursors, resulting in growth-crystallization of $TiO_2$. The presence of $Cl^-$ anions is crucial for the anisotropic growth, as they tend to absorb on the rutile (110) plane, thus inhibiting further crystal growth of this plane. After being taken out for the reactor, all the samples were sonicated in acetone, ethanol, and water for 3 hours to remove organic compounds and $Cl^-$ residues from the synthesis before Pt loading.

Pt Single Atoms and Sub-Nm Clusters Loading on $TiO_2$ Nano-Array/Cordierite Monolith.

We employed microwave-assisted dip-coating and Na-promoted wet incipient impregnation methods to load Pt on the $TiO_2$ nanoarrays. For dip-coating method, the substrate was first submerged into the diluted Pt precursor solution (e.g., 0.5 mg $Pt(NH_3)_4(NO_3)_2$ precursor/mL). It was taken out and blow-dried using compression air stream. The substrate was then dried in a microwave oven for 1-3 minutes. These steps are repeated until appropriate amount of the metal precursor was absorbed. Finally, the sample was calcined in air at 500° C. for 4 hours with a ramp rate of 2° C./min. For impregnation, the substrate was submerged into diluted Pt precursor (50 μg/mL) and NaOH (atomic ratio Na/Pt is 10/1), and aged for 12 hours at 80° C. The solution was then evaporated in open air at 50° C. until dry. During evaporation, the substrate was rotated every 15-20 minutes to enhance uniformity. Finally, the sample was dried at 150° C. for 12 hours and calcined in air at 500° C. for 4 hours with a ramp rate of 2° C./min.

Hydrothermal stability test. To evaluate their hydrothermal stability in the probe reactions (CO and $C_3H_6$ oxidation) and the simulated exhaust (CDC and LTC-D) tests, the monolithic catalysts were aged in a flow of 12% $O_2$, 6% $CO_2$, 6% $H_2O$ in air at 700° C. for 100 h. In the transient engine tests, the sample was aged in a flow on 10% $H_2O$ in air at 650° C. for 100 h. These aging conditions were chosen to represent a North America heavy-duty diesel application.

Catalytic Activity Evaluation

Probe Reactions (CO and $C_3H_6$ Oxidation).

The catalytic activity measurements were performed in a continuous flow reactor equipped with a gas chromatography. The monolithic catalysts (5×5 channels×2.5 cm long) were placed in a tubular quartz reactor with a surrounding electrical heating coil. The inlet temperature was measured using a 16 mm K-type thermocouple, which was fixed at <5 mm in front of the monolith. The utilization of the small thermocouple (16 mm) is to prevent disruption of gas flow. Typically, the catalytic activity of each sample was evaluated through total 6 reaction cycles, in which the inlet temperature was ramped up from 100° C. to 525° C. at 2° C. $min^{-1}$ and naturally cool down to 100° C. before next testing cycles. The feed gas mixtures were controlled by mass flow controller before entering the blender and then the reactor at a gas hourly space velocity of 30,000 $h^{-1}$. The feed gas always contains 12% $O_2$ to mimic the $O_2$ concentration in the CDC and LTC-D simulated exhaust, but varies CO and $C_3H_6$ concentrations (also were chosen to reflect the CO and total hydrocarbon concentration in the CDC and LTC-D simulated exhausts) in each cycle such that: cycle 1 and 2 contain 2000 ppm CO and 1000 ppm $C_3H_6$; cycle 3 contains 2000 ppm CO; cycles 4 contains 1000 ppm $C_3H_6$; cycle 5 contains 500 ppm $C_3H_6$; and cycle 6 contains 500 ppm CO and 500 ppm $C_3H_6$; all are balanced by $N_2$. Sample Array-50-D was evaluated in an additional sequence (cycle 3→4→5→6→1→2), showing negligible difference in the catalytic activity, thus confirming the sequence of the tests does not affect the catalytic activity of Pt supported $TiO_2$ nano-array.

Simulated Exhaust Test.

The diesel oxidation catalytic activity in the simulated exhaust conditions of catalysts were evaluated following the protocol developed by the Advanced Combustion and Emission Control (ACEC) Technical Team of USDRIVE. Simulated exhaust light-off measurements were conducted on a custom plug-flow reactor system. Micro-cores were cut and loaded into cylindrical quartz tubing using a wrapping to ensure no gas could bypass the catalyst channels. Two thermocouples were used to monitor temperatures, one placed approximately 2 cm from the catalyst front to measure inlet temperature and one placed from the rear into the central channel of the micro-core to mid-catalyst to measure the mid-catalyst temperature. Space velocity was held constant at 60,000 hr$^{-1}$ throughout all tests. Gas concentrations were determined per ACEC Tech Team (USDRIVE) protocol. The composition of the "LTC-D" simulated exhaust is [$O_2$]=12%, [$H_2O$]=6%, [$CO_2$]=6%, [$H_2$]=400 ppm, [CO]= 2000 ppm, [NO]=100 ppm, [$C_2H_4$]=833.5 ppm, [$C_3H_6$]=333 ppm, [$C_3H_8$]=111 ppm, and Ar balance. The composition of the "CDC" simulated exhaust is [$O_2$]=12%, [$H_2O$]=6%, [$CO_2$]=6%, [$H_2$]=100 ppm, [CO]=500 ppm, [NO]=200 ppm, [$C_2H_4$]=389 ppm, [$C_3H_6$]=233.5 ppm, [$C_3H_8$]=51.7 ppm, and Ar balance. Water was introduced via argon flow through a bubbler and heated lines held at 200° C. Product gas stream was measured via MKS FTIR. Experiments were conducted first with a degreening step in only the $O_2$, $CO_2$, and $H_2O$ components of the gas stream at 700° C. for 4 hours for LTC-D and 550° C. for 4 hours CDC protocols, followed by an evaluation step from 100° C. to 500° C. at a rate of 2° C./min.

Effects of Sulfur Poisoning.

Sulfur poisoning effects on the catalyst performance were evaluated following USDRIVE's protocol (24). The catalyst was exposed to 5 ppm $SO_2$ added to the full simulated exhaust at a space velocity of 30,000 h$^{-1}$ and 300° C. catalyst inlet temperature for 5 hours. A total sulfur exposure level of 1 g sulfur per liter of catalyst was estimated following this exposure condition. Poisoning was conducted following the pretreatment in which the catalyst was annealed at 600° C. for 20 minutes before cooled down to 300° C. in 12% $O_2$, 6% $H_2O$, 6% $CO_2$, and $N_2$ balance. After sulfur exposure, $SO_2$ was removed from the feed and the sample cooled to 100° C. at which point the catalyst performance was evaluated. For de-sulfation, the catalyst was annealed at 700° C. in 3% $H_2$ and 1% CO in $N_2$ for 30 mins, following by calcination in air at 500° C. for 2 hours.

Transient Exhaust Test.

Figure 17:
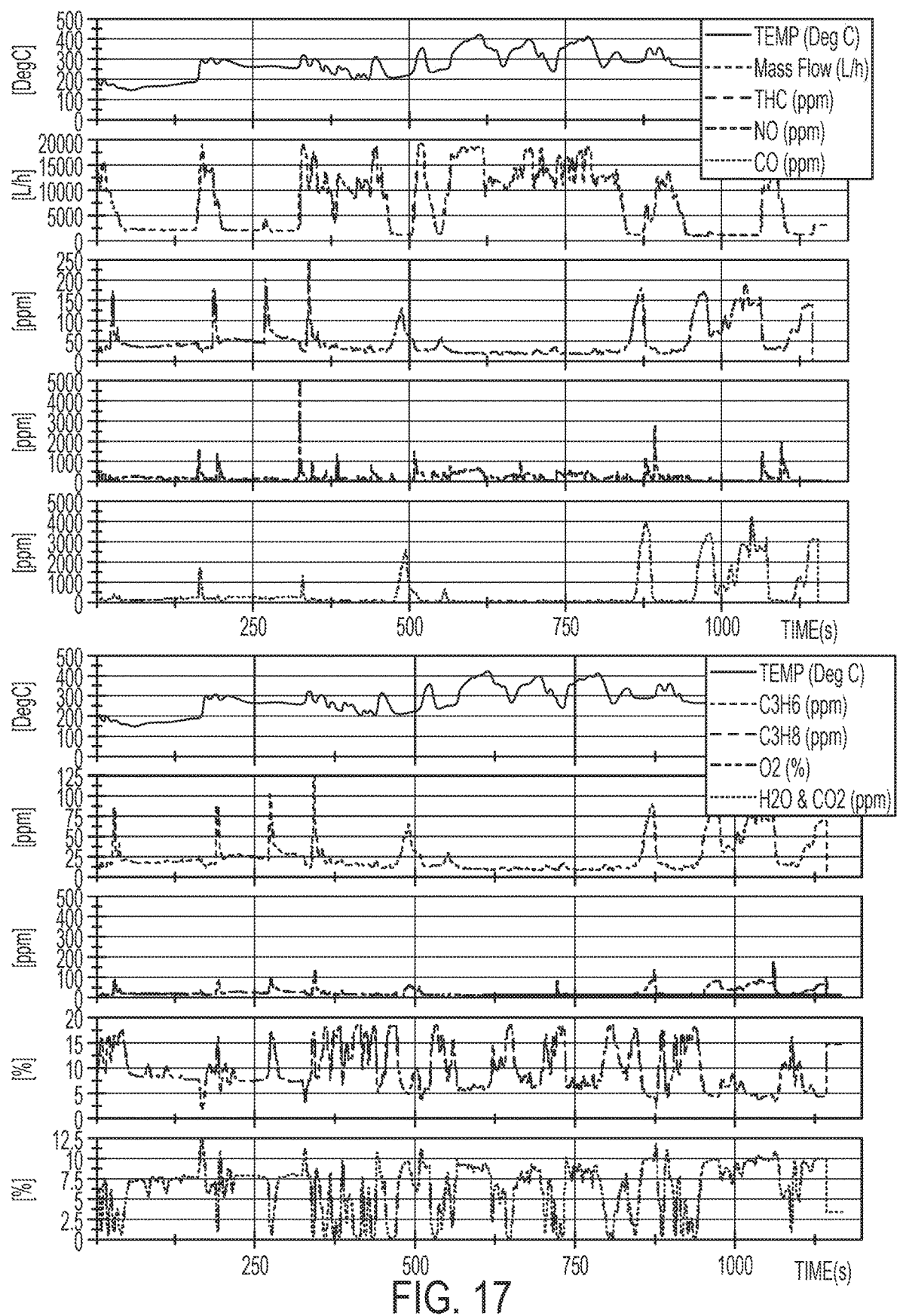
FIG. 17 is graphs of the characteristics of the transient feed gas.

The Pt/$TiO_2$ nano-array sample with a Pt loading of 0.53 g L$^{-1}$ and dimensions of Φ 2"×3" were tested under highly transient feed gas conditions mimicking a heavy-duty diesel (HDD) federal test procedure (FTP) as running on a HDD certified 2010 Cummins ISB (6.7 L) 320 hp engine. The characteristic of the transient feed gas is provided in FIG. 17. The Pt/$TiO_2$ nano-array and reference samples were aged at 650° C. for 100 h in 10% steam/air flow to a representative end of life condition for a North American HDD application.

Catalyst Characterization

The nitrogen adsorption-desorption isotherms and hydrogen chemisorption were performed on a Micromeritics ASAP 2020 Physisorption automated surface area and pore size analyzer at liquid nitrogen temperature. The specific surface area and pore size measurements were calculated by the Brunauer-Emmett-Teller (BET) method and Barret-Joyner-Halenda (BJH) method, respectively. Before $N_2$ adsorption-desorption isotherm measurement, the samples were degassed at 350° C. for 4 h under vacuum.

The morphology and structure of catalysts were characterized by electron microscopies. Scanning electron microscopy images were taken using FEI Teneo low vacuum SEM and a JEOL 6335F field emission SEM, operating at 10-20 kV. Transmission electron microscopy (TEM) including both bright field and high angular annual dark field (HAADF) images and energy-dispersive X-ray spectroscopy for composition distribution were taken using a FEI Talos STEM and a Tecnai F30 STEM. Sub-angstrom resolution HAADF STEM images were obtained on a JEOL JEM 2200FS STEM/TEM, equipped with a CEOS (Heidelburg, Ger) probe corrector, and a nominal image resolution of 0.07 nm, and on a JEOL JEM-ARM200F STEMITEM, also equipped with a CEOS probe corrector, with a guaranteed resolution of 0.08 nm.

X-ray diffraction (XRD) patterns of the samples were collected by a Bruker D2 Phaser using Cu Kα radiation (λ=0.15418 nm) operated at 40 kV and 40 mA. The XRD data were recorded for 2θ values from 10° to 800 with an interval of 0.02°.

The platinum dispersion ($D_{Pt}$) was determined by $H_2$ chemisorption at 35° C. on a Micromeritics ASAP 2020. Catalysts were reduced in $H_2$ at 300° C. for 2 h and then outgassed 2 h at 150° C. prior to performing gas chemisorption experiments. Hydrogen uptake was determined using the double isotherm method: the first isotherm gave the total gas uptake, (HC)$_T$ and the second one, obtained after 2 h of evacuation, the "reversible" or weakly adsorbed gas, (HC)r. By taking the difference between isotherms, the amount of "irreversible" or strongly adsorbed gas, (HC)i, was determined. The pressure range of isotherms was 0-12 kPa and the extrapolation to zero pressure was used as a measure of the gas uptake. An atomic (HC)i/Pts=1 ratio, where Pts implies a Pt atom on surface, was used to calculate $D_{Pt}$ (44).

Mechanical Stability Test.

To evaluate the mechanical stability of $TiO_2$ nano-array integrated cordierite honeycomb samples, a sonication experiment was conducted on both $TiO_2$ and Pt/$TiO_2$ nano-array samples before and after hydrothermal aging at 700° C. for 100 h. The samples were sonicated in water at 40 kHz for 3 hours and weighed before and after the sonication. Little morphology change (in SEM) was observed and the weight loss after the sonication process is less than 1 wt. % for both fresh and aged samples, indicating the sound honeycomb structure integrity and the superior adhesion of $TiO_2$ and $TiO_2$/Pt nano-arrays on the honeycomb monolith channel walls.

Results and Discussion

As a typical support material for catalytic oxidation of CO and HCs (26, 27), $TiO_2$ has three polymorphs: anatase, brookite, and rutile). Most diesel oxidation catalysts use the anatase or brookite high energy forms as they are assumed to be more catalytically active than the rutile phase. The rutile phase is the most thermodynamically stable and thus is an appropriate candidate catalytic support to survive the harsh working conditions of high temperature and pressure. However, it also typically has low surface area, limiting its practical functionality.

Figure 1B:
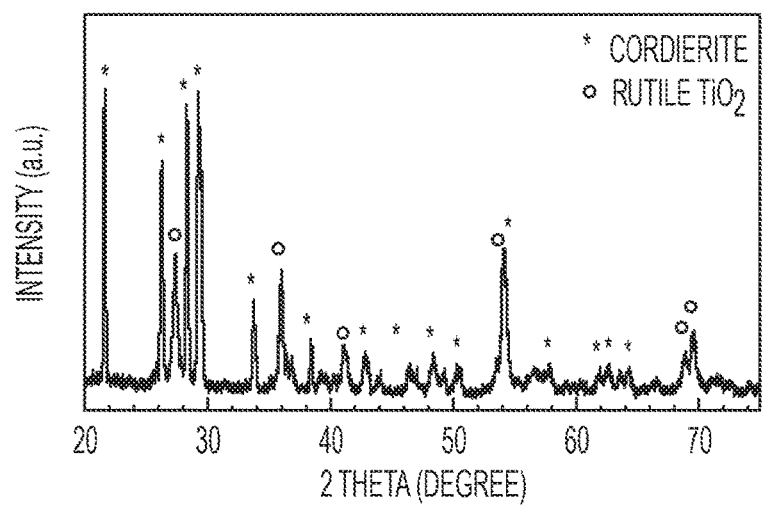
Figure 1C:
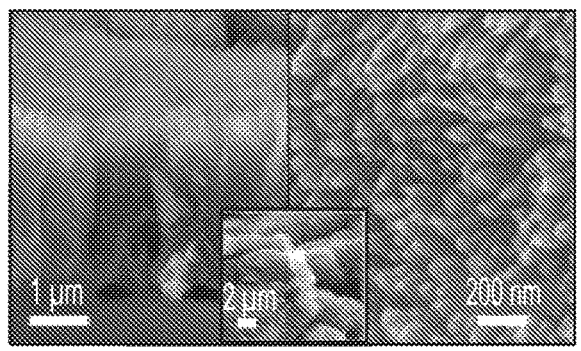
Figure 1D:
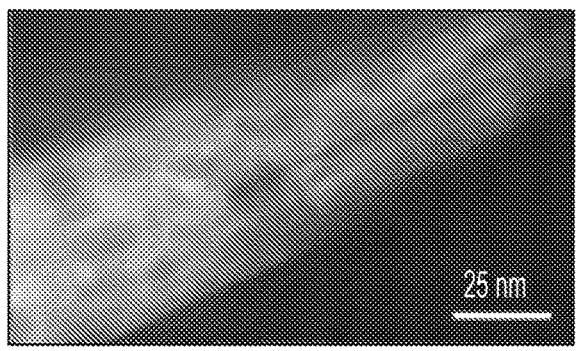
Figure 1E:
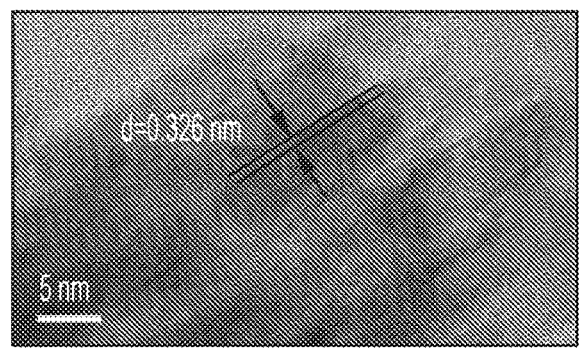
Figure 6B:
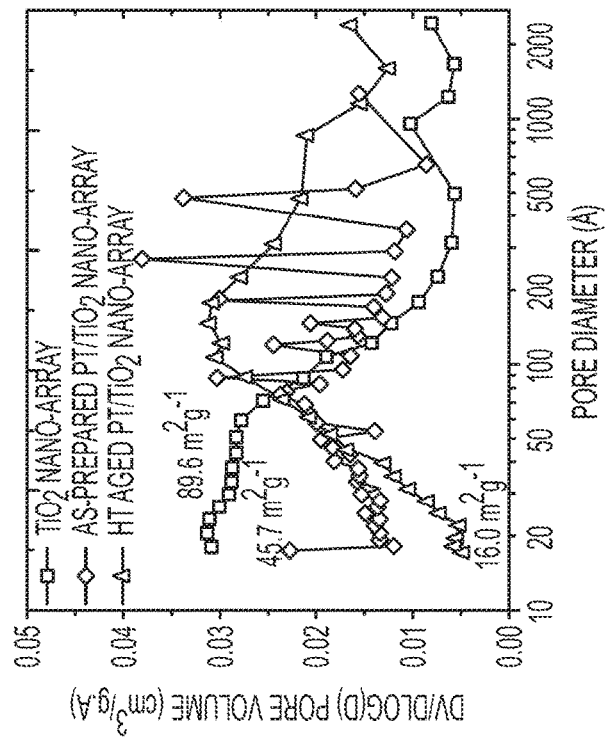
FIG. 6B is a graph showing the BJH pore-size distribution of $TiO_2$ nano-array: as-prepared, after Pt loading (including calcination), and after hydrothermal aging.
Figure 6A:
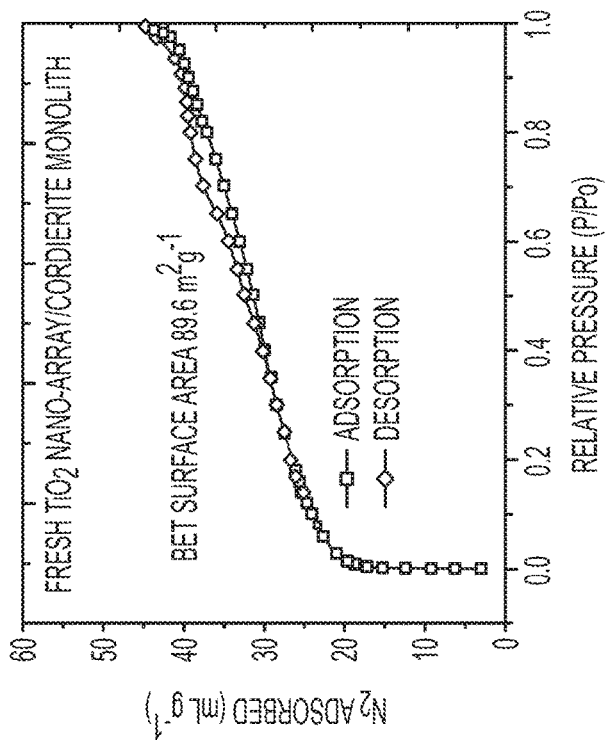
FIG. 6A is an $N_2$ isothermal adsorption-desorption as-prepared $TiO_2$ nano-array/cordierite substrates using Butanone as solvent.
Figure 6E:
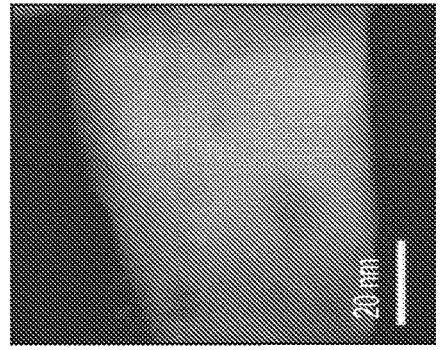
FIGS. 6D and 6E are HAADF of $Pt/TiO_2$ nano-array before (FIG. 6D) and after (FIG. 6E) hydrothermal aging indicating the closure of some mesopores (dark spots). Note: sample was hydrothermal aged at 700° C. for 100 h in 12% $O_2$, 6% $H_2O$, 6% $CO_2$, and balance $N_2$.
Figure 6D:
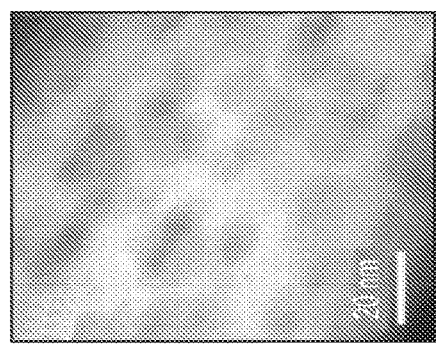
Figure 6C:
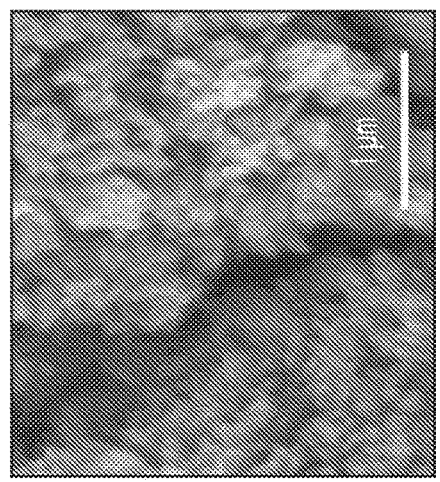
FIG. 6C is an SEM image of hydrothermal aged $Pt/TiO_2$ nano-array indicating well-retained nano-array structure.
Figure 7A:
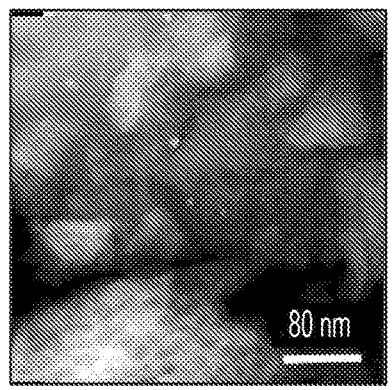
FIG. 7A is an HAADF STEM image of $Pt/TiO_2/SiO_2$/cordierite sample.
Figure 7B:
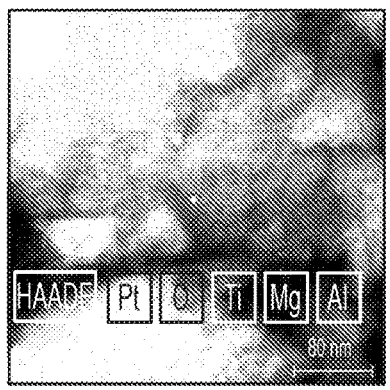
FIGS. 7B-H are the corresponding elemental mappings for FIG. 7A.
Figure 7C:
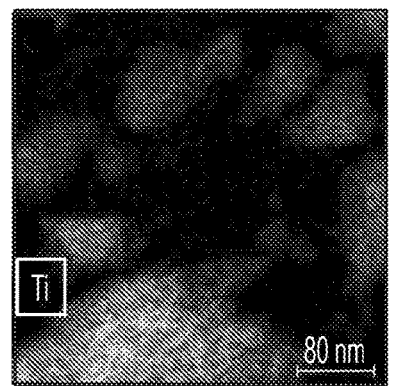
Figure 7D:
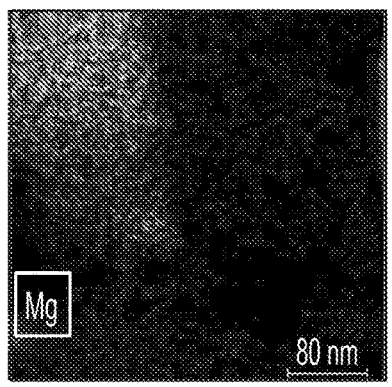
Figure 7E:
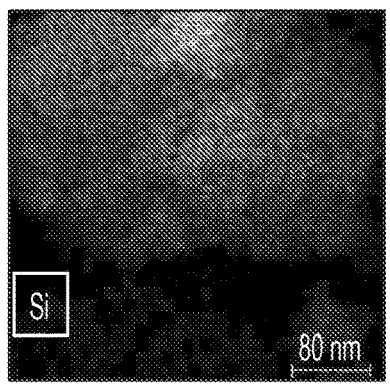
Figure 7F:
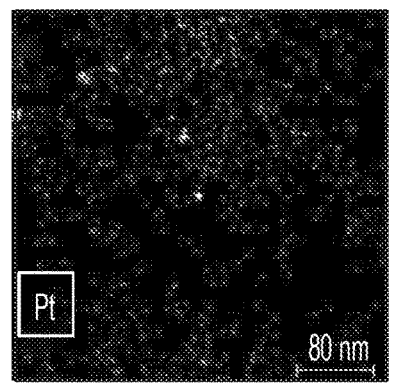
Figure 7G:
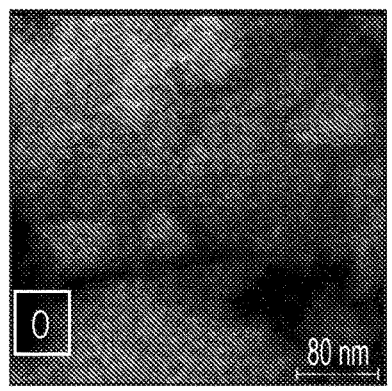
Figure 7H:
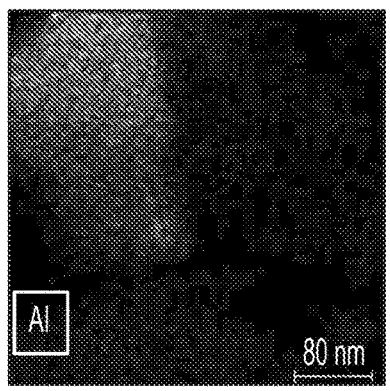
Figure 7I:
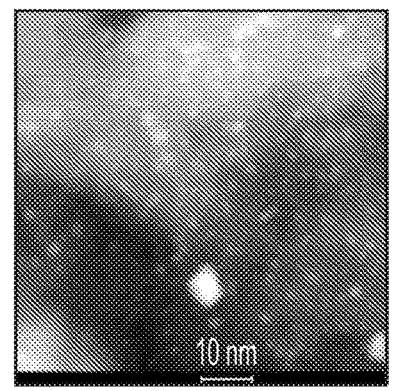
FIG. 7I shows the magnified view of the Pt/$SiO_2$ area—the area in the red box in FIG. 7A. The $SiO_2$ was formed via acidic etching Fe, Mg, and Al from cordierite (a magnesium iron aluminum cyclosilicate). We noticed that Pt nanoparticles were mainly deposited on the $SiO_2$ area. Very few-to-none Pt nanoparticles are visible in the $TiO_2$ area.
Figure 8A:
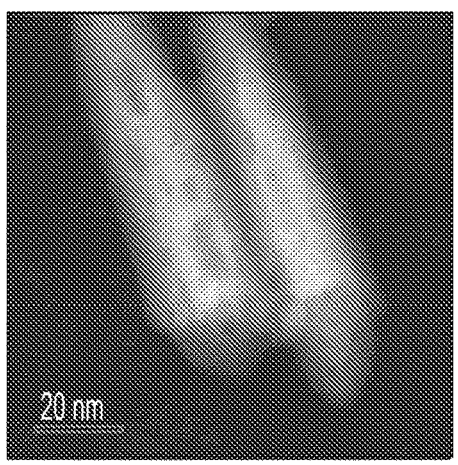
FIGS. 8A-F are Ac-HAAD STEM images of $Pt/TiO_2$ nano-array prepared by Na-promoted wet impregnation. Few Pt nanoparticles were occasionally found (FIG. 8B), the majority Pt was distributed as sub-nm clusters (FIGS. 8C and 8D) or single atoms (FIGS. 8E and 8F).
Figure 8B:
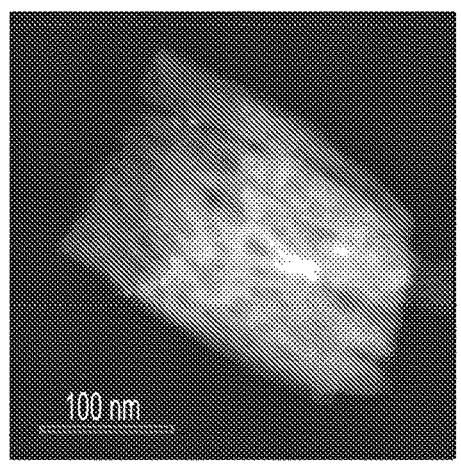
Figure 8C:
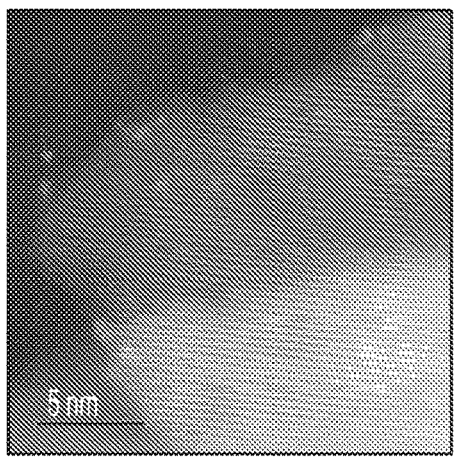
Figure 8D:
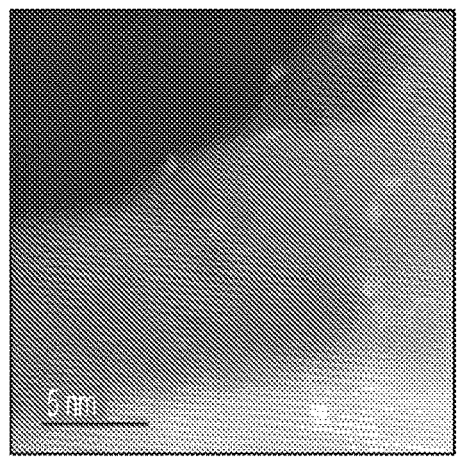
Figure 8E:
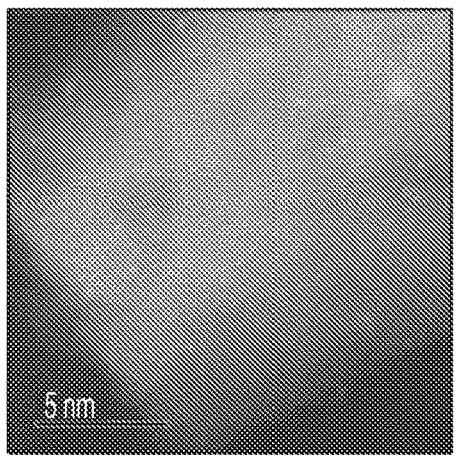
Figure 8F:
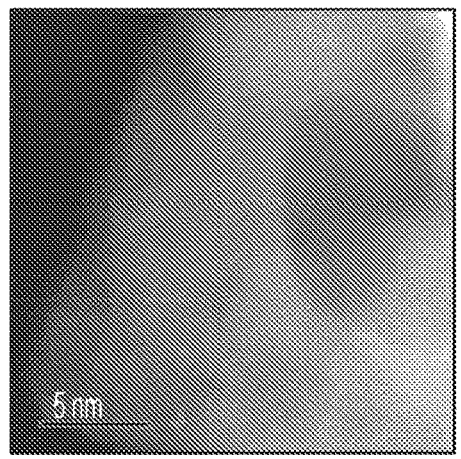
Figure 9A:
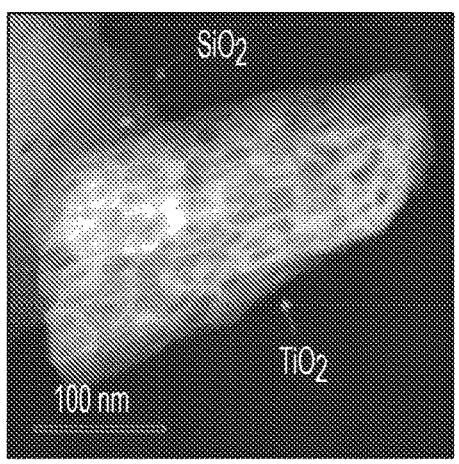
FIGS. 9A-F are Ac-HAAD STEM images of $Pt/TiO_2$ nano-array prepared by microwave-assisted dipcoating. Pt nanoparticles were mainly deposited on the adjacent $SiO_2$ area while very few were visible on $TiO_2$ (FIGS. 9A and 9B). On $TiO_2$, Pt was dominantly distributed as subnanometer clusters (FIG. 9C) and single atoms (FIGS. 9D-F).
Figure 9B:
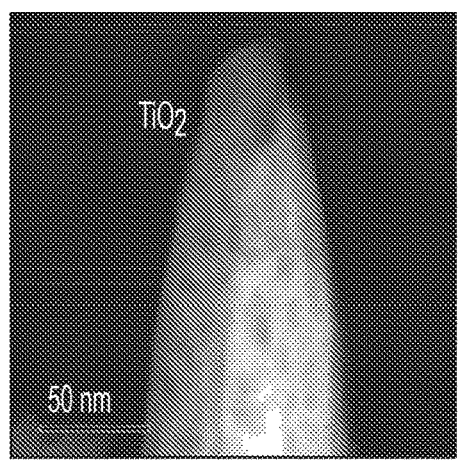
Figure 9C:
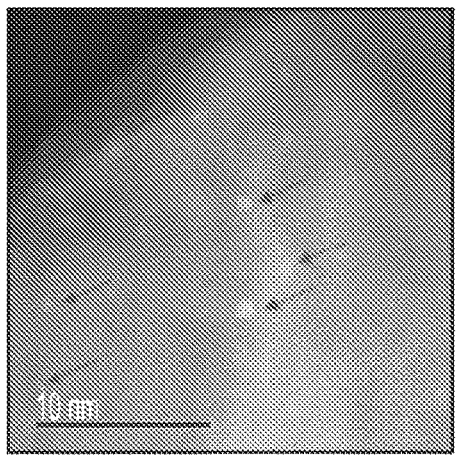
Figure 9D:
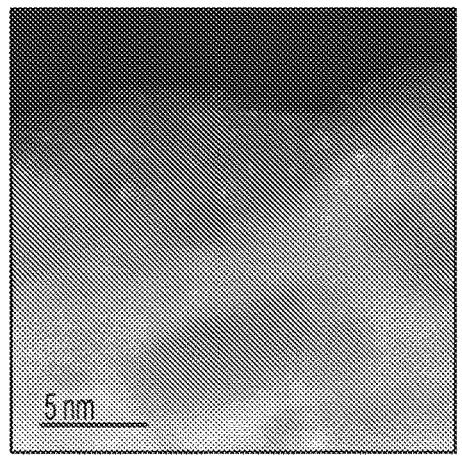
Figure 9E:
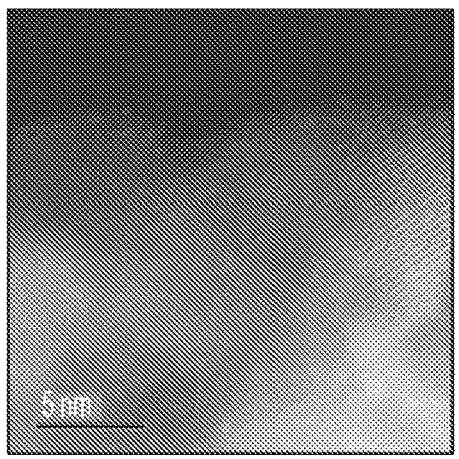
Figure 9F:
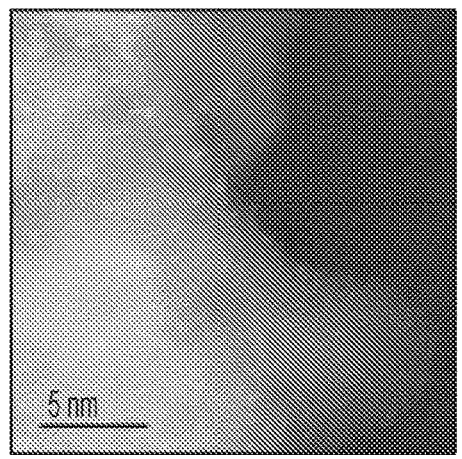

Described herein is a solvothermal deposition in butanone at ~150° C. that successfully grew densely packed nano-arrays of mesoporous rutile $TiO_2$ nanowires onto channel surfaces of cordierite honeycombs. Various sized honeycomb substrates have been successfully integrated, with core (substrate) size ranging from a size up to 63 mm×63 mm×50 mm (~0.2 L), to a full-size core of Φ 145 mm×75 mm from these substrate assemblies. The X-ray diffraction (XRD) pattern in FIG. 1B reveals that the as-prepared $TiO_2$ nano-arrays are of tetragonal rutile structure (JCPDS #88-1175). The rutile $TiO_2$ nano-arrays were grown uniformly with a height of ~3 μm (FIG. 1C), with the nano-arrays arranged in the form of individual nanowire-bundles ~50-100 nm wide. The comprised $TiO_2$ nanowires are ~10-20 nm wide, as revealed in the high angular annular dark field (HAADF) scanning transmission electron microscopy (STEM) and high resolution TEM images (FIGS. 1D and 1E). The bundled TiO$_2$ nanowires are mesoporous, revealed by arrays of darker spots (3-20 nm in diameter) in FIG. 1D, consistent with the BJH pore size distribution (FIG. 6B). The HRTEM lattice image identified an inter-planar lattice spacing of 0.326 nm, matching the {110}planes of rutile TiO$_2$. We note that a thin mesoporous layer of SiO$_2$ was also formed during the TiO$_2$ growth process. These mesoporous SiO$_2$ formed due to the leaching of Al, Fe, and Mg from cordierite by hydrochloric acid at the initial stage of the solvothermal TiO$_2$ growth process (FIGS. 7A-I).

Using butanone as the solvent, rutile TiO$_2$ nano-array integrated cordierite honeycomb has a BET surface area of ~89.6 m$^2$ g$^{-1}$ including the cordierite substrates, equivalent to 25,984 m$^2$ for a 1 L core. After Pt loading using a dip-coating method (Method section), the surface area of the Pt/TiO$_2$/cordierite sample reduces to 45.7 m$^2$ g$^{-1}$ due to the closure of small pores (<7 nm) during calcination (FIGS. 6A-E), however remains comparable to the bench-mark commercial DOC sample (49.8 m$^2$/g). After hydrothermal (HT) aging at 700° C. for 100 hours, the surface area of the sample is ~16 m$^2$ g$^{-1}$ with the nano-array structure well retained (FIGS. 6A-E). The surface area loss is due to the closure of small pores within TiO$_2$ nanowires (<7 nm), as revealed in the pore size distribution measured by N$_2$ isotherms and by fewer dark-spot contrasted pores revealed in the HAADF STEM image of the HT aged sample (FIGS. 6A-E). The high surface area of the TiO$_2$ nano-arrays is attributed to the unique mesoporous structures as discussed earlier with a contribution from the mesoporous silica layer formed due to cordierite surface etching during the growth. We note that the cordierite substrate etched in the similarly acidic conditions but without additional titanium precursor displays very high surface area (~150 m$^2$/g) but lose mechanical integrity due to the extreme porosity induced by etching. Evidently, the formation of densely packed TiO$_2$ nano-array layer has protected the cordierite substrate from aggressive acidic etching during the solvothermal growth.

Single atoms and sub-nanometer clusters of Pt were loaded on TiO$_2$ nano-arrays, with a volumetric Pt loading of 0.53-1.78 g L$^{-1}$ to prepare functional DOC devices, employing both microwave-assisted dipcoating and recently developed wet-incipient impregnation (WII) using Na as a promoter (13). The samples were labeled as Array-x-I/D, in which x indicates the nominal Pt loading and I/D is the loading methods whether wet incipient impregnation (WII) or microwave-assisted dip-coating (D). Alkaline metals have been reported to enhance Pt dispersion due to the formation of atomically dispersed Pt—O$_x$(OH)$_y$Na species that stabilize both the Pt atom and NaO$_x$ species (13, 15, 28). Using this method, the Pt dispersion could be achieved in the forms of sub-nanometer raffle-like clusters or single atoms, depending on the atomic ratio of Pt/TiO$_2$ (13, 15, 28). However, most of the studies were focused on a small amount of powder-based supports with low Pt loading. We presented here for the first time that atomic Pt dispersion could be achieved directly on full-size monolith substrates and evaluated for DOC activity under practical exhaust conditions. As stated earlier, recent efforts suggest that the Pt single atoms and sub-nanometer clusters could allow tunable active sites, enhanced activity, and selectivity (12-15, 29-31). Aberration-corrected (ac) HAADF STEM, a powerful tool for discerning individual heavy atoms (Pt) from lighter supporting atoms (Ti, O), was employed to investigate the distribution of Pt on the TiO$_2$ nano-array. FIGS. 8A-F show ac-HAADF STEM images of Pt supported TiO$_2$ nano-array prepared via Na-promoted WII methods, clearly demonstrating that Pt species were mainly distributed as single atoms and sub-nanometer clusters (bright spots). High Pt dispersion of 80% and 74% were determined for the Pt loading of 0.71 g$_{Pt}$ L$^{-1}$ and 1.78 g$_{Pt}$ L$^{-1}$, respectively, by H$_2$ chemisorption measurement, further confirming the atomically dispersed Pt sites. Interestingly, without any promoter, microwave-assisted dip-coating also results in atomic dispersion of Pt dominantly on TiO$_2$ nano-arrays shown in FIGS. 2A and 9A-F. The number of sub-nanometer Pt clusters in the dip-coating samples is found to be much fewer than that on the impregnation ones. However, the Pt dispersion of dip-coating samples is lower, 33% and 24% for the Pt loading of 0.71 g Pt L$^{-1}$ and 1.78 g Pt L$^{-1}$, respectively, due to a higher portion of Pt distributed as nanoparticles on adjacent SiO$_2$ (resulted from the Al and Mg acidic etching of cordierite during the initial stage of TiO$_2$ nano-array formation described above) (FIGS. 7A-I and 9A-F). We note that Pt is preferentially distributed as single atoms and sub-nanometer forms on TiO$_2$ but as nanoparticles on SiO$_2$. Only a few Pt nanoparticles were observed on TiO$_2$ nanowires. Clearly, the atomic distribution of Pt is unique to the TiO$_2$ nanowire supports, possibly pointing toward strong metal support interactions.

During on-road operation, DOCs endure mechanical vibrations and high velocity multi-phase exhaust flow. The associated mechanical stresses might cause the separation or delamination of washcoat layers from the monolithic substrates, resulting in active materials loss, deactivation of catalysts, and even damage of downstream functional devices (32). Since our TiO$_2$ nano-arrays were 'in situ grown' instead of 'wash-coated' on the honeycomb monoliths, these nano-array integrated monoliths have an improved adherence over conventional washcoated samples, offering reliable and efficient solutions for DOCs and other industrial monolithic reactors. Evidently, after ultrasonicating at 40 kHz in water bath at 25° C. for 4 hours, both fresh and HT aged TiO$_2$/Pt nano-array integrated monoliths showed little morphology change (FIGS. 10A-C). A negligible weight loss of ~1% was observed in both fresh and aged nano-array integrated monoliths, as compared to that of >10% for the commercial DOC after similar ultrasonication testing. Furthermore, as the SASN Pt species are well dispersed on and strongly interact electronically with the nano-array support, these Pt species are expected to be robust on the nanowire surfaces.

Figure 2A:
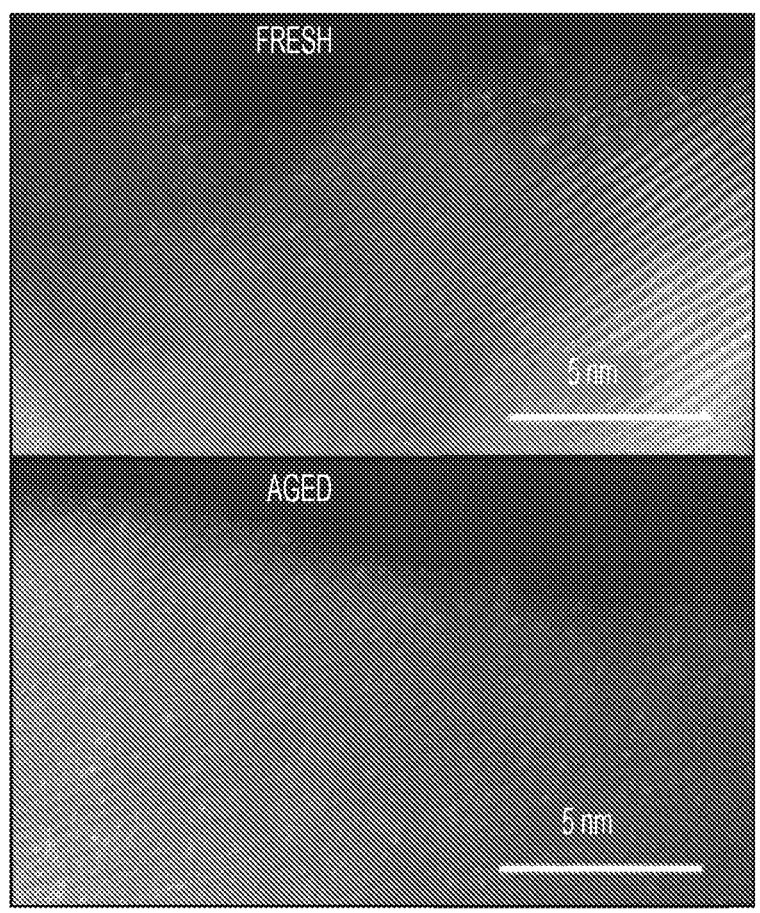
FIGS. 2A-D show well-retained SASN Pt species on $TiO_2$ nanowire integrated monoliths after hydrothermal aging, and their diesel oxidation performance versus that of Pt nanoparticles on $TiO_2$ nanowires and commercial DOC bench mark under simulated engine exhaust.
Figure 11:
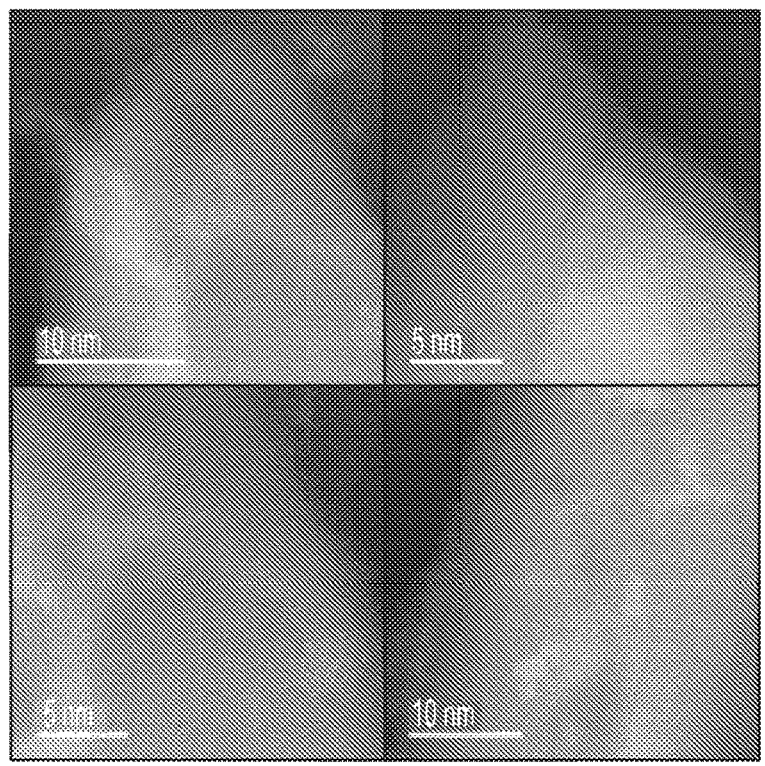
FIG. 11 is HAAD STEM images of $Pt/TiO_2$ nano-array (prepared by microwave-assisted dipcoating) after hydrothermal aging at 700° C. for 100 h. Pt was dominantly distributed as single atoms and raft-like clusters.
Figure 12:
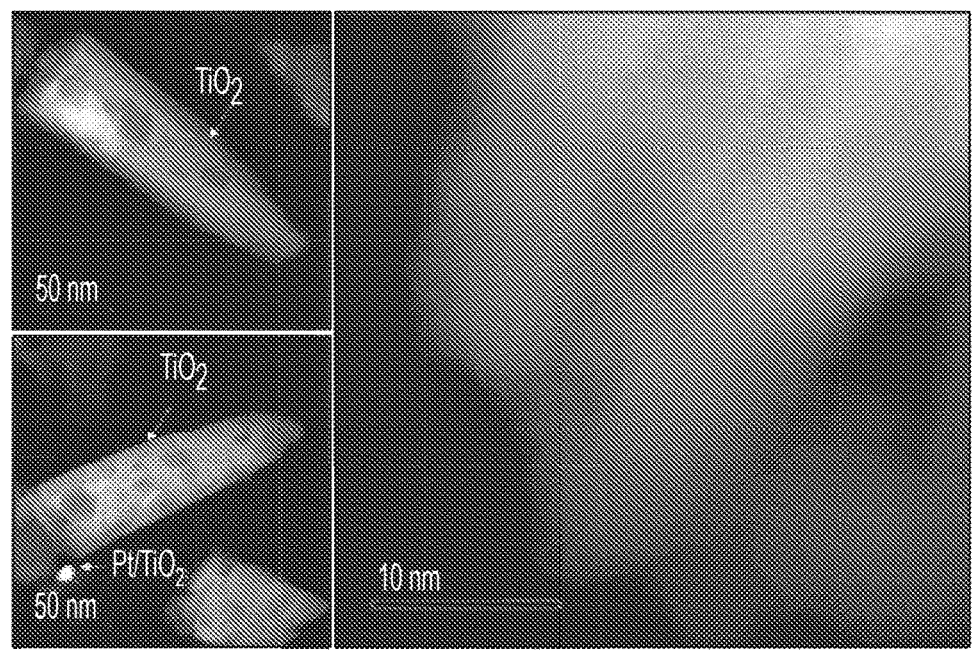
FIG. 12 is ac-HAADF STEM images of Na-promoted impregnation $Pt/TiO_2$ nano-array after hydrothermal degreening at 700° C. for 4 hours clearly shows Pt single atom dispersion.
Figure 13:
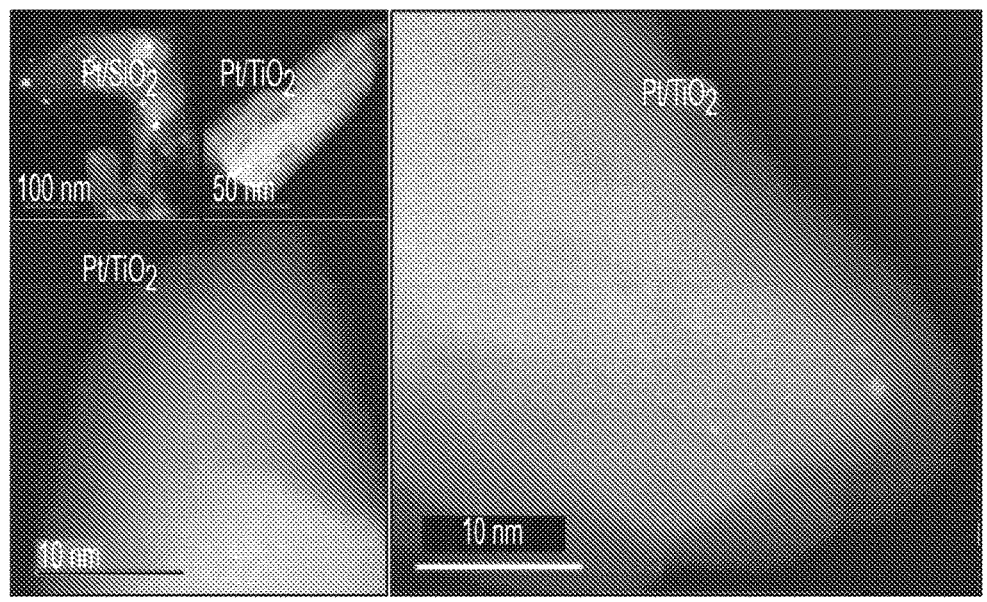
FIG. 13 is ac-HAADF STEM images of dip-coating $Pt/TiO_2$ nano-array after hydrothermal degreening at 700° C. for 4 hours clearly shows Pt single atom dispersion. Very few-to-none Pt nanoparticles were found indicating high thermal stability of these Pt single atoms.

Besides mechanical robustness, hydrothermal stability is one of the most important selection criteria for DOCs. However, SASN catalysts are often not stable because of their high surface free energy, thus hindering their applications in practical conditions (30). Clearly, strong interactions between Pt and supports can lower the surface free energy, thus being the key for stabilization of Pt SASN catalysts. In this research, the mesoporous rutile nanowire demonstrated unique support features that can stabilize atomically dispersed Pt even after HT aging at 700° C. for 100 h (FIGS. 2A and 11). The strong Pt—TiO$_2$ interaction is not affected by the Na promoter, as Pt single atom catalysts were retained on both dip-coating and Na-promoted WII samples after hydrothermal degreening at 700° C. for 4 hours (FIGS. 12 and 13). Of note, Pt nanoparticles supported on adjacent SiO$_2$ on both samples were severely sintered during HT degreening.

To evaluate the technology feasibility, the SASN Pt/TiO$_2$ nano-array monoliths were tested under simulated engine exhausts based on clean diesel combustion (CDC) and low-temperature diesel combustion (LTC-D) protocols developed by US DRIVE (24). The samples were tested at a high gas hourly space velocity (GHSV) of 60,000 h$^{-1}$ to assess their close-to-reality performance under these protocoled conditions. We note that in both conditions, the composition of total hydrocarbons (THC) on a $C_1$ basis in the exhausts is ~56% $C_2H_4$, 33% $C_3H_6$, and 11% $C_3H_8$. Samples were hydrothermally degreened at 550° C. for 4 hours and at 700° C. for 4 hours for evaluation in the CDC and LTC-D conditions, respectively.

Figure 2B:
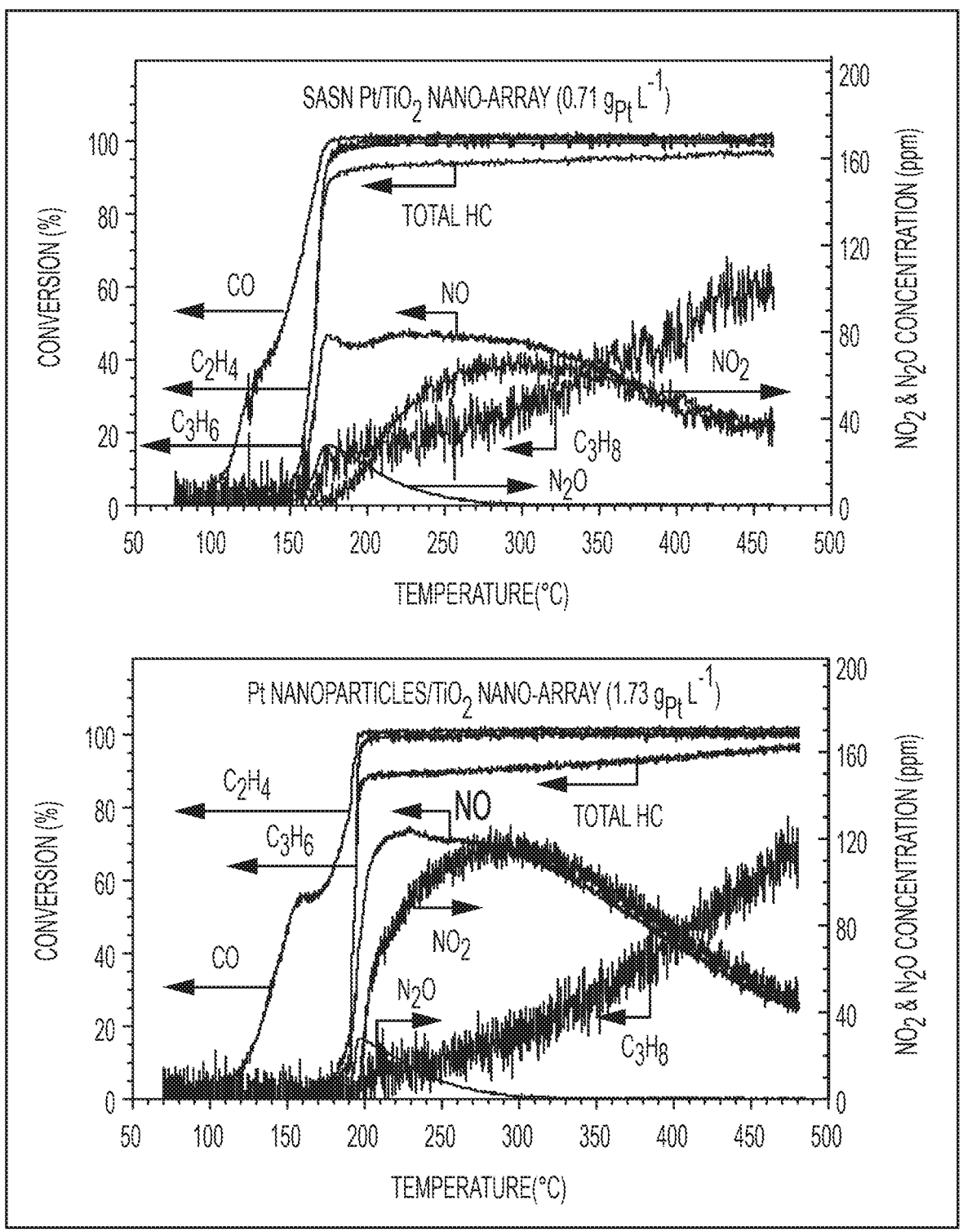
Figure 14:
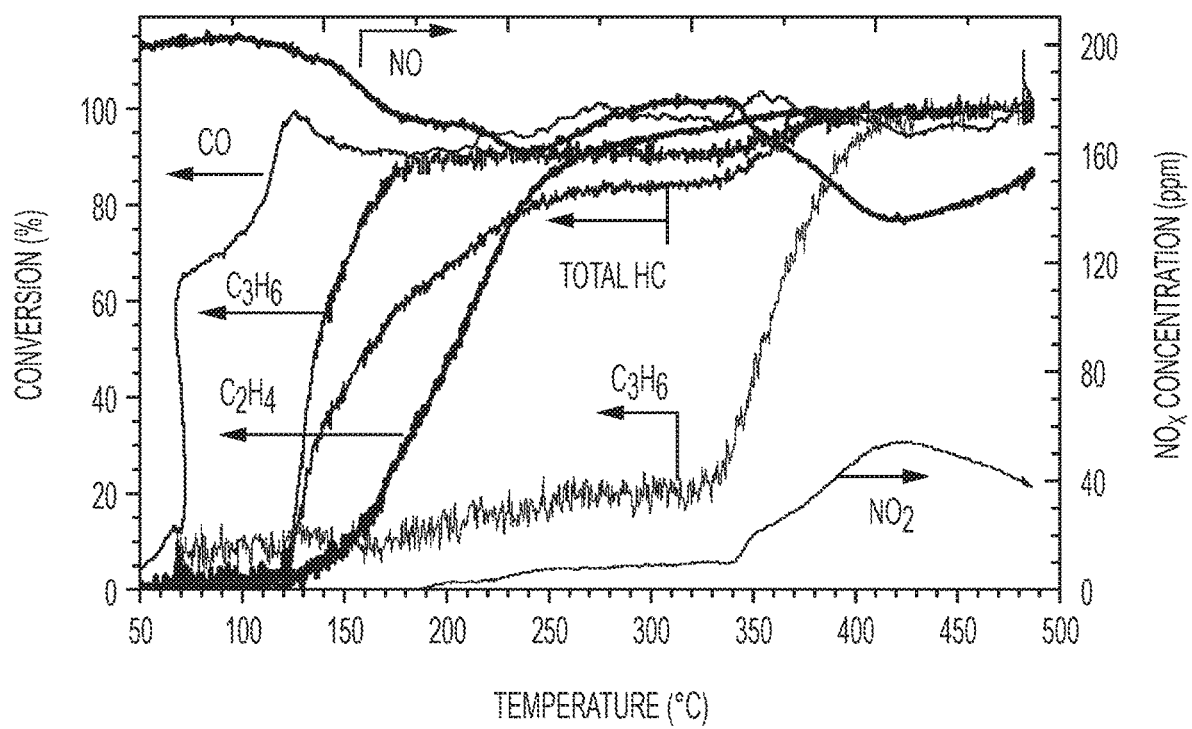
FIG. 14 is a graph showing DOC activity of the commercial DOC bench mark in the CDC simulated exhaust conditions.
Figure 16A:
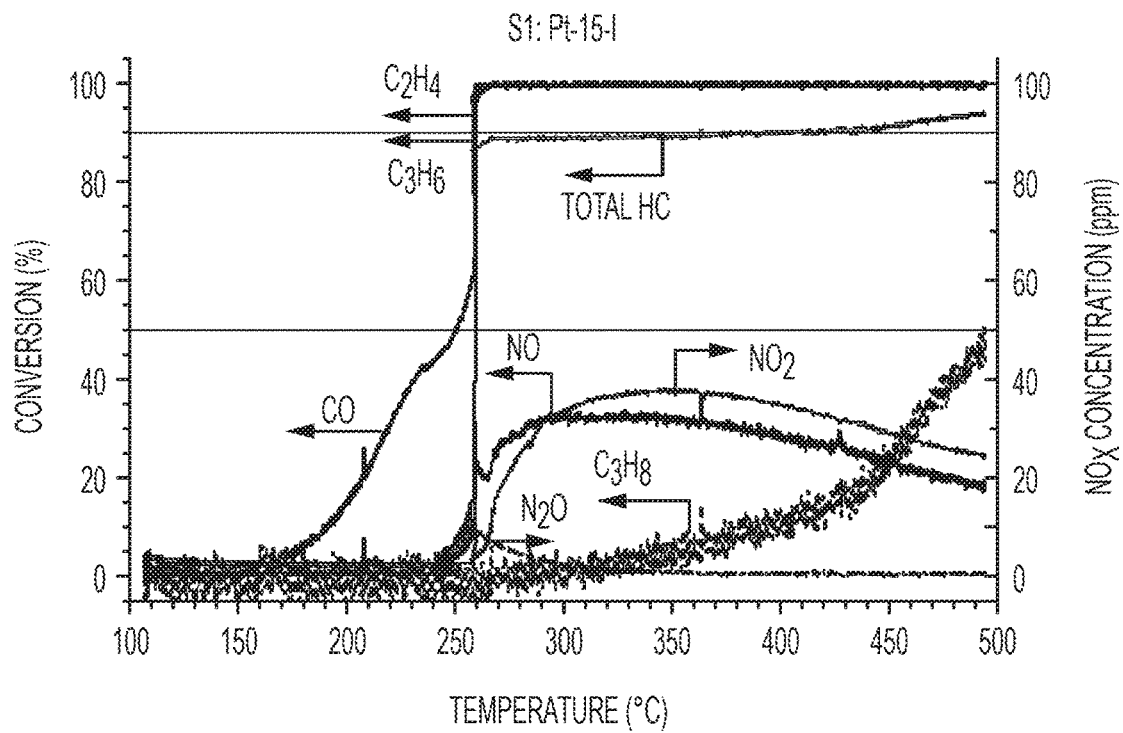
FIGS. 16A-E show DOC activity of $Pt/TiO_2$ nano-arrays with different Pt loading using Na-promoted wet incipient impregnation and microwave-assisted dip-coating methods in the LTC-D simulated exhaust.
Figure 16B:
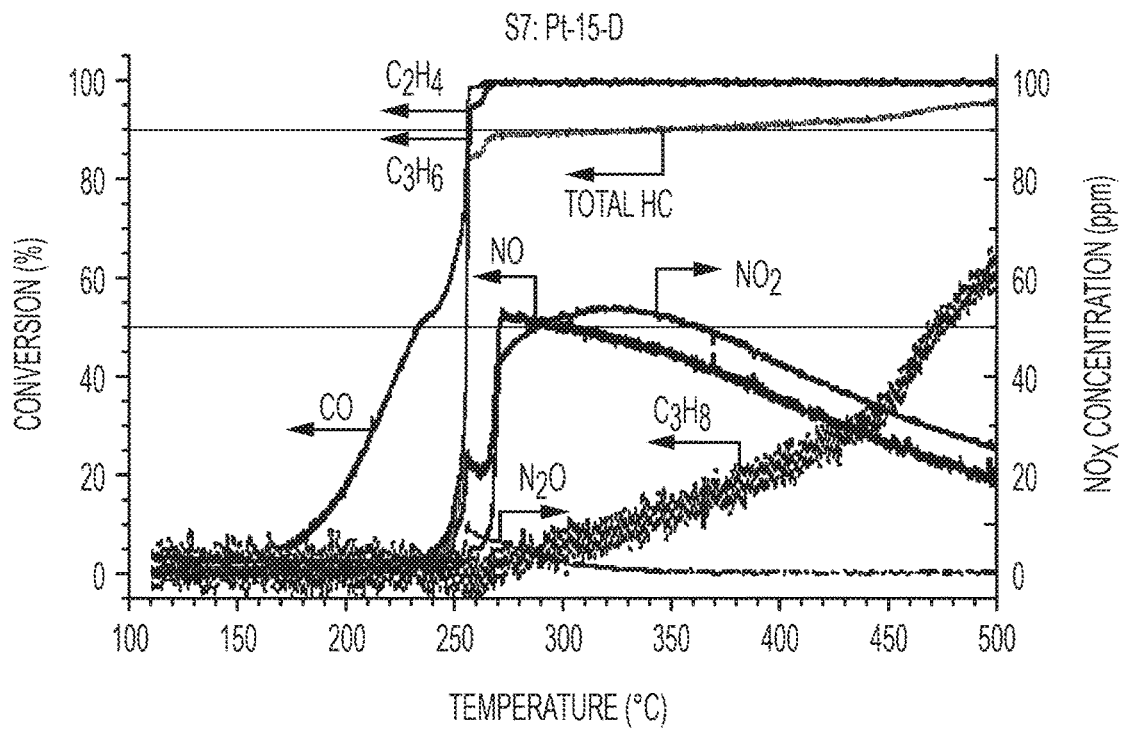
Figure 16C:
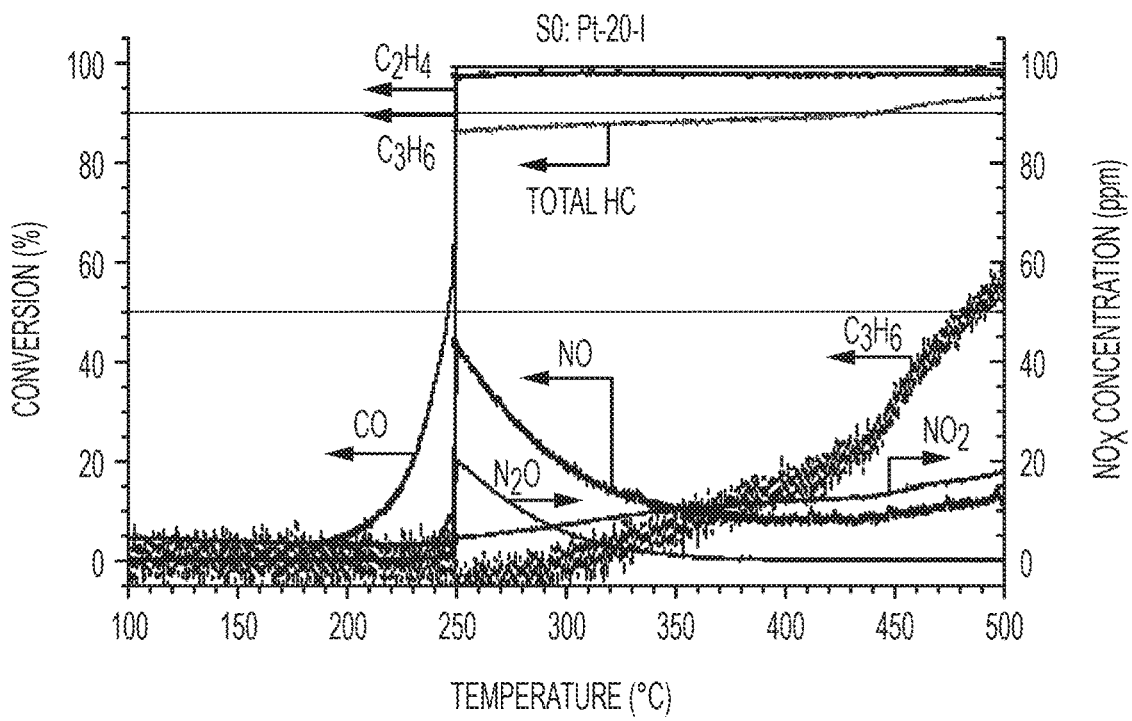
Figure 16D:
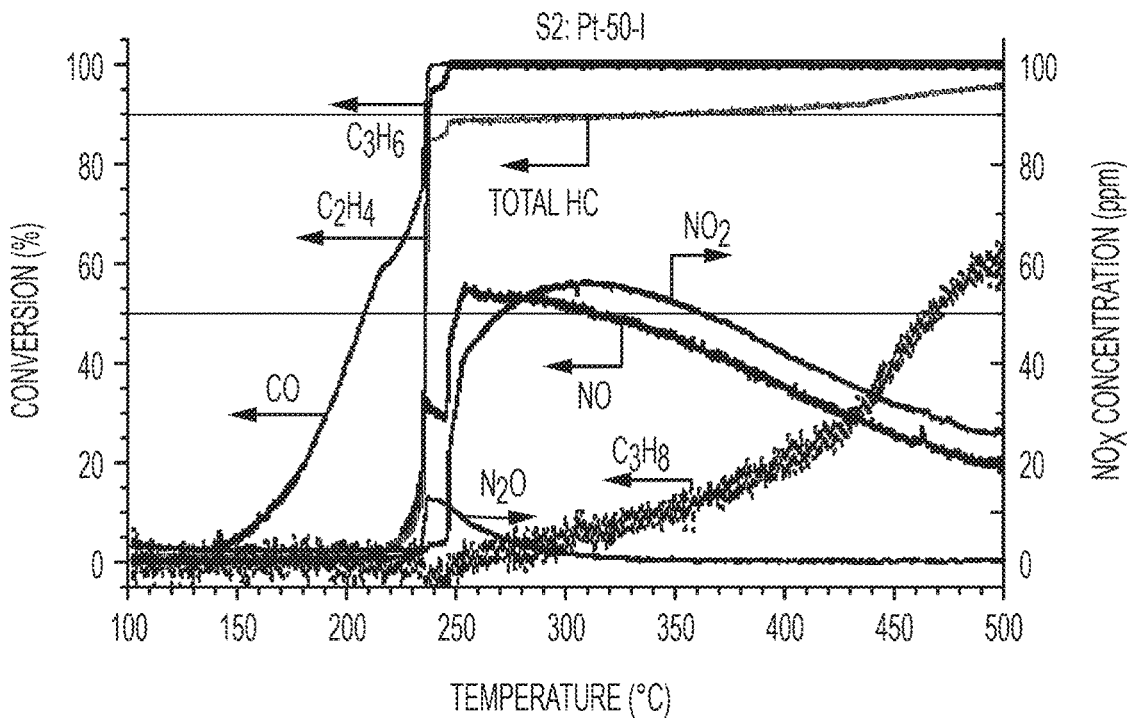
Figure 16E:
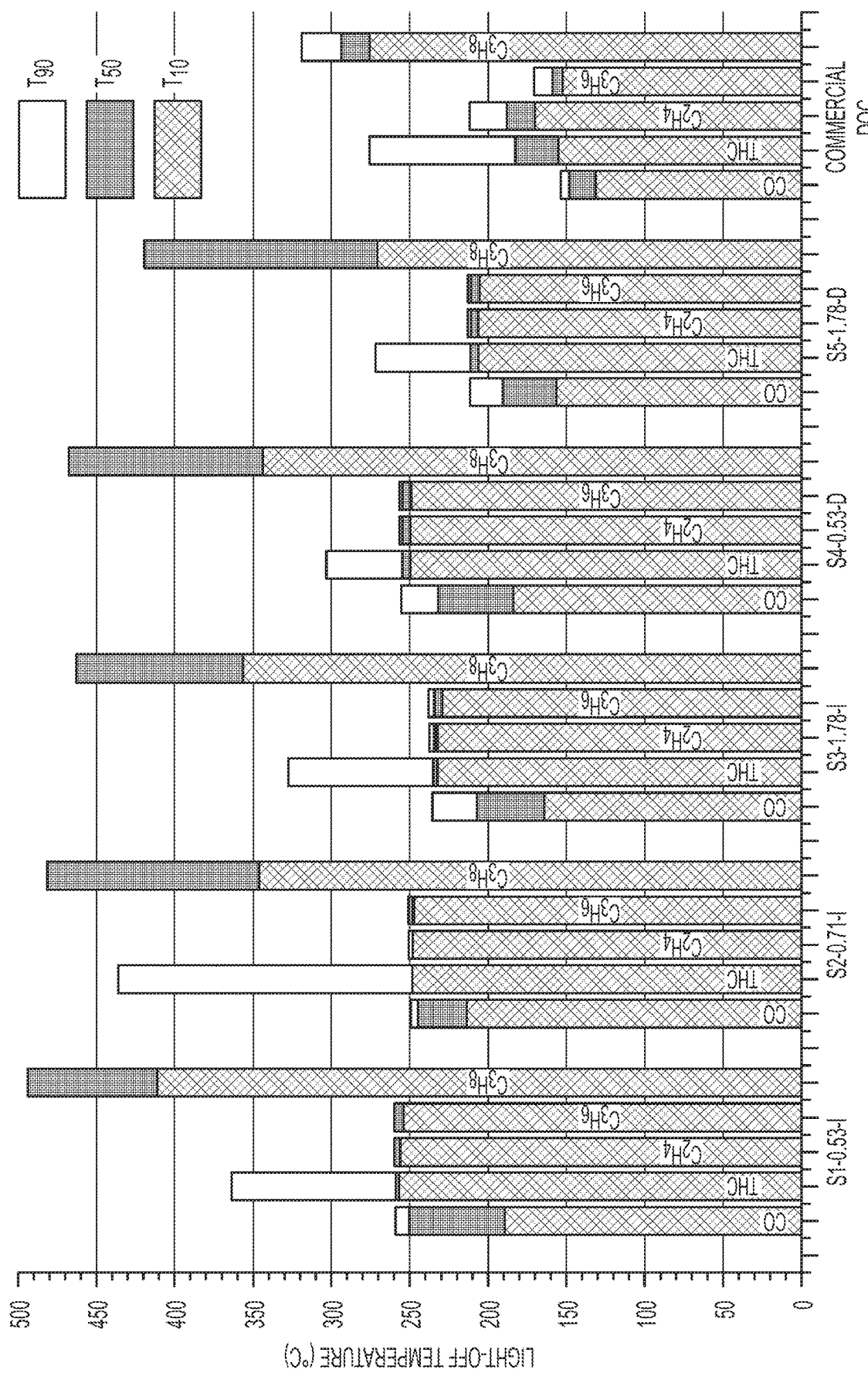

FIG. 2B shows the light-off curves for sample Array-0.71-I in the CDC simulated exhaust. The light-off temperature $T_{90}$ of CO, $C_2H_4$, $C_3H_6$, and THC are 164° C., 172° C., 173° C., and 178° C., respectively, all are well below 200° C., at which most catalyst systems in today's vehicles are ineffective (33). For benchmark, we employed a commercial DOC sample with PGM loading of 4.66 g $L^{-1}$ (compared to 0.71 g $L^{-1}$ for the array-0.71-I), obtained from a brand new heavy-duty pick-up truck (year model 2012) (FIG. 14). The light-off temperature $T_{90}$ for THC of SASN Pt/$TiO_2$ nano-array is significantly (~172° C.) lower than that of the commercial DOC (350° C.), despite ~5 times less PGM loading (FIG. 14). On Pt/$TiO_2$, both ethylene and propylene oxidation occur almost simultaneously. On the other hand, the oxidation of ethylene, the main hydrocarbon component in the exhausts (56%), on the commercial DOC sample is sluggish, leading to the slow conversion of THC and consequently higher $T_{90}$. Additionally, the conversions of both $C_3H_6$ and $C_2H_4$ on the SASN Pt/$TiO_2$ nano-array integrated monoliths quickly reach more than 99% with no plateau in the high conversion region, which was observed in the commercial DOC, suggesting that the catalytic reaction kinetics over SASN Pt/$TiO_2$ nano-array are not mass-transfer limited even at a high space velocity 60,000 $h^{-1}$ (34).

A secondary function of a DOC catalyst is to oxidize NO to $NO_2$ to help downstream functionalities such as $NO_x$ selective catalytic reduction (SCR) catalyst and regeneration of diesel particulate filters (1, 2). Regarding NO-to-$NO_2$ oxidation, the Array-0.71-I sample also outperforms the commercial sample. The maximum NO-to-$NO_2$ conversion for the Pt/$TiO_2$ nano-array is 47% at a low temperature 291° C. as compared to 27% at 427° C. for the commercial DOC.

To validate DOC reactivity of Pt SASN active sites, we employed a Pt-nanoparticle supported on $TiO_2$ nano-array monolith with average Pt particle size of 3.9±1.1 nm and loading of 1.73 g Pt $L^{-1}$ (FIGS. 15A and 15B), prepared by atomic layer deposition of Pt over $TiO_2$ nano-array monolith, as a reference. The low-temperature DOC activity of Pt nanoparticle/$TiO_2$ (Pt NP/$TiO_2$) nano-array is good, but inferior to Pt SASN/$TiO_2$ nano-array, despite 2.5 times higher PGM loading (FIG. 2B). The light-off temperatures $T_{90}$ of Pt NP/$TiO_2$ nano-array for CO, $C_3H_6$, $C_2H_4$, and THC are 193° C., 196° C., 196° C., and 223° C., respectively, ~23-45° C. higher than that of Pt SASN/$TiO_2$ nano-array. This evidence clearly illustrates the improved reactivity for CO and HC oxidation of Pt SASN, compared to Pt NP active sites although direct turnover frequency (TOF) measurements are difficult or impossible with these very sharp light-off curves and under these complex flow conditions.

Under the LTC-D simulated exhaust condition, the sample Array-1.77-D has the best performance among all samples evaluated in the LTC-D conditions, including the commercial DOC sample (FIGS. 2C and 16A-E). Compared to the commercial DOC sample (PGM loading of 4.66 g $L^{-1}$), sample Array-1.77-D (PGM loading of 1.77 g $L^{-1}$) has higher $T_{90}$ for CO and $C_3H_6$ oxidation, but lower $T_{90}$, by 5° C., for THC oxidation. This is because of the exceptional catalytic activity for $C_2H_4$ combustion of Pt dip-coated $TiO_2$ nano-arrays. Sample array-1.77-D also excellent NO oxidation activity, with a maximum conversion of NO-to-$NO_2$ ~71% at 297° C.

Figure 2C:
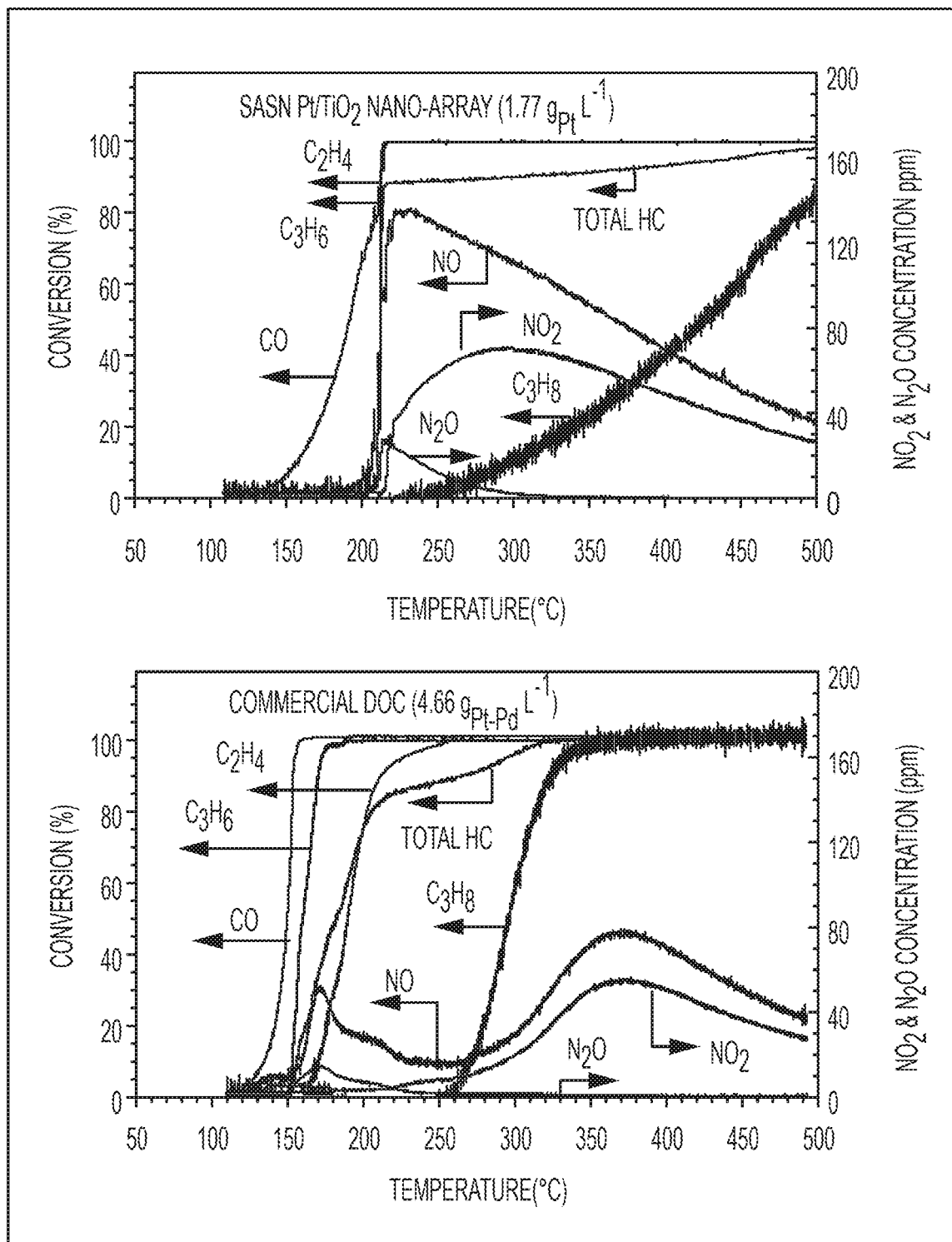
Figure 2D:
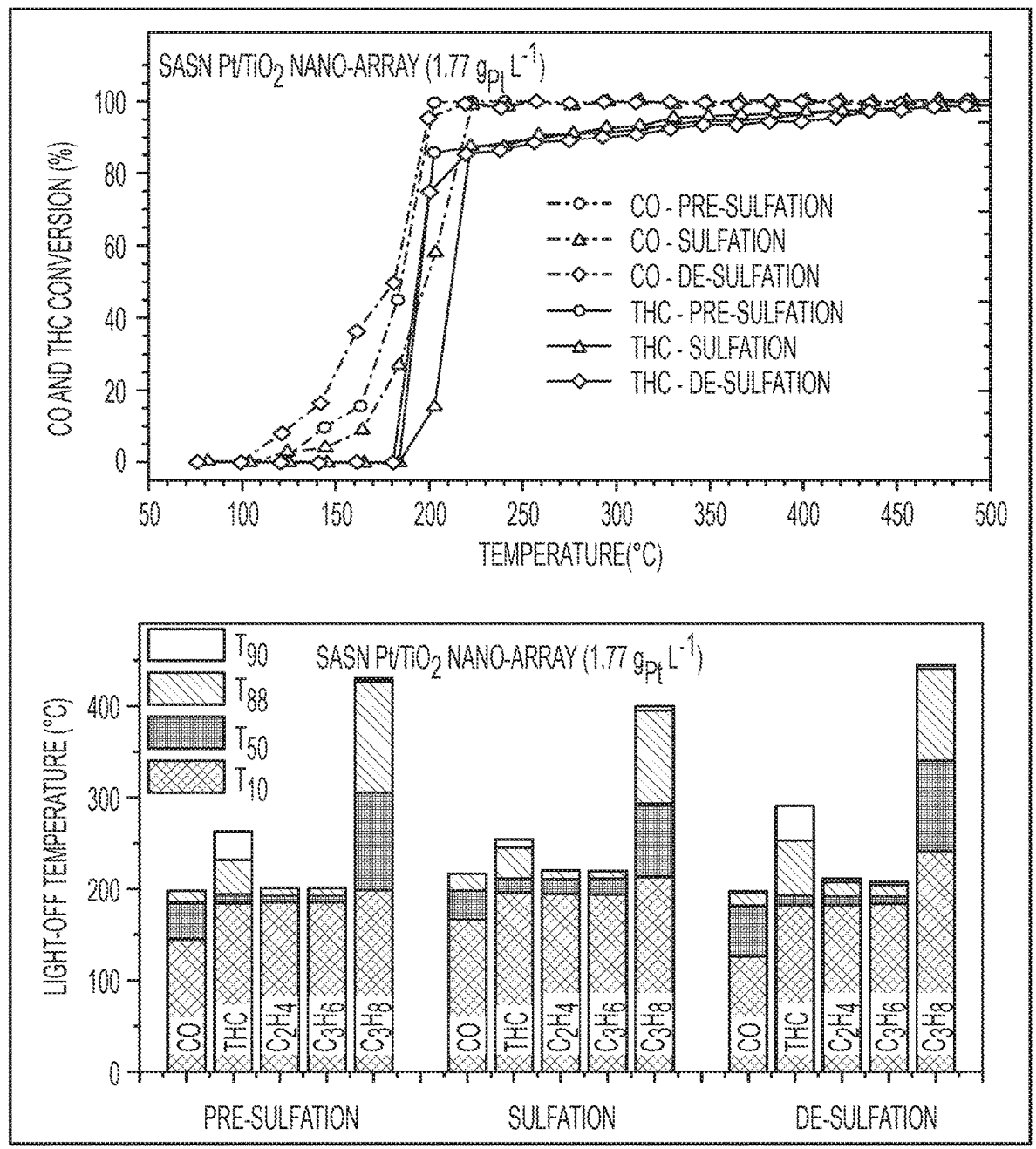

The Pt SASN/$TiO_2$ nano-array catalysts also displayed high sulfur tolerance, which is among the most critical selection criteria for DOCs (35). After $SO_2$ exposure (1 $g_{sulfur}$ $L^{-1}$) following the USDRIVE's protocol (24), the sample showed only a slight deactivation for CO and unsaturated HC with $T_{90}$ increases of ~19° C. (FIG. 2D). Interestingly, low-temperature catalytic propane oxidation was improved, likely due to formation of interfacial sulfates species that facilitate propane chemisorption on Pt (36), thus decreasing $T_{90}$ of THC by 9° C. In the simulated exhaust (no liquid HCs), propane contributes to 11% of THC and propane oxidation often starts after unsaturated HCs. Therefore, $T_{90}$ of THC of a DOC is largely dependent on low-temperature propane oxidation activity, as reflected by increased $T_{88}$ but decreased $T_{90}$ of THC after S-poisoning. After desulfation in $H_2$ stream, the oxidation catalytic activity for CO was even better and that for unsaturated HCs was almost fully recovered, but the enhancement in propane oxidation activity was removed, resulting in higher $T_{90}$ for THC.

Figure 3:
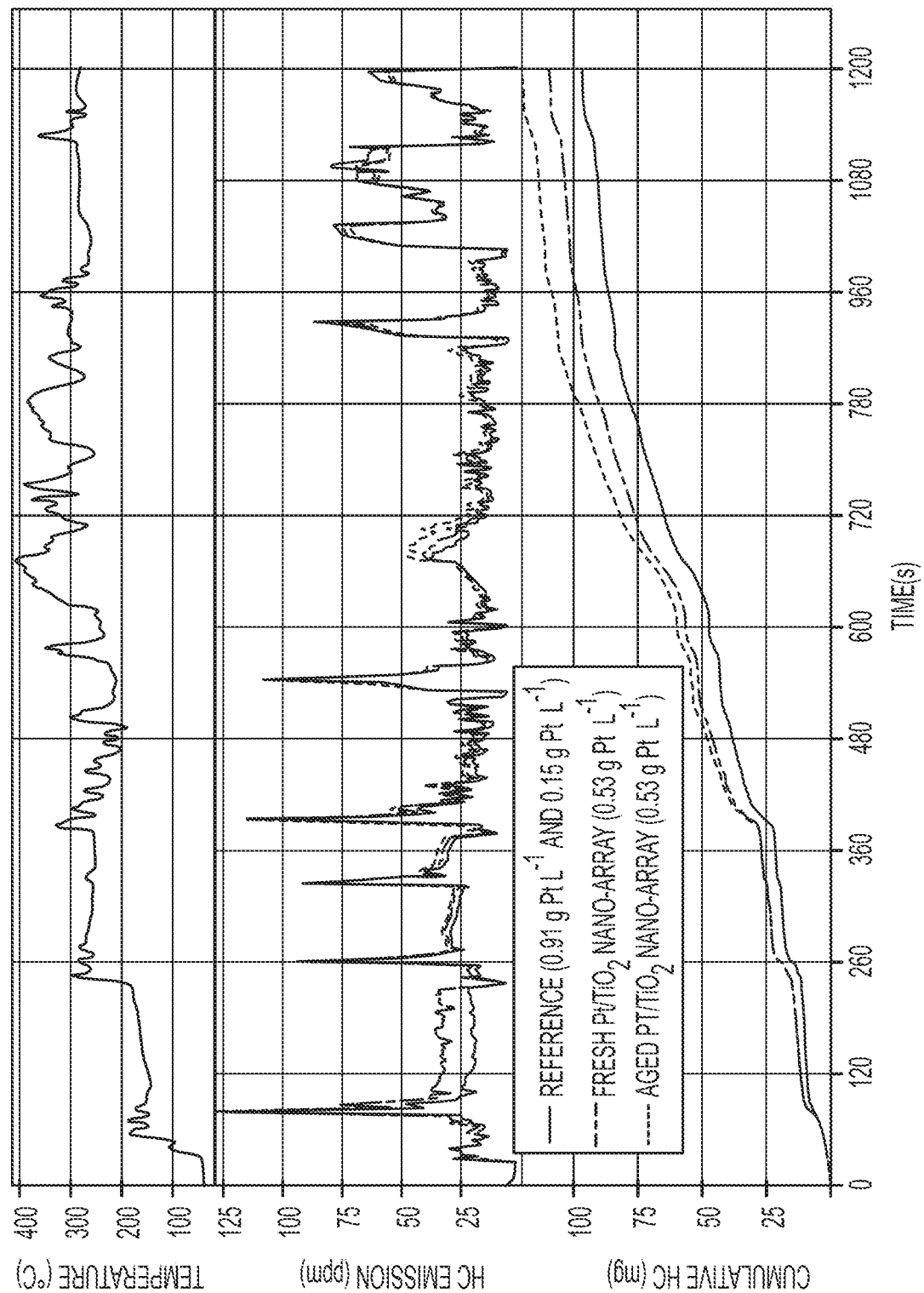
FIG. 3 is a graph showing DOC activity of $Pt/TiO_2$ nano-array (0.53 g Pt $L^{-1}$) in transient gas conditions mimicking a HDD FTP as running on a HDD certified 2010 Cummins ISB (6.7 L) 320 hp engine. From top to bottom: temperature profile, transient HC emission, and cumulative HC emission. We employed a commercial DOC (0.91 g Pt/0.15 g Pd $L^{-1}$) as a reference.
Figure 18:
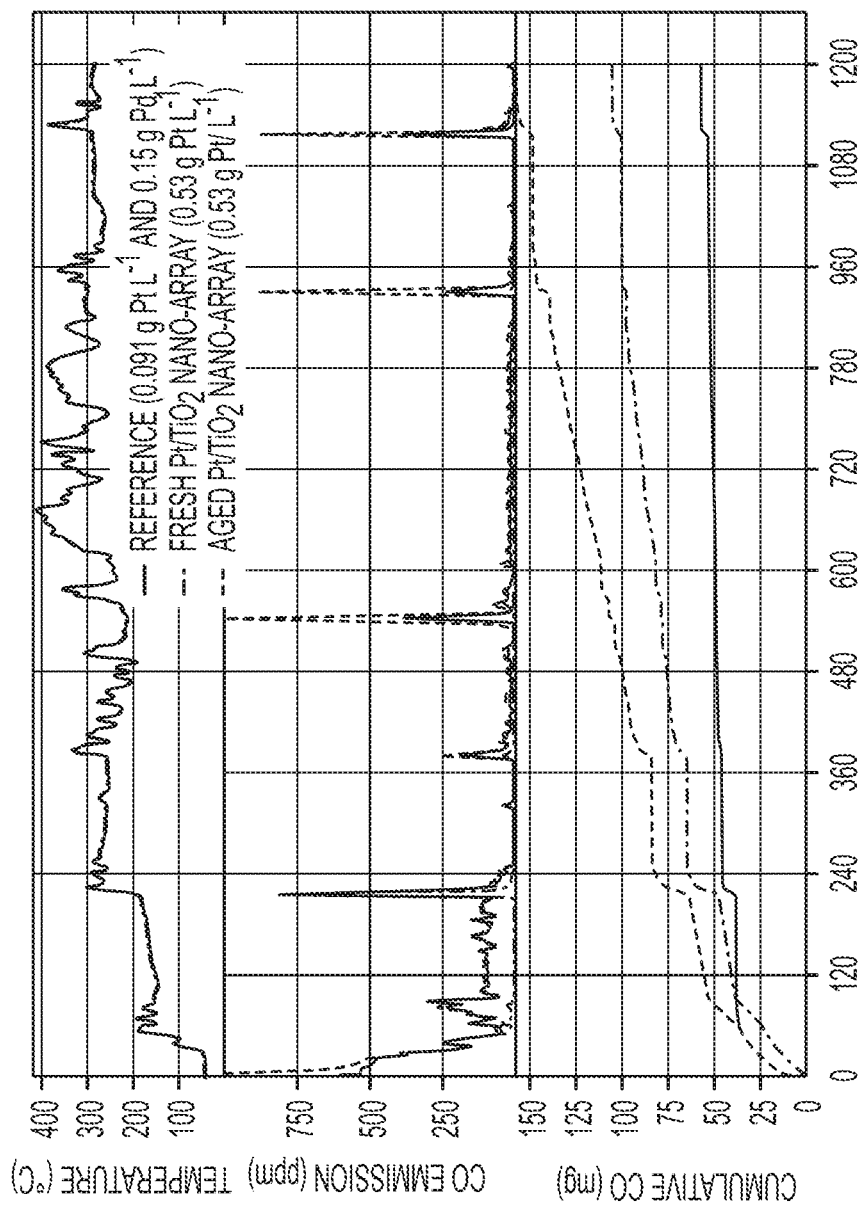
FIG. 18 is a graph showing DOC activity of $Pt/TiO_2$ nano-array (0.53 g Pt $L^{-1}$) in transient gas conditions mimicking a HDD FTP as running on a HDD certified 2010 Cummins ISB (6.7 L) 320 hp engine. From top to bottom: temperature profile, transient CO emission, and cumulative CO emission. We employed a commercial DOC (0.91 g Pt/0.15 g Pd $L^{-1}$) as a reference.

For the demonstration of scalability for practical conditions, the Pt/$TiO_2$ nano-array sample with a Pt loading of 0.53 g $L^{-1}$ and dimensions of Φ 5 cm×7.5 cm were evaluated under highly transient feed gas conditions mimicking a heavy-duty diesel (HDD) federal test procedure (FTP) as running on a HDD certified 2010 Cummins ISB (6.7 L) 320 hp engine. The characteristic of the transient feed gas is provided in FIG. 17. The Pt/$TiO_2$ nano-array sample was aged at 650° C. for 100 h in 10% steam/air flow to a representative end of life condition for a North American HDD application. FIGS. 3A and 18 show the transient responses for HC and CO respectively of the fresh and aged Pt/$TiO_2$ samples. The Pt/$TiO_2$ samples do not show reactivity during the first 200 s due to low temperature, high exhaust flow rate, and high concentration of HCs and CO. When temperature increases, both fresh and aged samples showed good activity despite the drastic changes in the concentration and the flow rate of emission. It is noted that the HC oxidation activity of the aged sample is almost as good as the fresh sample, represented by small difference in the transient and cumulative HC emissions. The performance of aged sample is mainly due to the stable single atom Pt sites. As revealed by HAADF TEM (FIGS. 2B and 12), we observed a high density of SASN Pt sites on the surface of $TiO_2$ nanowires even after hydrothermal aging at 700° C. for 100 h. However, some small pores (<7 nm) are closed during hydrothermal aging, as indicated by HAADF TEM and $N_2$ isotherms, thus access is inhibited on a portion of Pt sites. Such loss of Pt active sites leads to slow response to CO at high flow rate and concentration (at 500, 930, and 1100 s), and consequently increase in the CO concentration.

Figure 19A:
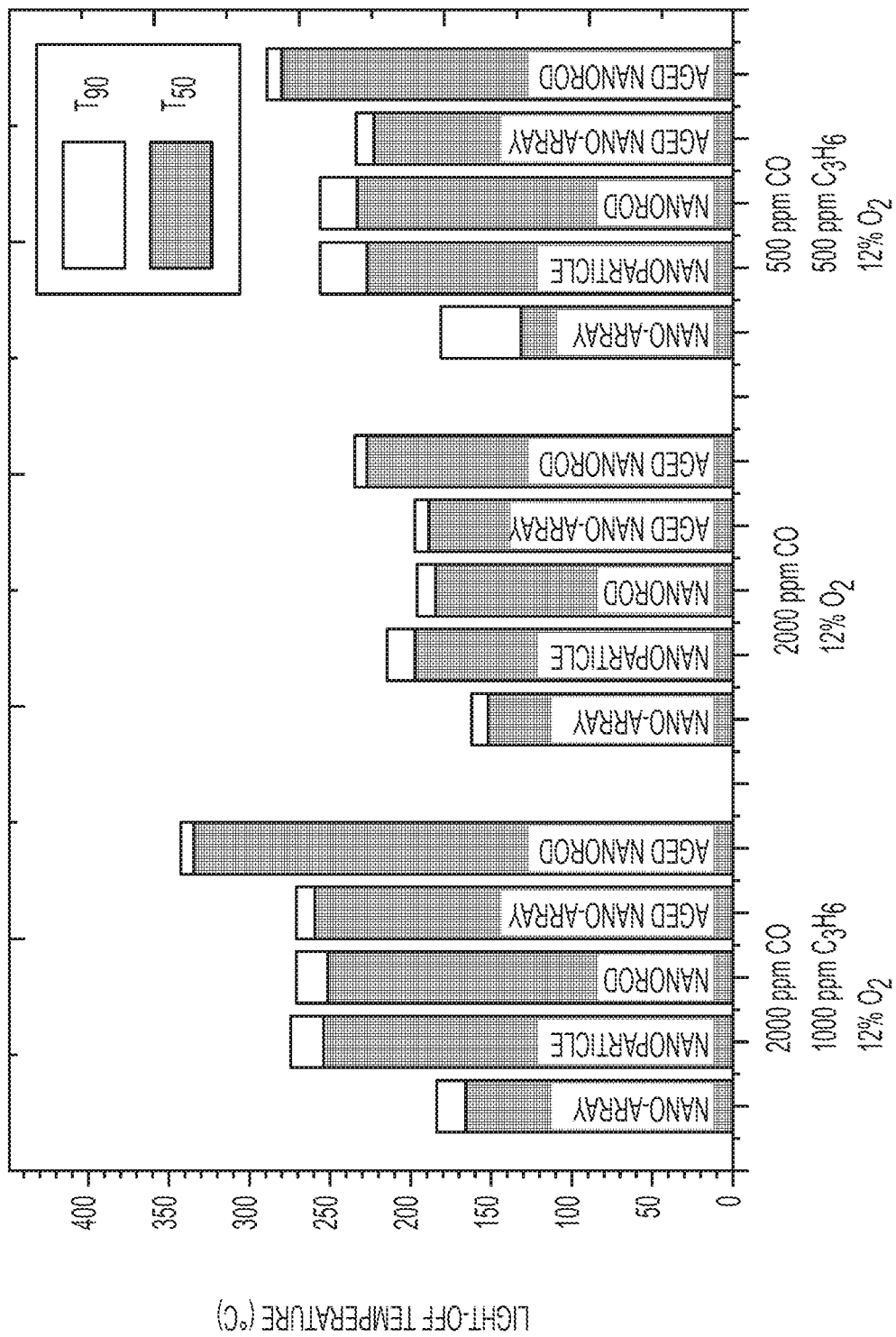
FIGS. 19A and 19B show catalytic oxidation of CO and $C_3H_6$ of nano-array catalysts versus washcoated nano-powder catalysts. The light-off temperature of CO (FIG. 19A) and $C_3H_6$ (FIG. 19B) in corresponding gas mixtures.
Figure 19B:
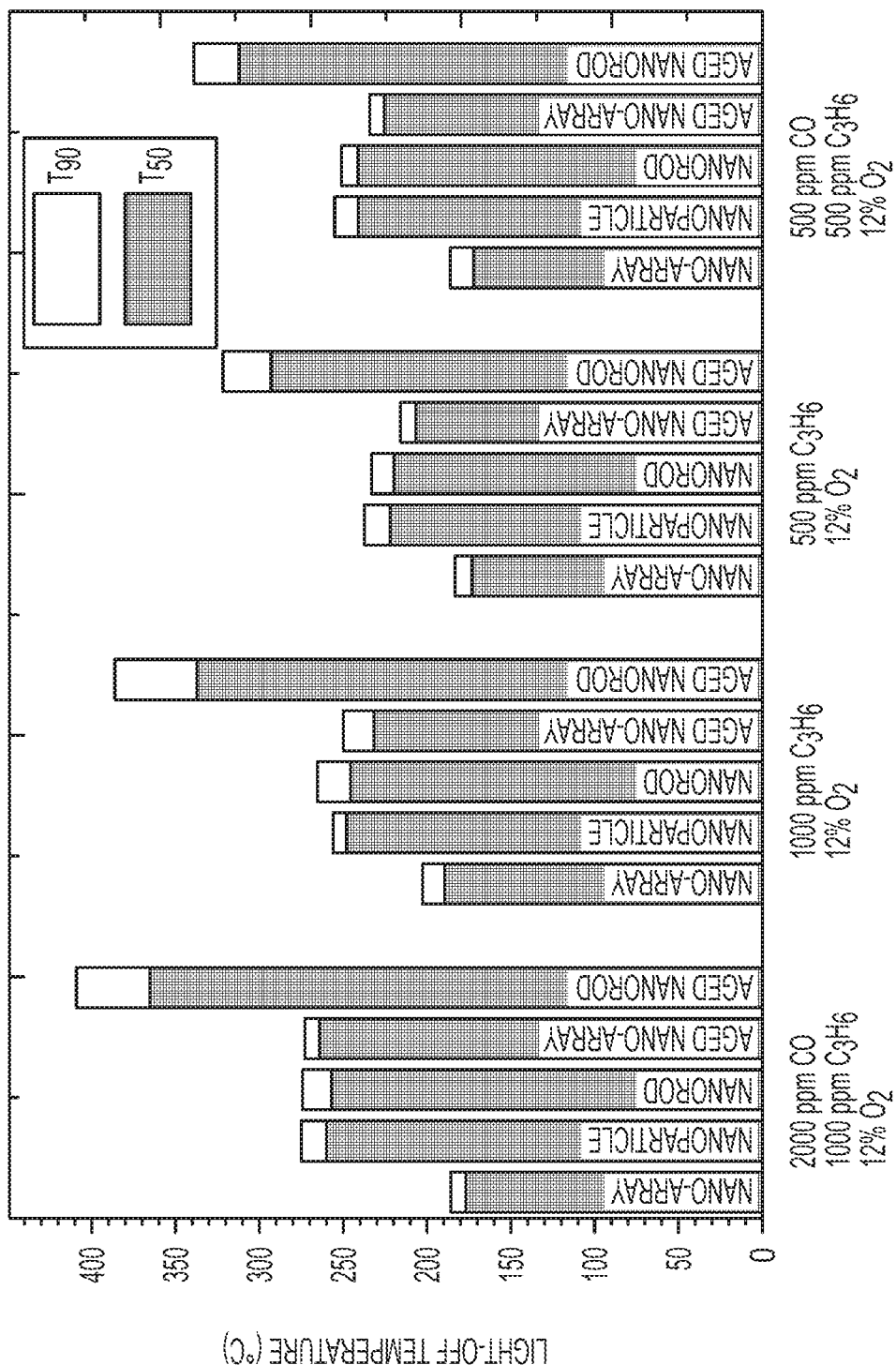

To further investigate the high oxidation activity of the Pt SASN/$TiO_2$ nano-arrays, we employed oxidation of CO and $C_3H_6$ as the probe reactions and Pt supported $TiO_2$ powder-based washcoat monolith catalysts with the similar Pt and $TiO_2$ loading as reference catalysts. Summary of the samples' properties in these tests are provided in Table S1. FIGS. 4A, 19A, and 19B showed the comparison of catalytic reactivity between Pt/$TiO_2$ nano-array and Pt/$TiO_2$ nanopowder based washcoat for CO and $C_3H_6$ oxidation in different conditions. Both CO and $C_3H_6$ oxidation can occur at lower temperatures over SASN Pt/$TiO_2$ nano-arrays as compared to Pt/$TiO_2$ nanopowder-based washcoat catalysts. For example, the light-off temperature $T_{90}$ for CO oxidation of Pt/$TiO_2$ nano-array is 35° C. and 54° C. lower than that of Pt/TiO$_2$ nanoparticles and Pt/TiO$_2$ nanowires respectively. The difference in the light-off temperature T$_{90}$ increases to 90° C. and 87° C., respectively, with the introduction of C$_3$H$_6$. This indicates that the inhibition effect of CO oxidation by C$_3$H$_6$ is less severe on the Pt/TiO$_2$ nano-array sample than nanopowder-based samples, probably due to a higher number of active sites and weaker binding strength of C$_3$H$_6$ on atomic Pt sites.

Pt/TiO$_2$ nano-arrays also have better catalytic activity for C$_3$H$_6$ oxidation. The light-off temperature T$_{90}$ of Pt/TiO$_2$ nano-array is lower than that of Pt/TiO$_2$ nanopowders by over 50° C. The difference in T$_{90}$ increases to up to 90° C. when CO is introduced to the feed gas, due to the inhibition effect of CO on C$_3$H$_6$ oxidation on Pt/TiO$_2$ nanopowders, with 10-20° C. delay in the light-off curves. However, CO does not inhibit or promote (at high CO concentration) C$_3$H$_6$ oxidation on Pt/TiO$_2$ nano-arrays.

As expected, the nano-array catalysts demonstrate exceptional hydrothermal stability, likely due to the strong metal-support interaction of Pt and TiO$_2$ nano-arrays and well-spaced nano-array structures that reduce sintering of Pt. Even after hydrothermal aging at 700° C. for 100 hours, the nano-array catalyst retains a similar reactivity to the fresh nanopowder catalyst. The light-off temperature T$_{90}$ for C$_3$H$_6$ oxidation of aged Pt/TiO$_2$ nano-array is ~100-137° C. lower than that of aged Pt/TiO$_2$ nanowire and nanoparticle washcoat.

Figure 20:
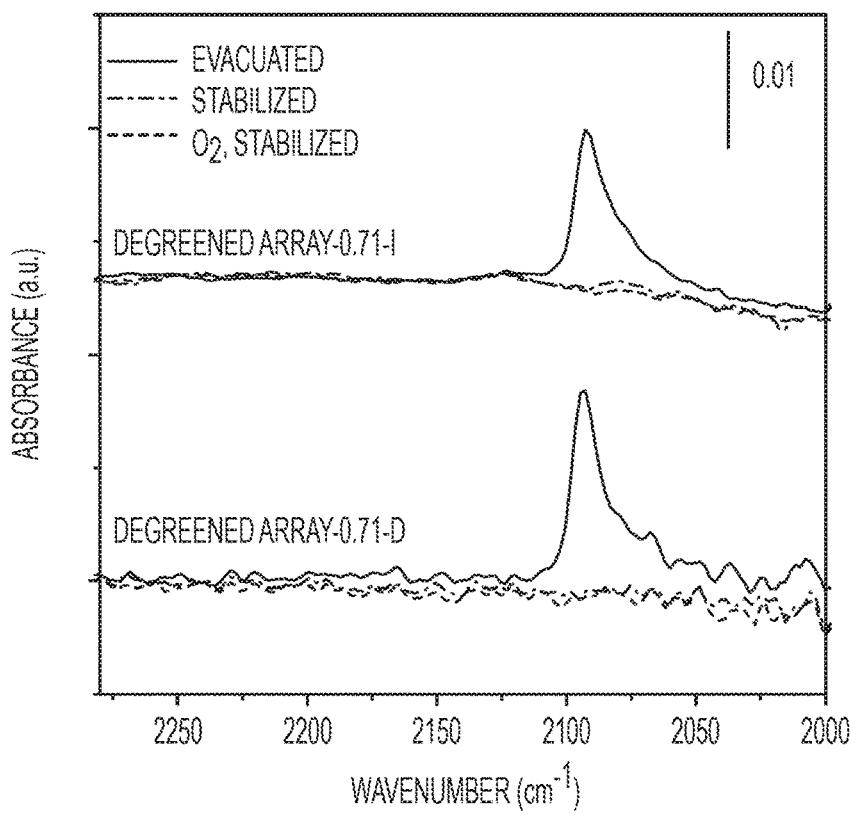
FIG. 20 is a DRIFTS spectra of degreened Pt SASN/$TiO_2$ nano-arrays. Background was first taken in pure Ar, followed by CO introduction and scans were taken until spectrum stabilized. CO was then removed and scans repeated until stabilization. Finally, $O_2$ was introduced and scans were repeated until stabilization. All procedures were performed at 100° C.

The remarkable performance of the Pt SASN supported TiO$_2$ nano-array catalytic converters can be attributed to the combination of the unique atomically distributed Pt and the unique structure of long-range ordered mesoporous TiO$_2$ arrays. Pt SASNs clearly showed better DOC activity than the Pt NPs counterpart, as demonstrated in the reactivity comparison in the CDC conditions (FIGS. 2C and 2D). The enhanced reactivity of Pt SASN is explained by the distinct electronic structures that modify interaction with adsorbate molecules or by the involvement of supports that may alter reaction pathways. For example, high activity for CO oxidation of Pt SASN supported FeO$_x$ was explained by reduced CO-on-Pt adsorption energy (31). CO oxidation on Pt catalysts follows Langmuir-Hinshelwood mechanism, in which strongly adsorbed CO on Pt inhibits the adsorption and activation of O$_2$, thus CO oxidation on Pt requires high temperature to weaken CO adsorption and facilitate O$_2$ adsorption (12). We also observed similarly weakened CO adsorption on degreened Pt SASN/TiO$_2$ nano-array samples. Using Diffuse Reflectance Infrared Fourier Transform spectroscopy (DRIFTS), we identified that the CO adsorbed on Pt species desorbs totally upon evacuation at 100° C. (FIG. 20), which cannot be achieved in other Pt/TiO$_2$ systems (12, 14, 37, 38). However, further mechanistic investigation on CO, HC oxidation catalyzed by Pt SASN in complex mixtures (simulated exhausts) will be needed to elucidate the role of Pt SASN catalysts and TiO$_2$ support.

It has been suggested that introduction of macro-pores into mesoporous structures could improve mass transport properties (39, 40). We observed very steep light-off for CO and unsaturated HCs in both Pt SASN and Pt NP/TiO$_2$ nano-array samples, indicating that the catalytic combustion of CO and unsaturated HCs over the Pt/TiO$_2$ nano-arrays is negative first-order kinetics without mass-transfer limitation (34). Therefore, in the case of Pt/TiO$_2$ nano-arrays, the space between the mesoporous nanobundles may have acted as large channels for fast transport of the reactants along the bundles before the reactants diffusing into mesoporous network to Pt active sites (FIG. 4C). Well-spaced support is also expected to inhibit sintering of Pt, thus contributing to the enhanced hydrothermal stability.

Example #2

Materials and Methods

The mesoporous TiO$_2$ nano-array was integrated onto cordierite honeycomb monolith via a solvothermal synthesis using titanium (IV) isopropoxide as Ti precursor and n-hexane as nonpolar solvent. Pt was loaded on the TiO$_2$ nano-array/cordierite via atomic layer deposition at 270° C. using trimethyl (methylcyclopentadienyl) platinum (IV) and O$_2$ as the Pt precursor and oxidant, respectively. The Pt loading was controlled by the number of ALD cycles. The propane oxidation evaluation was carried out using a custom bench reactor. The Pt/TiO$_2$ nano-arrays/monolith samples were inserted in the quartz reactor tube. The inlet gas was composed 0.8% propane and 8% oxygen balanced with nitrogen with the now rate adjusted to achieve gas hourly space velocities (GHSV) ranging from 30,000-100,000 h$^1$. The catalytic activity of the Pt/TiO$_2$ nano-array catalysts were also evaluated in a conventional diesel combustion simulated exhaust conditions with 500 ppm CO, 389 ppm C$_2$H$_4$, 156 ppm C$_3$H$_6$, 52 ppm C$_3$H$_8$, 200 ppm NO, 100 ppm H$_2$, 6% CO$_2$, 6% H$_2$O, 12% O$_2$, and balance N$_2$.

Results and Discussion

Figure 23D:
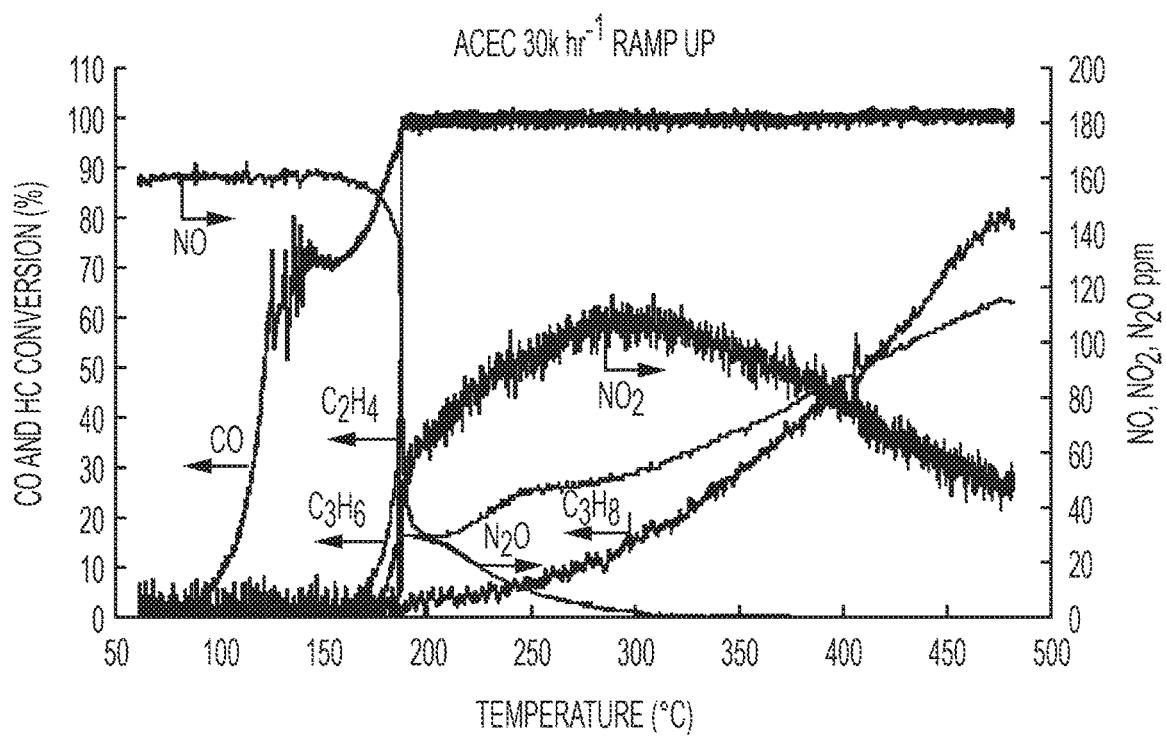
FIG. 23D is graph of light-off temperature of $Pt/TiO_2$ nano-arrays in CDC simulated exhaust.

The TiO$_2$ nano-arrays are composed of mesoporous nanobundles with a thickness of 800 nm-1 μm and diameter ranging from 100-300 nm (FIG. 23A). The unique mesoporosity of the TiO$_2$ nanoarrays is represented by arrays of dark spots on FIG. 23B. Most of Pt is deposited on the surface of the nanobundles, with only a few small Pt particles observed on the mesopores and the interface between the nanobundles. FIG. 23C shows the light-off curves for propane oxidation at a GHSV of 50,000 h$^{-1}$ for the Pt/TiO$_2$ nano-array samples with different Pt loading, prepared using 1, 10, and 50 ALD Pt cycles. The catalytic activity of the samples increases with the Pt loading, indicated by the shift of the light-off curves to lower temperatures. The 90% conversion light-off temperature, T$_{90}$, of the samples with 49.1 g Pt/ft$^3$ is only 210° C. at a GHSV of 50,000 h$^{-1}$ and even reduce to 202° C. at a GHSV of 30,000 h$^{-1}$. The enhanced reactivity of the Pt/TiO$_2$ nano-array might be explained by the unique mesoporous nano-array structure that enhances gas-solid interaction, metal-support electronic interaction, and Pt dispersion. The catalyst showed exceptional activity for CO and unsaturated hydrocarbons in the CDC simulated exhaust, with total conversion at 190° C. However, propane oxidation is delayed in this condition, likely due to the very low propane/oxygen ratio (~1/2300). The competition for active sites between O$_2$ and propane on Pt catalysts has been reported. Low propane concentration reduces the adsorbed propane, leading to deactivation for propane oxidation.

Significance

Pt atomic layer deposited TiO$_2$ nano-array/honeycomb monolithic catalysts show promise for low-temperature hydrocarbon oxidation. At high propane concentration, the catalysts can convert 90% of propane at as low as 202° C. In the CDC simulated exhaust, the catalysts can convert CO and unsaturated hydrocarbon totally at <200° C., but propane oxidation is delayed likely due to low propane/oxygen ratio that inhibits propane adsorption on Pt.

Example #3

Materials and Methods

The mesoporous $TiO_2$ nano-array was integrated onto cordierite honeycomb monolith via a solvothermal synthesis using titanium (IV) butoxide as Ti precursor and butanone as nonpolar solvent. Pt was loaded on to the $TiO_2$ nano-array/cordierite using Na-promoted wet incipient impregnation. The Pt/$TiO_2$ nanoarrays were calcined at 500° C. for 4 hours with a ramping rate of 2° C. min$^{-1}$. The DOC activity of the Pt/$TiO_2$ nanoarray/cordierite honeycomb monolith was evaluated using the protocol developed by the ACEC tech team for conventional diesel combustion at a space velocity of 60,000 h$^{-1}$. The composition of the simulated exhaust is 500 ppm CO, 389 ppm $C_2H_4$, 156 ppm $C_3H_6$, 52 ppm $C_3H_8$, 200 ppm NO, 100 ppm $H_2$, 6% $CO_2$, 6% $H_2O$, 12% $O_2$, and balance $N_2$. The BET surface area of the catalysts was measured on Micromeritics ASAP P2020 Automatic Chemisorption Analyzer.

Figure 24A:
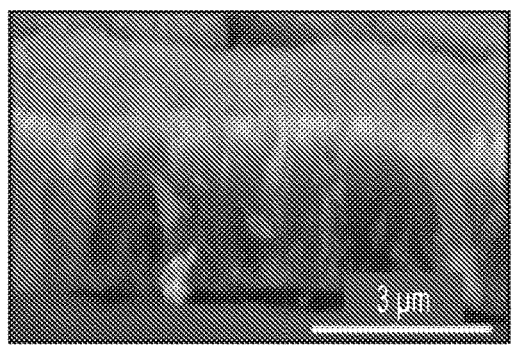
FIG. 24A is an SEM image of a $TiO_2$ nanowire array (NA).
Figure 24B:
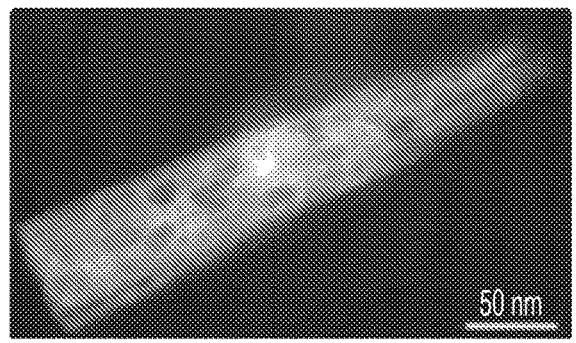
FIG. 24B is a HAADF STEM image of a $TiO_2$ nanowire array. The array of dark spots indicates the unique mesoporosity of the $TiO_2$ nanowire.
Figures 24C, 24D:
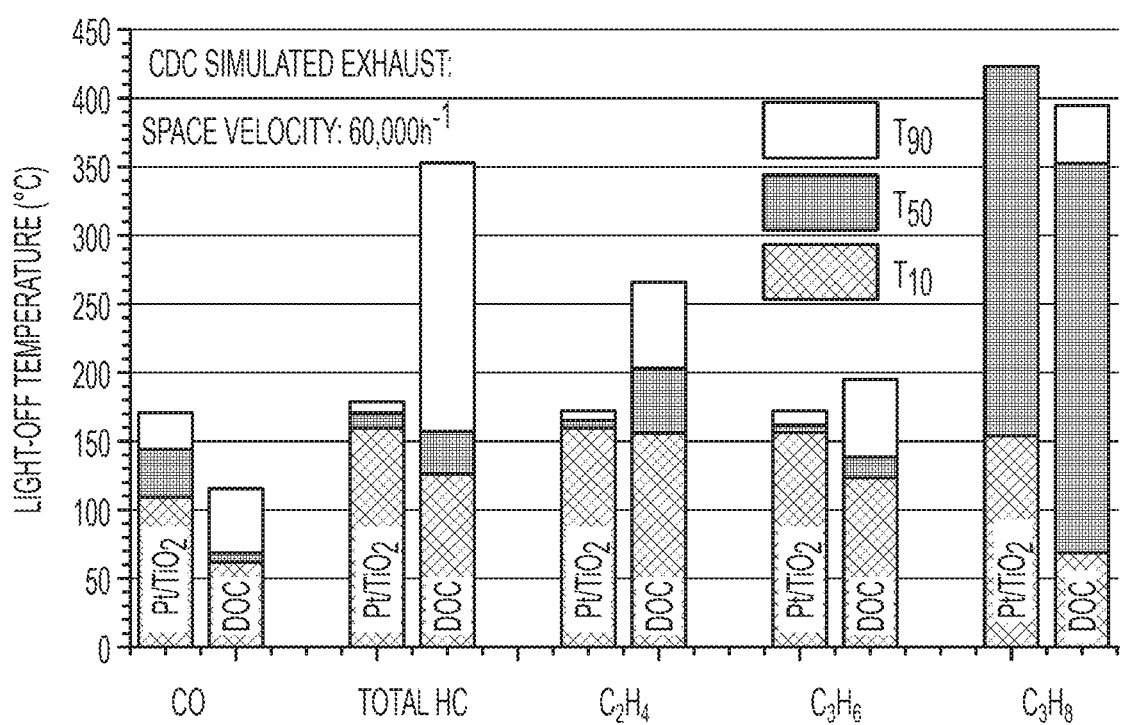
FIG. 24C is a table summarizing BET surface area of $TiO_2$ and $Pt/TiO_2$ surface area; HT aged $Pt/TiO_2$ sample were prepared by aging $Pt/TiO_2$ at 650° C. in a flow of 10% $H_2O$ in air for 100 hours.
FIG. 24D is a chart of light-off temperature of $Pt/TiO_2$ nanoarrays in CDC simulated exhaust. A commercial DOC catalyst based on Pt—Pd/$Al_2O_3$—$ZrO_2$ washcoat was used as a benchmark.
Figure 25A:
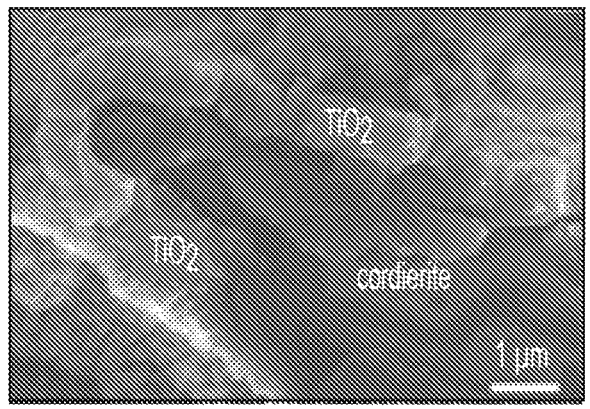
FIGS. 25A-F show physical characterization of $TiO_2$ nano-array integrated monolith.
Figure 25B:
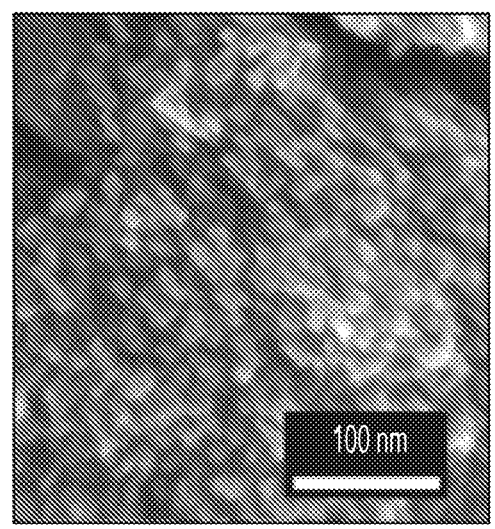
Figure 25C:
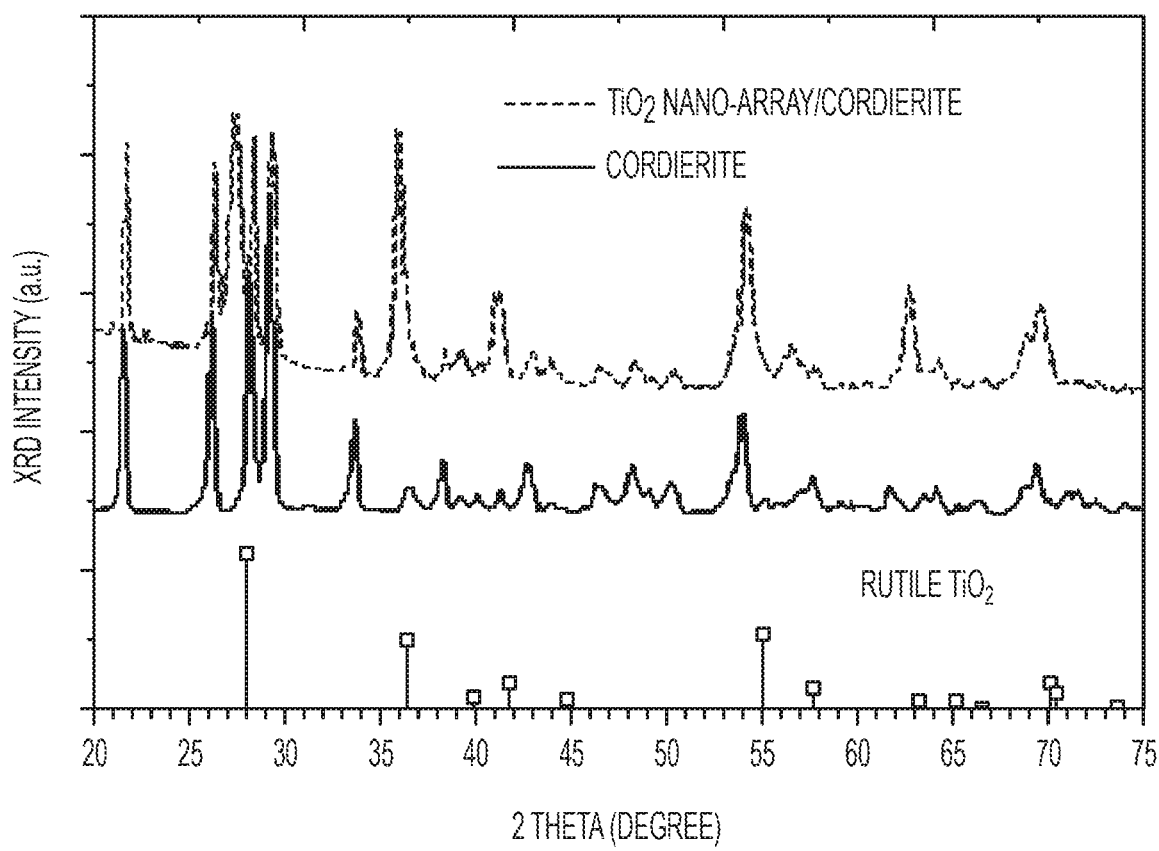
Figure 25E:
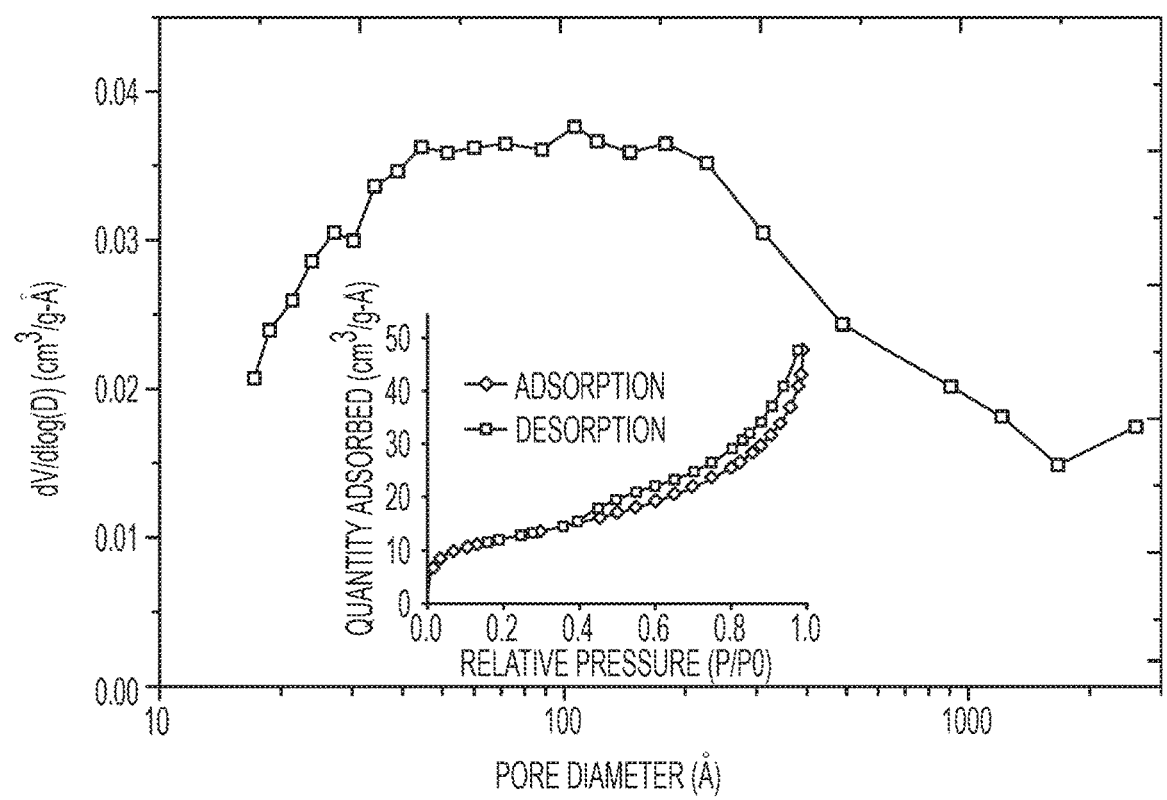
Figure 25D:
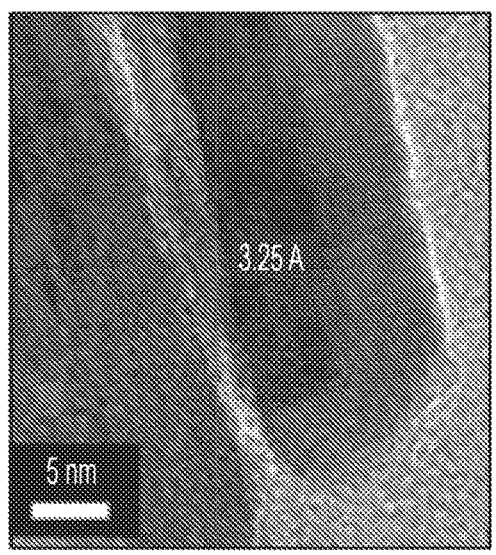
Figure 25F:
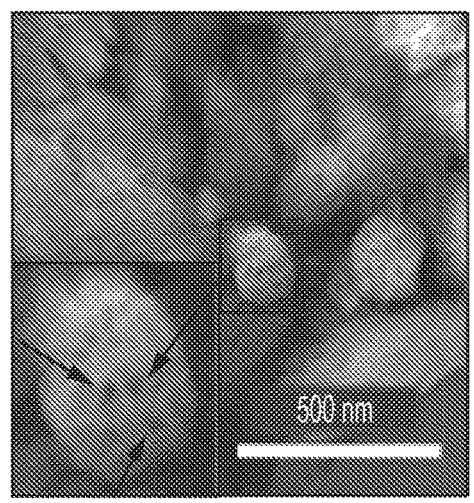
Figure 27A:
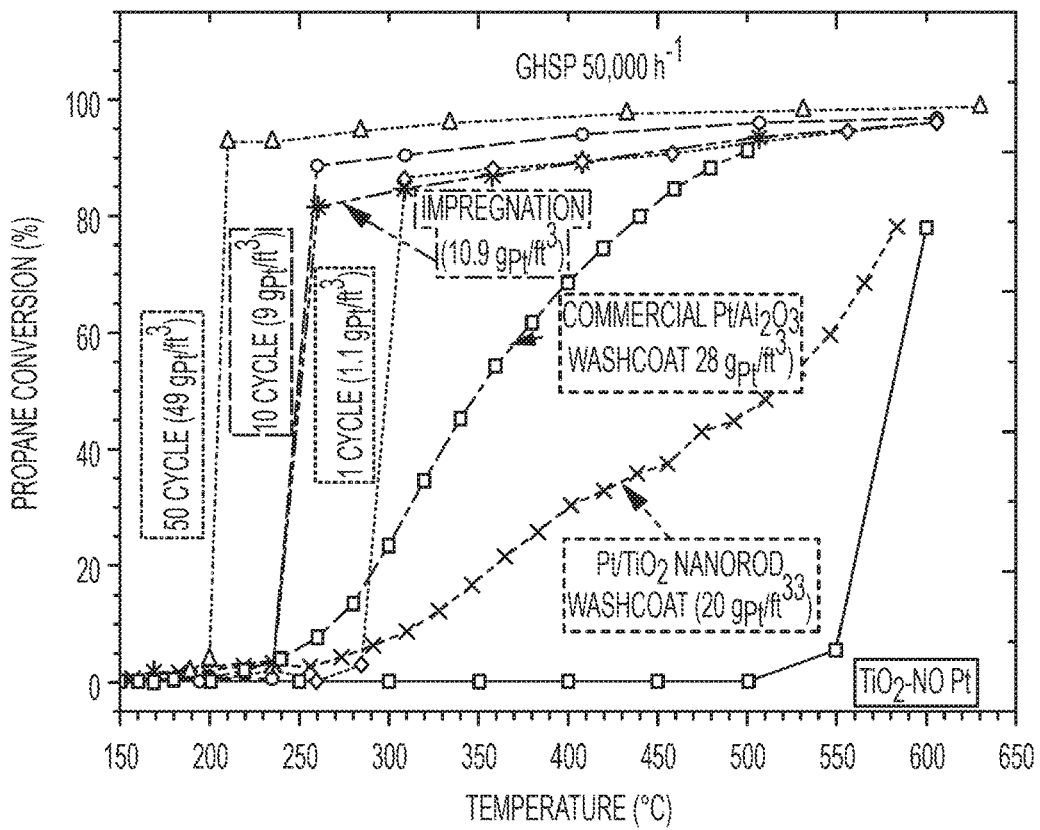
FIGS. 27A and 27B are catalytic propane oxidation activity of $Pt/TiO_2$ nano-array.
Figure 27B:
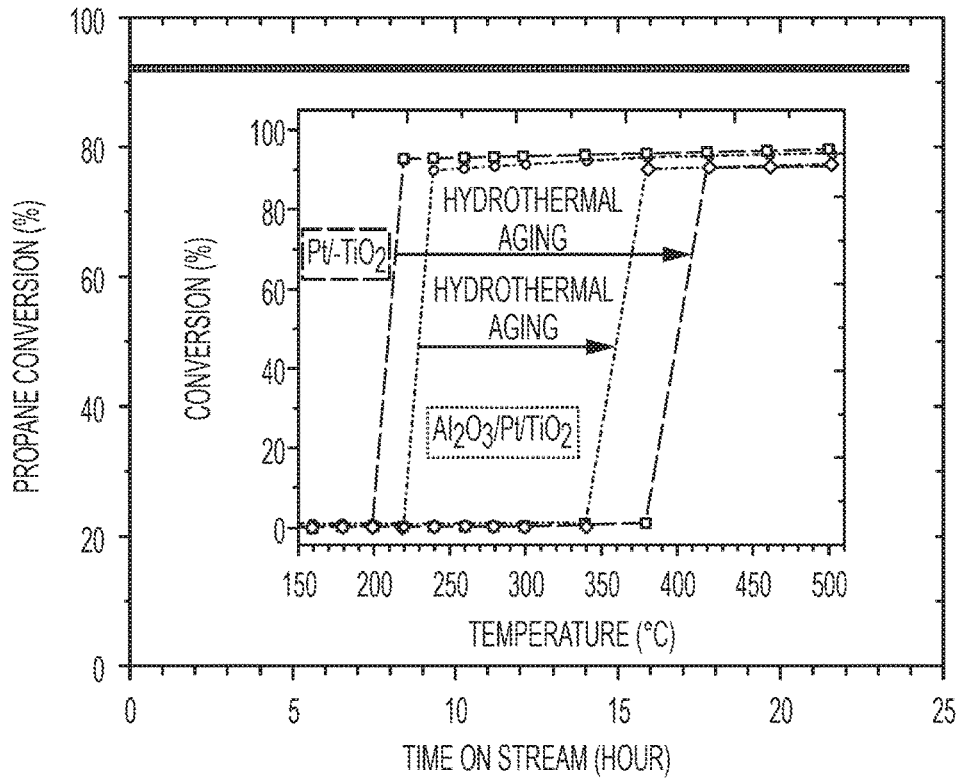
Figure 27D:
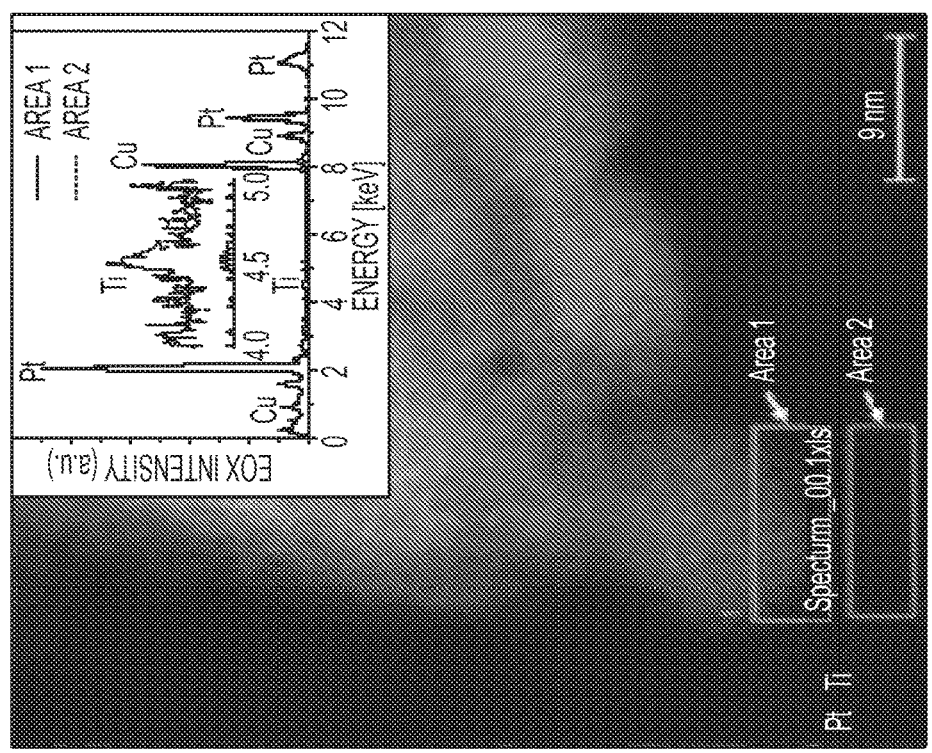
FIGS. 27C-E are TEM and STEM EDX elemental analysis of Pt nanoparticles on spent catalysts.
Figure 27C:
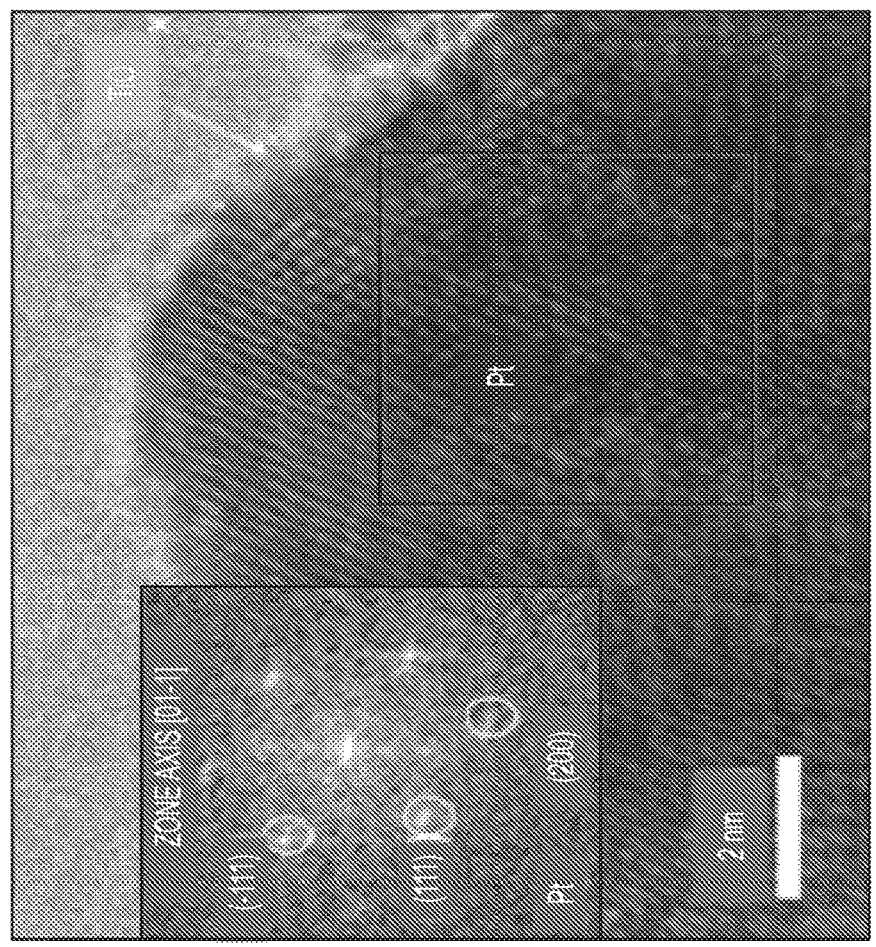
Figure 27E:
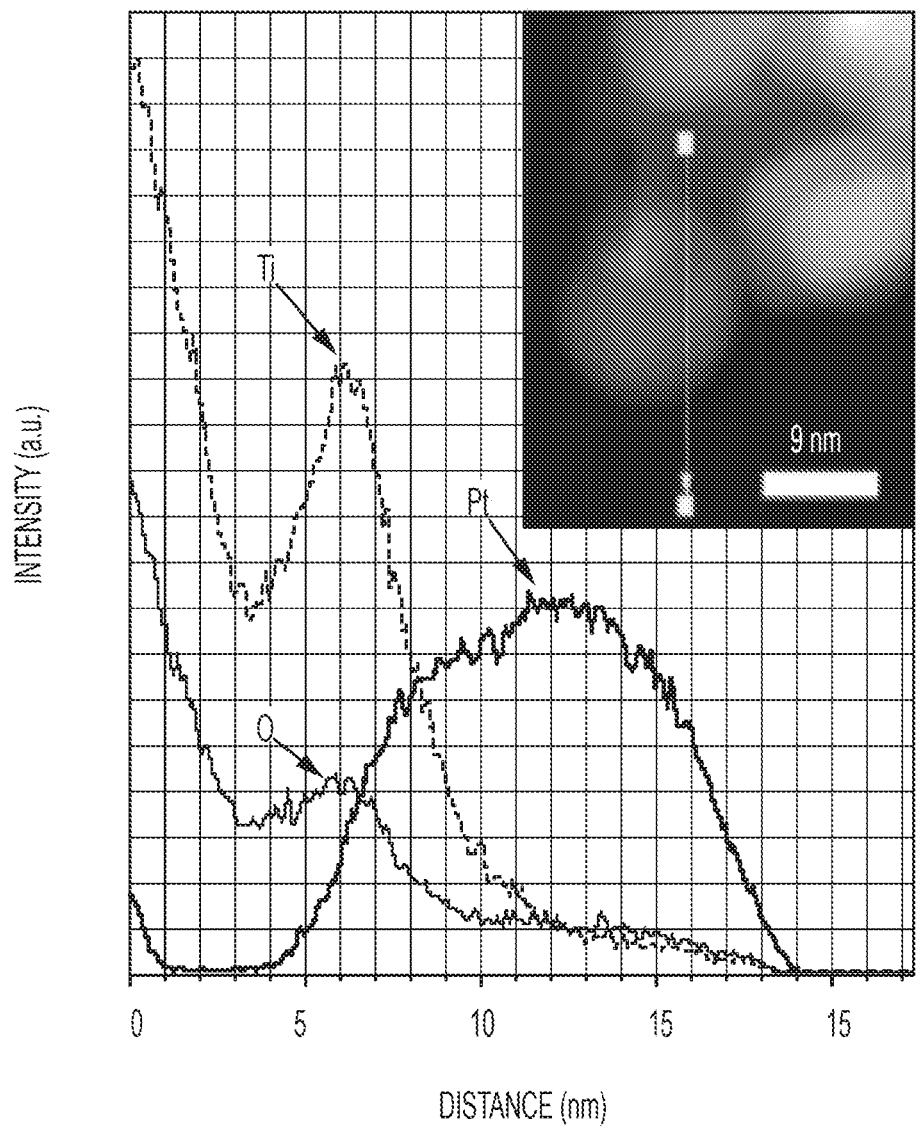

Results and Discussion $TiO_2$ nanowires with diameters of ~50-150 nm were uniformly grown on the monolith wall with a thickness of ~3-4 μm (FIG. 24A). Each nanowire is composed of several smaller nanowires, forming a unique mesoporous structure. The high annual annual angular dark field (HAADF) scanning transmission electron microscopy (STEM) image of the nanowire reveal an array of voids with diameters ranging from 3-30 nm on the nanowire (FIG. 24B). This unique mesoporous structure might explain the exceptionally high surface area of the $TiO_2$ nanoarray/cordierite substrate. The BET surface area of the fresh $TiO_2$/cordierite sample can reach 92.3 m$^2$ g$^{-1}$. However, after the Pt impregnation process, the surface area reduced significantly, to 7.7 m$^2$ g$^{-1}$. The Pt/$TiO_2$ nanoarray has high thermal stability. Significant morphological changes in the Pt/$TiO_2$ sample were not observed after the hydrothermal aging process at 650° C. for 100 hours, although the BET surface area was decreased slightly to 6.1 m$^2$ g$^{-1}$. The light-off temperatures for the Pt/$TiO_2$ nanoarray sample with a Pt loading of 0.71 g L$^{-1}$ for CO and hydrocarbons in CDC simulated exhaust conditions, indicating an exceptional DOC activity. The temperature $T_{90}$ for both CO and HCs approaches the 170° C. in the CDC simulated exhaust test, significantly lower than that of a commercial DOC catalyst while using much fewer catalyst materials. The enhanced reactivity of the Pt/$TiO_2$ nanoarray might be explained by the unique mesoporous nano-array structure that enhancing gas-solid interaction, metal-support electronic interaction.

Significance

The Pt supported $TiO_2$ nanoarray catalyst has excellent low-temperature activity for CO and hydrocarbon combustion.

Example #4

Materials and Methods

Scalable solvothermal synthesis of rutile $TiO_2$ nano-array.
Atomic layer deposition of Pt using trimethyl(methylcyclopentadienyl)platinum(IV)
The $TiO_2$ seeded cordierite honeycomb substrates with size up to 7.5 cm×7.5 cm×5 cm are placed within a sealed Teflon reactor (1 L), containing 500 mL of n-hexane, 50 mL of titanium (IV) isopropoxide, 5 mL of titanium tetrachloride (1 M in toluene), and 50 mL of hydrochloric acid (37 wt. %). Hydrothermal synthesis was conducted at 150° C. for 10 hours. After being removed from the reactor, all the samples were sonicated in acetone, ethanol, and water for 3 hours to remove organic compounds and Cl$^-$ residues from the synthesis before Pt loading. Pt was loaded on to the $TiO_2$ nano-array/cordierite via atomic layer deposition at 270° C. using trimethyl(methylcyclopentadienyl)platinum(IV) and $O_2$ as the Pt precursor and oxidant, respectively. In each ALD cycle, 1 s of the Pt precursor pulse and 1 s of $O_2$ pulse were separated by 20 s of $N_2$ purge. The Pt loading was controlled by the number of ALD cycles and was further evaluated by inductively coupled plasma mass spectrometry (ICP-MS).

Results and Discussion

Morphology, Crystal Structure, and Porosity Characterization
  Rutile $TiO_2$ nanowire array grown on cordierite honeycomb monolith
  Highly uniform: length of 800 nm-1 μm, diameter of ~10-20 nm
  Nanowires sintered, forming mesoporous nano-bundle array
  High surface area: 44.4 m$^2$/g (including substrate)
  Unique ordered mesoporous structures: introduction of macropores
  See FIGS. 25A-E
Atomic Layer Deposition of Pt on $TiO_2$ Nano-Array
  Pt loading, distribution, and particle size can be controlled by number of ALD cycles
  Using Pt precursors as molecular probe, we can visualize how gas diffuse in the mesoporous $TiO_2$ nano-array via TEM analysis of cross-section sample
  Pt is mainly deposited on the surface of bundles. Small particles can be found deep inside the bundles and at the interface between bundles
  Macropores formed at the space between bundles act as fast mass-transport lanes
  See FIGS. 26A-A
Catalytic Propane Oxidation of ALD Pt/$TiO_2$ Nano-Array
  Remarkable propane oxidation activity of ALD Pt/$TiO_2$ nano-array
  $T_{90}$ is as low as 202° C. for 50-cycle sample
  1-cycle sample showed much better activity compared to $TiO_2$ wash-coat sample, when used 20 times lower of Pt loading
  High thermal and hydrothermal stability: ALD can further tuning activity and stability
  Without wishing to be bound by theory, high reactivity is due to excellent mass-transport and SMSIs
  See FIGS. 27A-E

INCORPORATION BY REFERENCE; EQUIVALENTS

The teachings of all patents, published applications and references cited herein are incorporated by reference in their entirety.

While the invention has been described with reference to example embodiments, it will be understood by those skilled in the art that various changes may be made and equivalents may be substituted for the elements thereof without departing from the scope of the invention. In addition, many modifications may be made to adapt the teaching of the invention to particular use, application, manufacturing conditions, use conditions, composition, medium, size, and/or materials without departing from the essential scope and spirit of the invention. Therefore, it is intended that the invention not be limited to the particular embodiments and best mode contemplated for carrying out this invention as described herein.

While various aspects and embodiments have been disclosed herein, other aspects and embodiments will be apparent to those skilled in the art. The various aspects and embodiments disclosed herein are for purposes of illustration and are not intended to be limiting of the true scope of the invention disclosed herein. It is also to be understood that the terminology used herein is for the purpose of describing particular embodiments only, and is not intended to be limiting. Since many modifications, variations, and changes in detail can be made to the described examples, it is intended that all matters in the preceding description and shown in the accompanying figures be interpreted as illustrative and not in a limiting sense.

Chemical compounds are described using standard nomenclature. For example, any position not substituted by any indicated group is understood to have its valency filled by a bond as indicated, or a by hydrogen atom.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and words of a similar nature in the context of describing the improvements disclosed herein (especially in the context of the following claims) are to be construed to cover both the singular and the plural, unless otherwise indicated herein or clearly contradicted by context. Further, it should further be noted that the terms "first," "second," and the like herein do not denote any order, quantity, or relative importance, but rather are used to distinguish one element from another. The modifier "about" used in connection with a quantity is inclusive of the stated value and has the meaning dictated by the context (e.g., it includes, at a minimum the degree of error associated with measurement of the particular quantity).

All methods described herein can be performed in any suitable order unless otherwise indicated herein or otherwise clearly contradicted by context. The use of any and all examples, or exemplary language (e.g., "such as"), is intended merely to better illustrate the invention and does not pose a limitation on the scope of the invention or any embodiments unless otherwise claimed.

What is claimed is:

1. A method of making a titanium dioxide nanoarray having a platinum group metal dispersed thereon, the method comprising:
    contacting a substrate with a Ti (IV) precursor in a non-polar solvent and with hydrochloric acid in water under hydrothermal conditions, thereby forming a titanium dioxide nanoarray
    contacting the titanium dioxide nanoarray with a solution comprising a platinum group metal precursor;
    drying the titanium dioxide nanoarray; and
    calcining the titanium dioxide nanoarray;
    wherein the titanium dioxide nanoarray is mesoporous.

2. The method of claim 1, wherein the platinum group metal precursor is a platinum precursor.

3. The method of claim 2, wherein the platinum precursor is $Pt(NH_3)_4(NO_3)_2$.

4. The method of claim 1, where the solution comprising a platinum group metal precursor further comprises sodium ions.

5. The method of claim 4, wherein the sodium ions are from sodium hydroxide (NaOH).

6. The method of claim 1, wherein drying the titanium dioxide nanoarray comprises microwaving the titanium dioxide nanoarray.

7. The method of claim 1, further comprising contacting the titanium dioxide nanoarray with a solution having a platinum precursor dissolved therein and drying the titanium dioxide nanoarray at least twice prior to calcining the titanium dioxide nanoarray.

8. The method of claim 1, wherein calcining is performed at a temperature between about 450° C. and 550° C. for a duration from 3 hours to 4 hours.

9. The method of claim 1, wherein calcining is performed with a ramp rate of 2° C./min.

10. The method of claim 1, wherein a water:non-polar solvent ratio is from about 1:20 to about 1:5.

11. The method of claim 10, wherein the non-polar solvent comprises one or more of butanone, toluene, and hexane.

12. The method of claim 11, wherein the hexane is n-hexane.

13. The method of claim 1, wherein the titanium (IV) precursor comprises one or more titanium alkoxides.

14. The method of claim 13, wherein the titanium (IV) alkloxide is titanium (IV) isopropoxide or titanium (IV) n-butoxide.

15. The method of claim 1, wherein the titanium (IV) precursor comprises titanium tetrachloride.

16. The method of claim 1, wherein the substrate is seeded with $TiO_2$ prior to reacting the substrate.

17. The method of claim 1, wherein the hydrochloric acid solution is from 25 wt % to 45 wt % hydrochloric acid.

18. An article comprising:
    a substrate;
    a mesoporous, rutile titanium dioxide nanoarray integrated onto the substrate;
    a platinum group metal disposed on the titanium dioxide nanoarray.

19. A method of oxidizing a combustion exhaust, the method comprising:
    contacting a source of combustion exhaust with a mesoporous, rutile titanium dioxide nanoarray having a platinum group metal dispersed thereon.

* * * * *